US012696267B2

(12) United States Patent
Cirik et al.

(10) Patent No.: US 12,696,267 B2
(45) Date of Patent: Jul. 28, 2026

(54) UPLINK TRANSMISSION PARAMETER DETERMINATION

(71) Applicant: Bloomsbury Design Labs LLC, Wilmington, DE (US)

(72) Inventors: Ali Cagatay Cirik, Chantilly, VA (US); Hua Zhou, Vienna, VA (US); Esmael Hejazi Dinan, McLean, VA (US); Yunjung Yi, Vienna, VA (US); Kai Xu, Great Falls, VA (US)

(73) Assignee: BLOOMSBURY DESIGN LABS LLC, Wilmington, DE (US)

( * ) Notice: Subject to any disclaimer, the term of this patent is extended or adjusted under 35 U.S.C. 154(b) by 210 days.

(21) Appl. No.: 18/376,658

(22) Filed: Oct. 4, 2023

(65) Prior Publication Data

US 2024/0040564 A1     Feb. 1, 2024

Related U.S. Application Data

(63) Continuation of application No. PCT/US2022/023408, filed on Apr. 5, 2022.
(Continued)

(51) Int. Cl.
| | |
|---|---|
| *G06F 15/16* | (2006.01) |
| *H04W 16/28* | (2009.01) |
(Continued)

(52) U.S. Cl.
CPC ....... *H04W 72/1268* (2013.01); *H04W 16/28* (2013.01); *H04W 52/242* (2013.01); *H04W 72/231* (2023.01); *H04W 76/20* (2018.02)

(58) Field of Classification Search
CPC ............. H04W 72/1268; H04W 16/28; H04W 52/242; H04W 72/231; H04W 76/20;
(Continued)

(56) References Cited

U.S. PATENT DOCUMENTS

| | | |
|---|---|---|
| 10,939,382 B2 | 3/2021 | Zhou et al. |
| 11,140,722 B2 | 10/2021 | Cirik et al. |
(Continued)

FOREIGN PATENT DOCUMENTS

| | | |
|---|---|---|
| EP | 3 375 123 B1 | 3/2020 |
| EP | 3 681 086 A1 | 7/2020 |
(Continued)

OTHER PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).
(Continued)

*Primary Examiner* — John B Walsh
(74) *Attorney, Agent, or Firm* — Dorsey & Whitney LLP

(57) ABSTRACT
A wireless device receives a downlink control message indicating a set of at least two transmission configuration indicator (TCI) states for uplink transmissions. The wireless device receives downlink control information (DCI) scheduling or activating a physical uplink shared channel (PUSCH) transmission. The wireless device transmits, based on the DCI being a DCI format 0_0, the PUSCH transmission using a TCI state that occurs first in the set of at least two TCI states.

20 Claims, 26 Drawing Sheets

Related U.S. Application Data

(60) Provisional application No. 63/170,739, filed on Apr. 5, 2021.

(51) Int. Cl.
| | |
|---|---|
| *H04W 52/24* | (2009.01) |
| *H04W 72/1268* | (2023.01) |
| *H04W 72/231* | (2023.01) |
| *H04W 76/20* | (2018.01) |

(58) Field of Classification Search
CPC ... H04W 52/146; H04W 52/42; H04W 72/23; H04L 5/0048; H04L 5/0058; H04L 5/0023

See application file for complete search history.

(56) References Cited

U.S. PATENT DOCUMENTS

| | | | |
|---|---|---|---|
| 2016/0374141 A1 | 12/2016 | He et al. | |
| 2019/0349061 A1 | 11/2019 | Cirik et al. | |
| 2020/0228190 A1 | 7/2020 | Cirik et al. | |
| 2020/0260391 A1 | 8/2020 | Zhou et al. | |
| 2020/0267712 A1 | 8/2020 | Cirik et al. | |
| 2020/0351794 A1 | 11/2020 | Xu et al. | |
| 2021/0029649 A1 | 1/2021 | Cirik et al. | |
| 2021/0099963 A1 | 4/2021 | Jeon et al. | |
| 2021/0105727 A1 | 4/2021 | Xu et al. | |
| 2021/0144720 A1 | 5/2021 | Xu et al. | |
| 2021/0185614 A1 | 6/2021 | Zhou et al. | |
| 2021/0219275 A1 | 7/2021 | Xu et al. | |
| 2021/0410132 A1 | 12/2021 | Xu et al. | |
| 2022/0330163 A1* | 10/2022 | Liu ........................ | H04W 52/34 |
| 2023/0403108 A1* | 12/2023 | Grossmann ........... | H04L 5/0091 |

FOREIGN PATENT DOCUMENTS

| | | | |
|---|---|---|---|
| WO | 2017/083489 A1 | 5/2017 |
| WO | 2020/198645 A1 | 10/2020 |
| WO | 2021/011442 A1 | 1/2021 |
| WO | 2021/026325 A1 | 2/2021 |
| WO | 2021/030674 A1 | 2/2021 |
| WO | 2021/146161 A1 | 7/2021 |
| WO | 2021/202862 A1 | 10/2021 |
| WO | 2021/206990 A1 | 10/2021 |

OTHER PUBLICATIONS

3GPP TS 38.212 V16.3.0 (Sep. 2020); Technical Specification; 3rd Generation Partnership Project; Technical Specification Group Radio Access Network; NR; Multiplexing and channel coding; (Release 16).

3GPP TS 38.213 V16.4.0 (Dec. 2020); Technical Specification; 3rd Generation Partnership Project; Technical Specification Group Radio Access Network; NR; Physical layer procedures for control (Release 16).

3GPP TS 38.214 V16.4.0 (Dec. 2020); Technical Specification; 3rd Generation Partnership Project; Technical Specification Group Radio Access Network; NR; Physical layer procedures for data; (Release 16).

3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).

3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).

3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).

R1-2100044; 3GPP TSG RAN WG1 Meeting #104-e; e-Meeting, Jan. 25-Feb. 5, 2021; Agenda Item: 8.1.1; Source: Futurewei; Title: Enhancement on multi-beam operation; Document for: Discussion and decision.

R1-2100286; 3GPP TSG RAN WG1 Meeting #104-e; e-Meeting, Jan. 25-Feb. 5, 2021; Source: ZTE; Title: Enhancements on Multi-TRP for PDCCH, PUCCH and PUSCH; Agenda Item: 8.1.2.1; Document for: Discussion and Decision.

R1-2100637; 3GPP TSG RAN WG1 #104-e ; e-Meeting, Jan. 25-Feb. 5, 2021; Agenda Item: 8.1.2.1; Source: Intel Corporation; Title: Multi-TRP enhancements for PDCCH, PUCCH and PUSCH; Document for: Discussion/Decision.

International Search Report and Written Opinion of the International Searching Authority mailed Jul. 14, 2022, in International Application No. PCT/US2022/023408.

* cited by examiner

Figure 3:
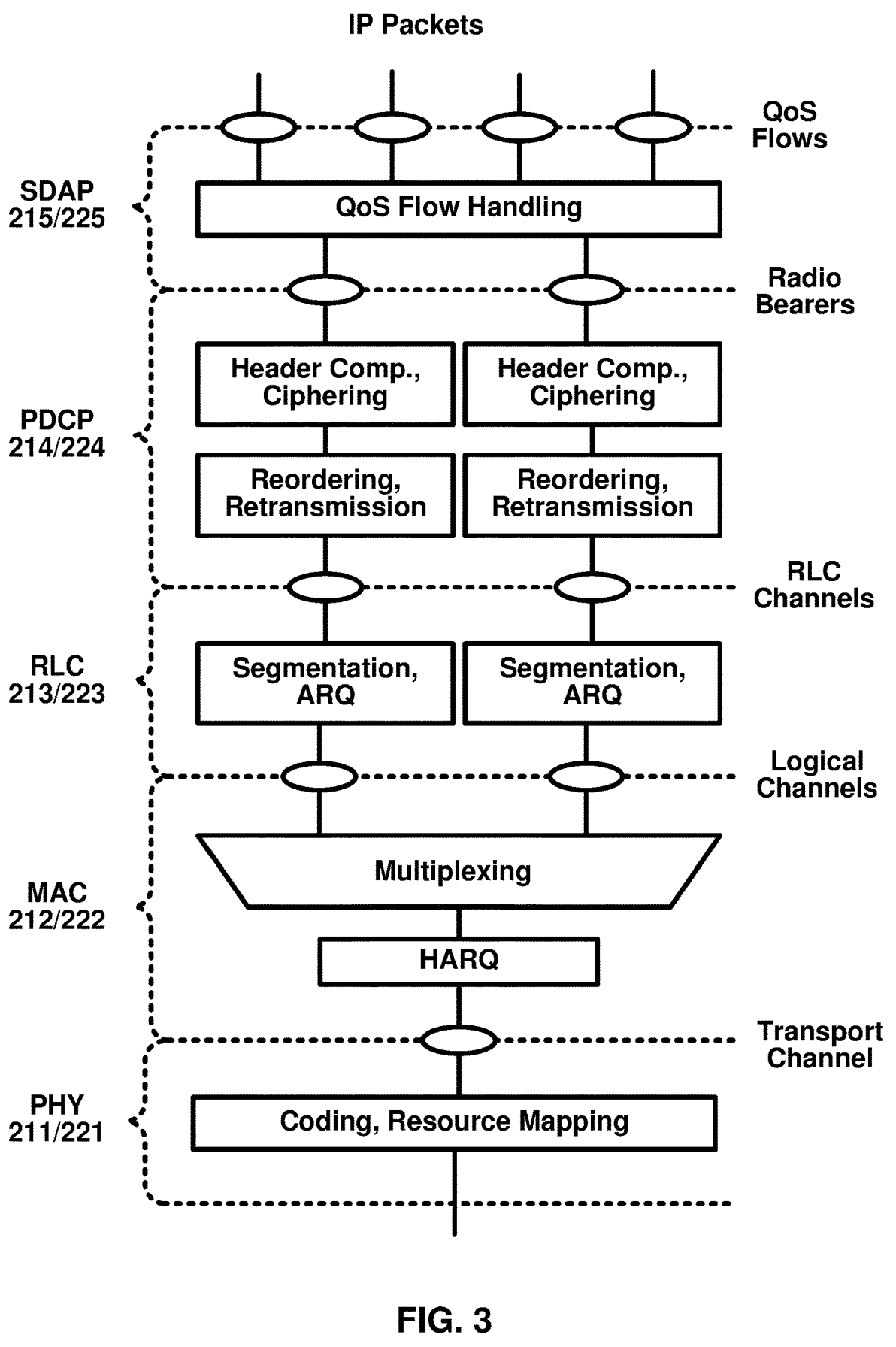

IP Packets

QoS Flows

SDAP 215/225

QoS Flow Handling

Radio Bearers

PDCP 214/224

| Header Comp., Ciphering | Header Comp., Ciphering |
|---|---|
| Reordering, Retransmission | Reordering, Retransmission |

RLC Channels

RLC 213/223

| Segmentation, ARQ | Segmentation, ARQ |
|---|---|

Logical Channels

MAC 212/222

Multiplexing

HARQ

Transport Channel

PHY 211/221

Coding, Resource Mapping

Uplink

FIG. 5A

Downlink

Logical Channels

Transport Channels

Physical Channels

Physical Signals

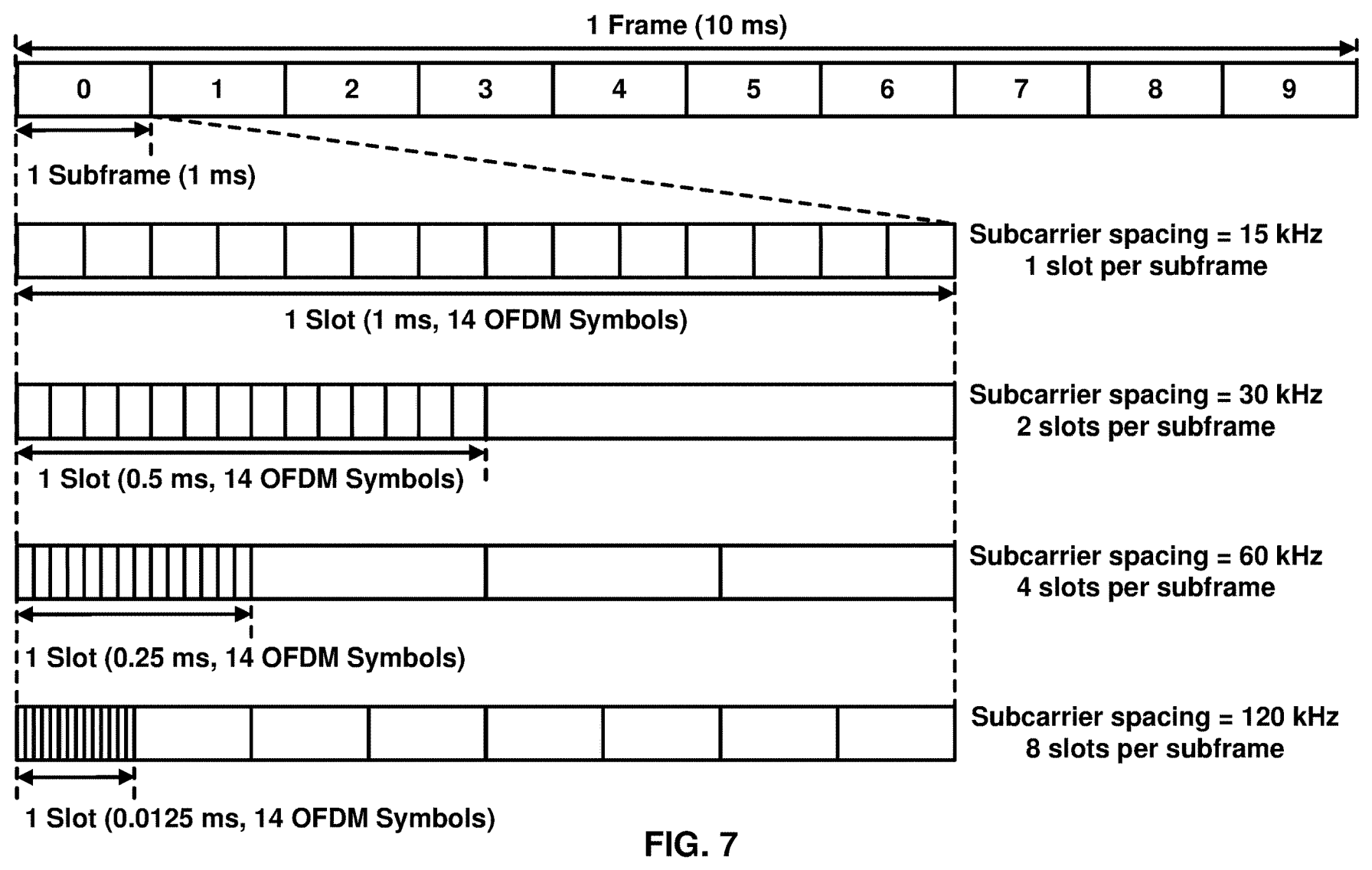

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

UPLINK TRANSMISSION PARAMETER DETERMINATION

CROSS-REFERENCE TO RELATED APPLICATIONS

This application is a continuation of International Application No. PCT/US2022/023408, filed Apr. 5, 2022, which claims the benefit of U.S. Provisional Application No. 63/170,739, filed Apr. 5, 2021, all of which are hereby incorporated by reference in their entireties.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

DETAILED DESCRIPTION

Figures 1A, 1B:
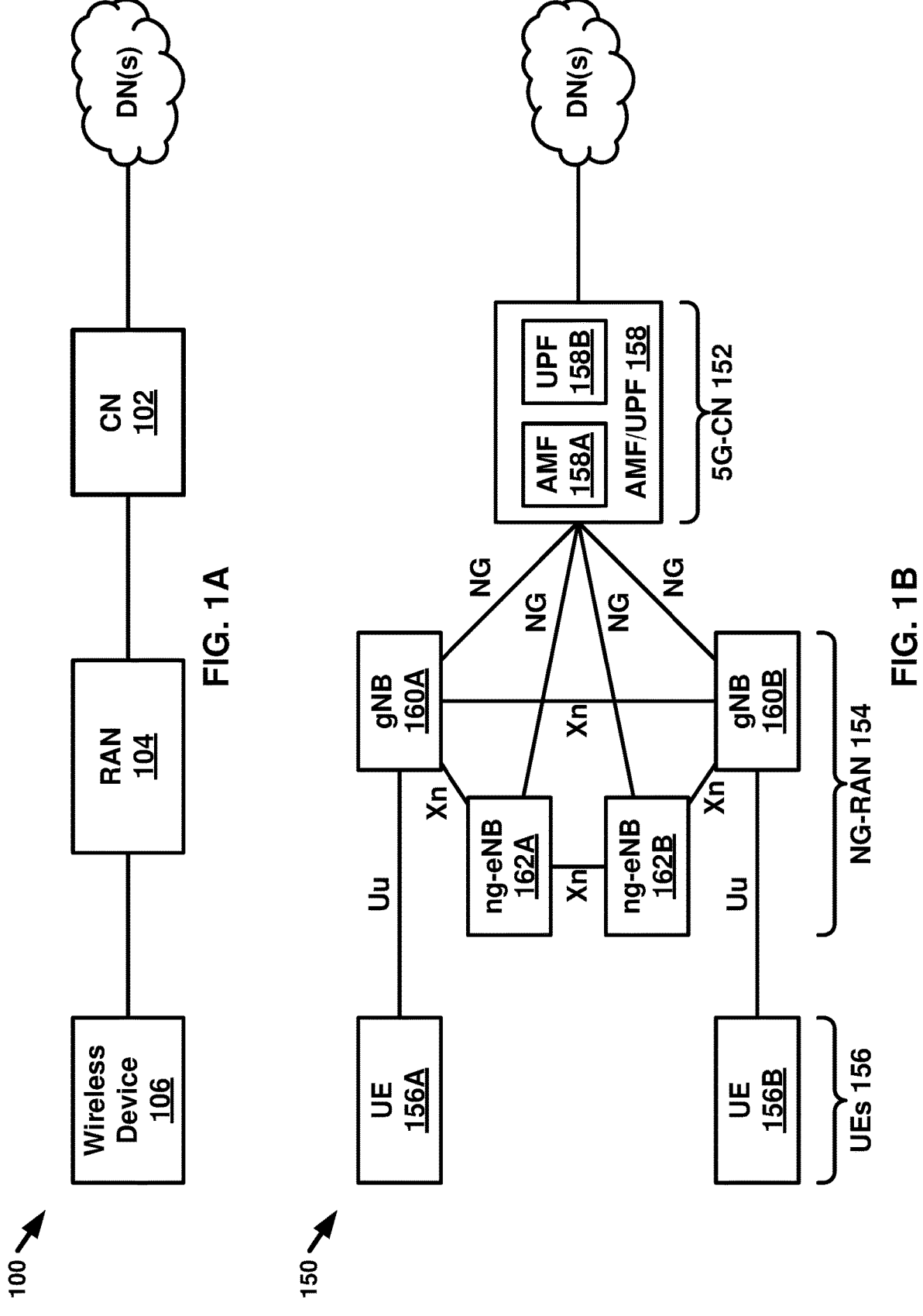
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of", provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs

162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
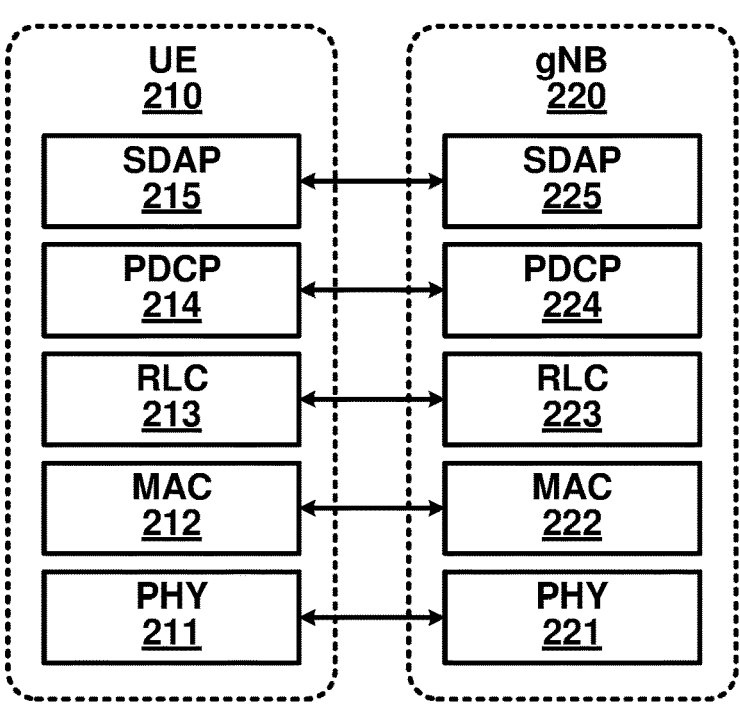
FIG. 2A and FIG. 2B respectively illustrate a New Radio (NR) user plane and control plane protocol stack.
Figure 2B:
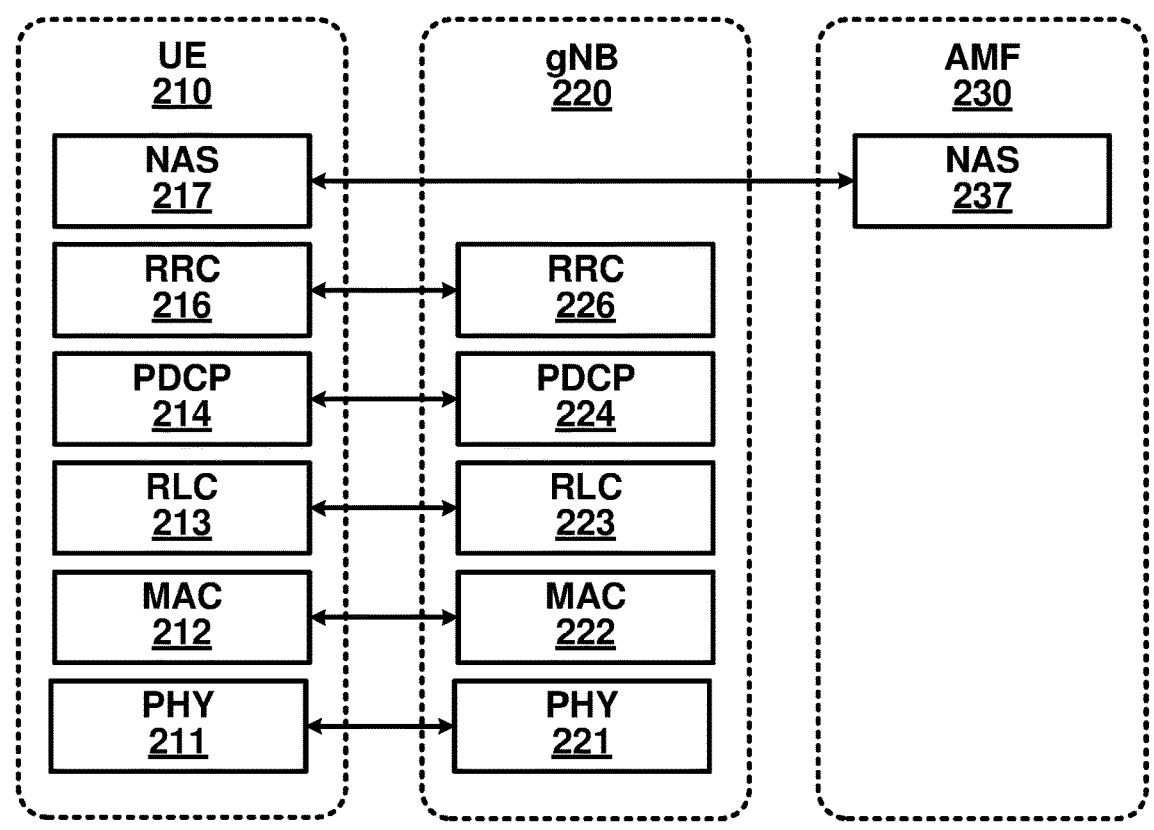

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
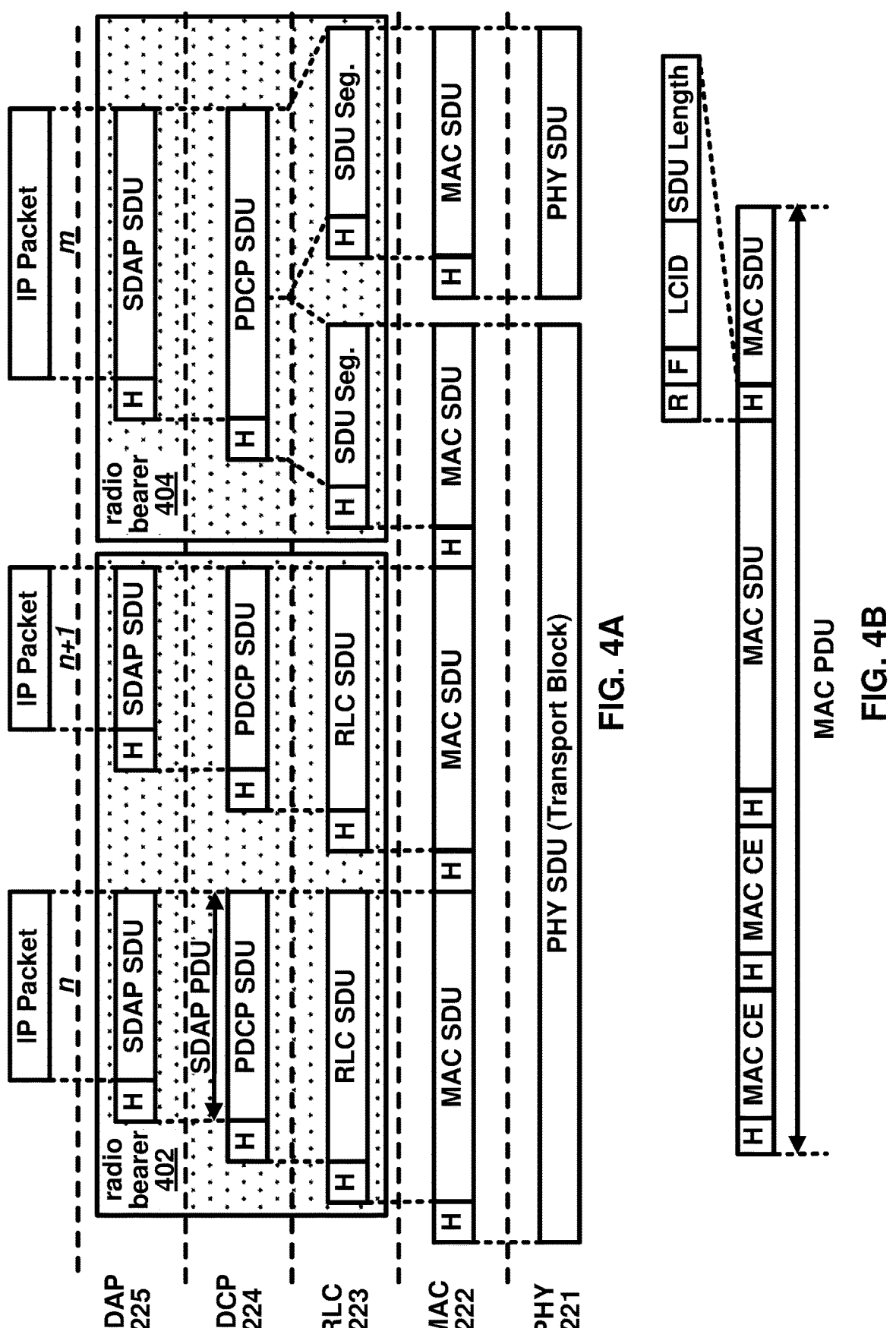
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
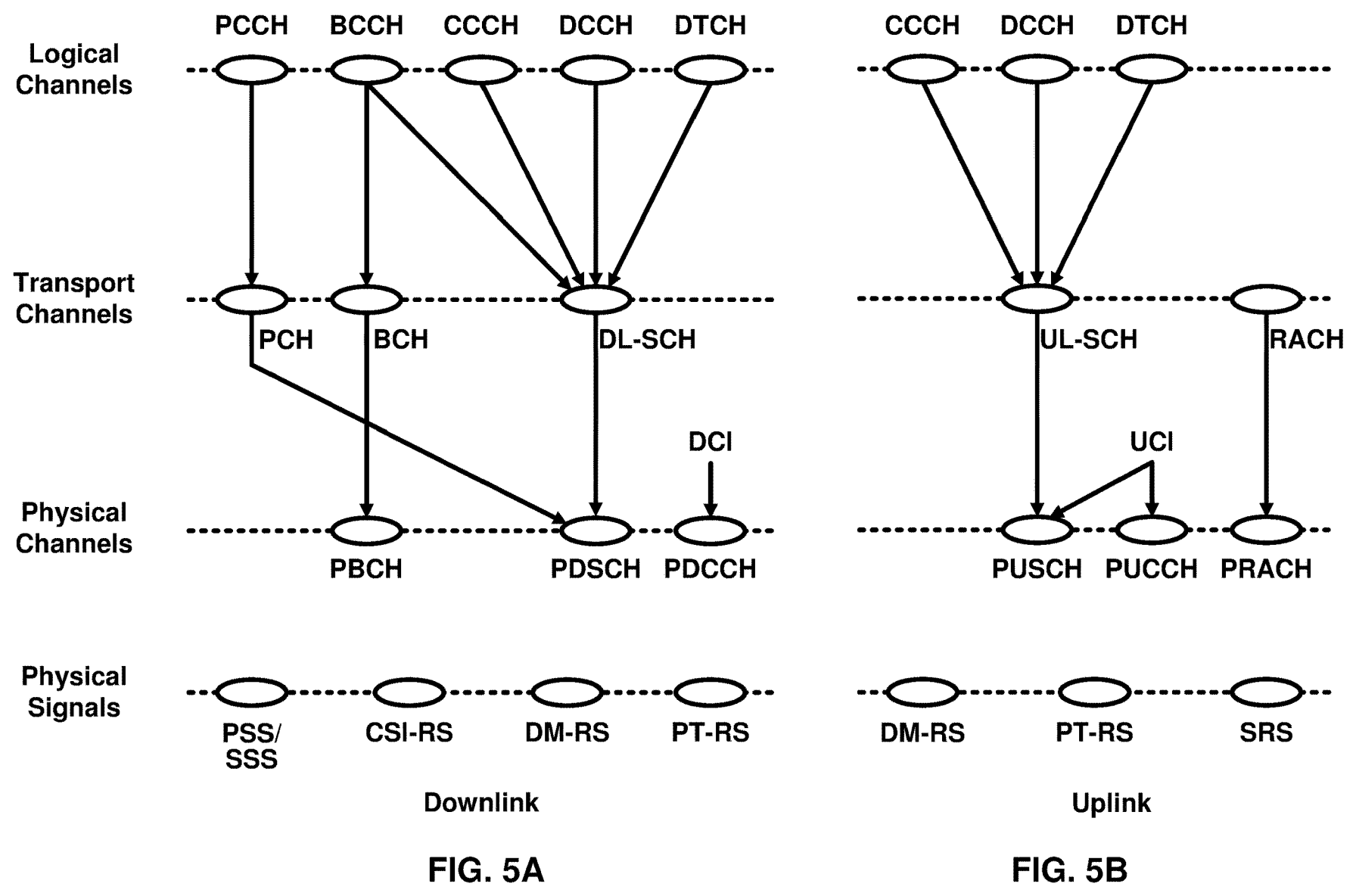

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;
  a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;
  a dedicated control channel (DCCH) for carrying control messages to/from a specific the UE to configure the UE; and
  a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;
  a broadcast channel (BCH) for carrying the MIB from the BCCH;
  a downlink shared channel (DL-SCH) for carrying downlink data and signaling messages, including the SIBs from the BCCH;
  an uplink shared channel (UL-SCH) for carrying uplink data and signaling messages; and
  a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;
  a physical downlink shared channel (PDSCH) for carrying downlink data and signaling messages from the DL-SCH, as well as paging messages from the PCH;
  a physical downlink control channel (PDCCH) for carrying downlink control information (DCI), which may include downlink scheduling commands, uplink scheduling grants, and uplink power control commands;
  a physical uplink shared channel (PUSCH) for carrying uplink data and signaling messages from the UL-SCH and in some instances uplink control information (UCI) as described below;
  a physical uplink control channel (PUCCH) for carrying UCI, which may include HARQ acknowledgments, channel quality indicators (CQI), pre-coding matrix indicators (PMI), rank indicators (RI), and scheduling requests (SR); and
  a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
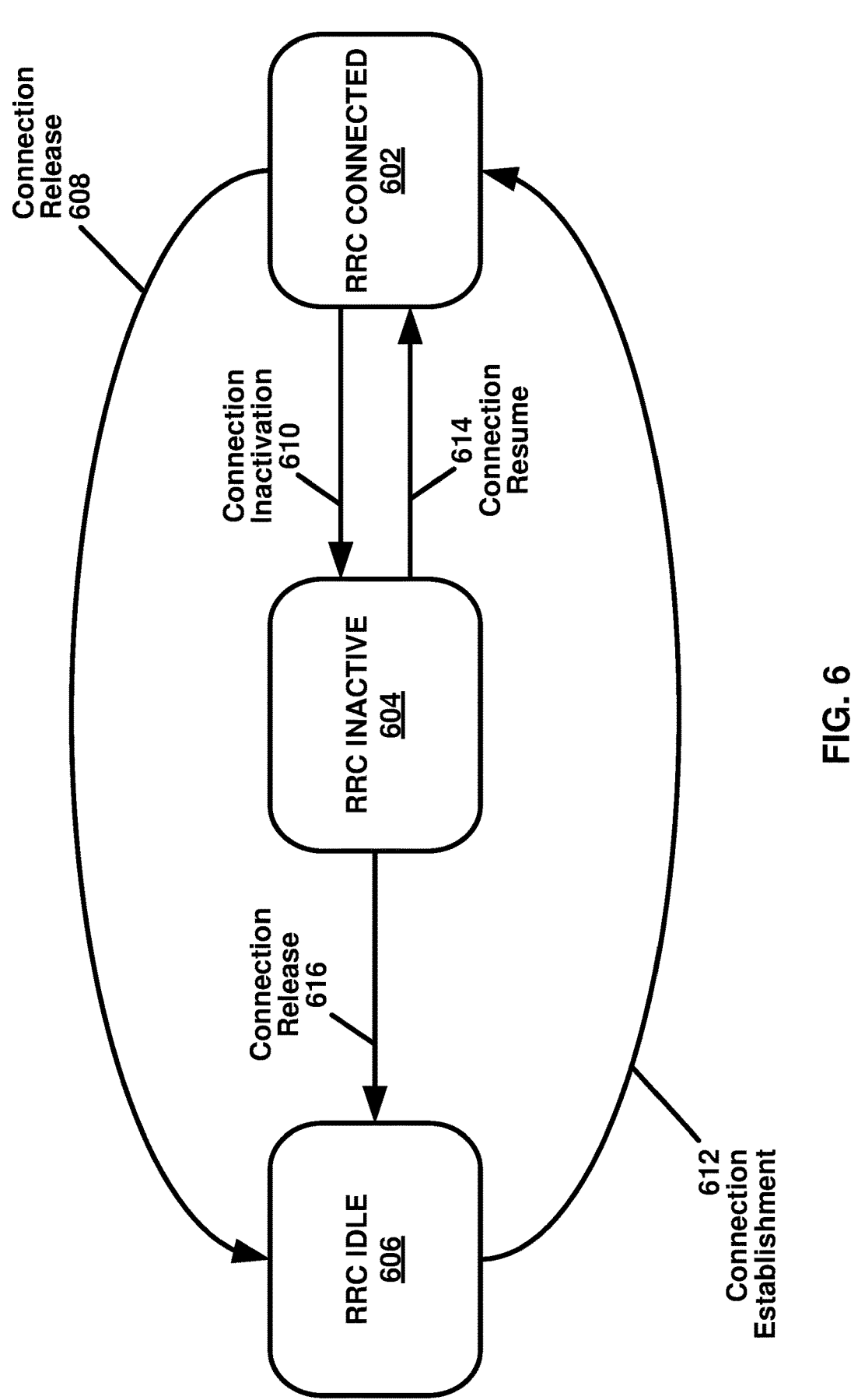
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 s. For example, NR defines numerologies with the following subcarrier spacing/ cyclic prefix duration combinations: 15 kHz/4.7 s; 30 kHz/ 2.3 s; 60 kHz/1.2 s; 120 kHz/0.59 s; and 240 kHz/0.29 s.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
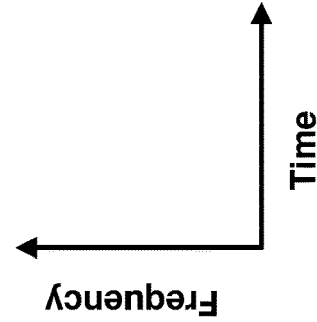
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
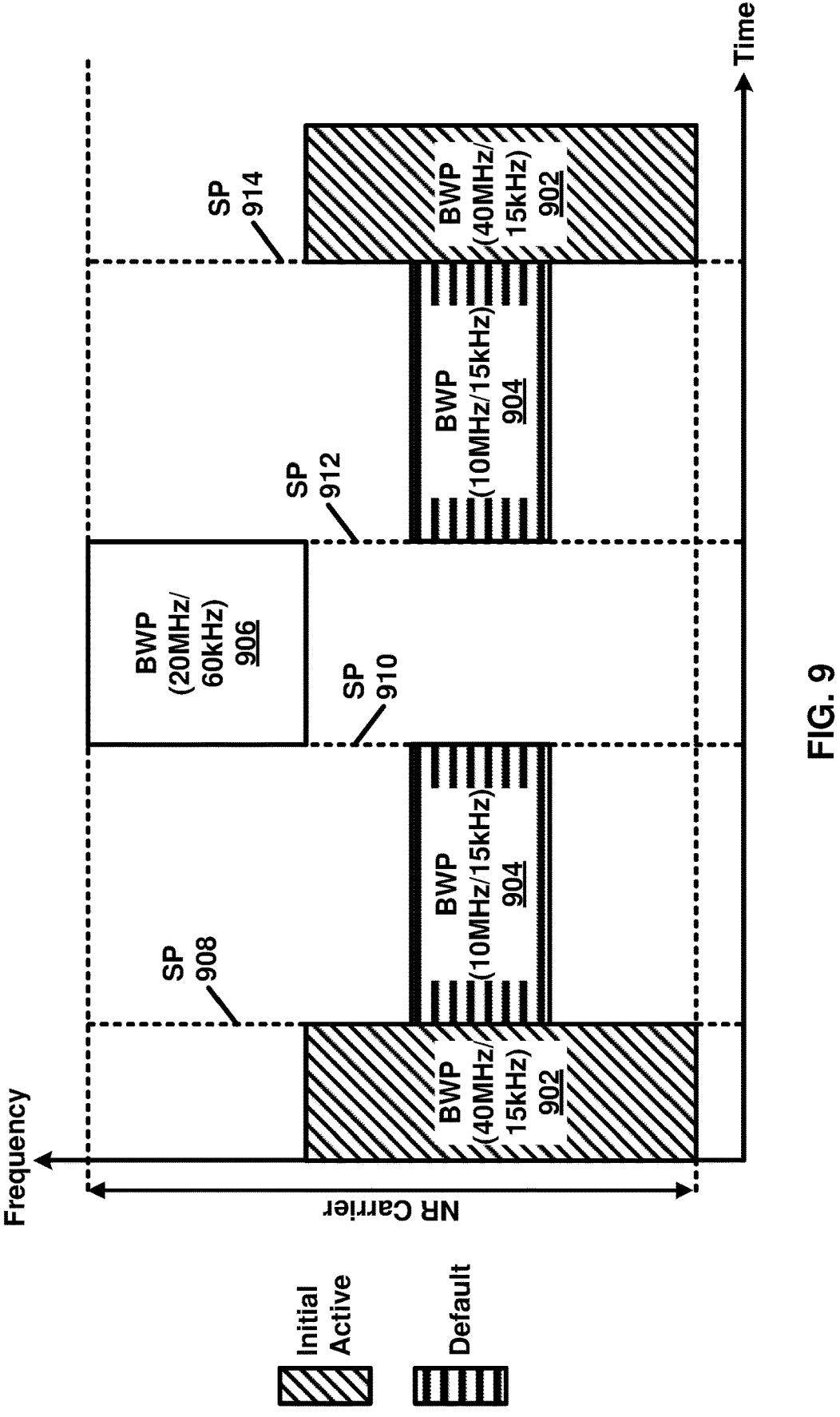
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
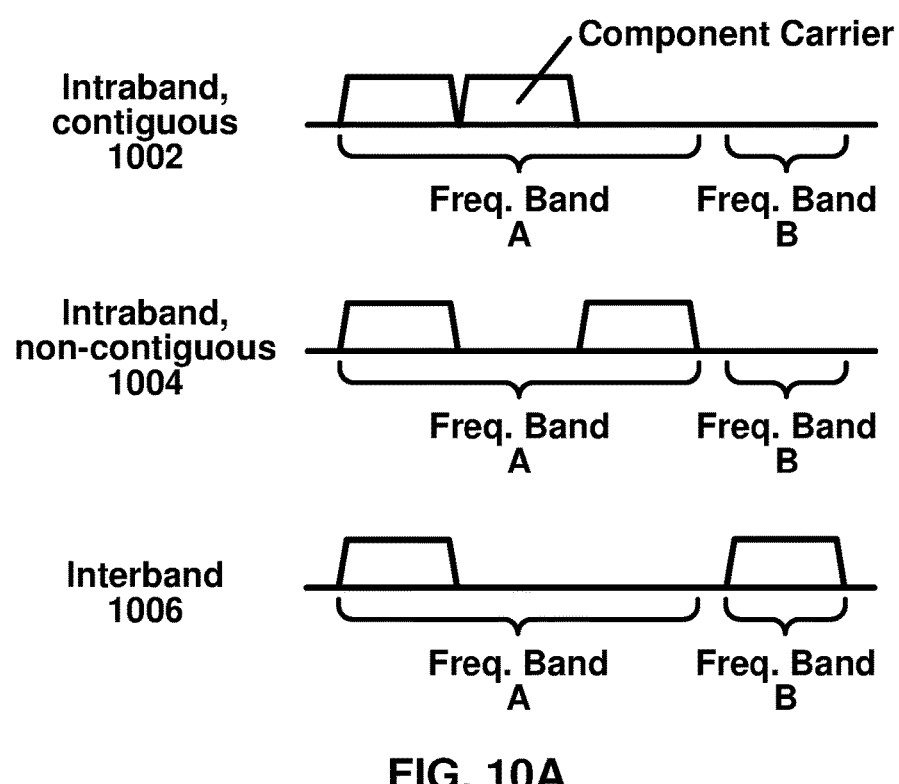
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
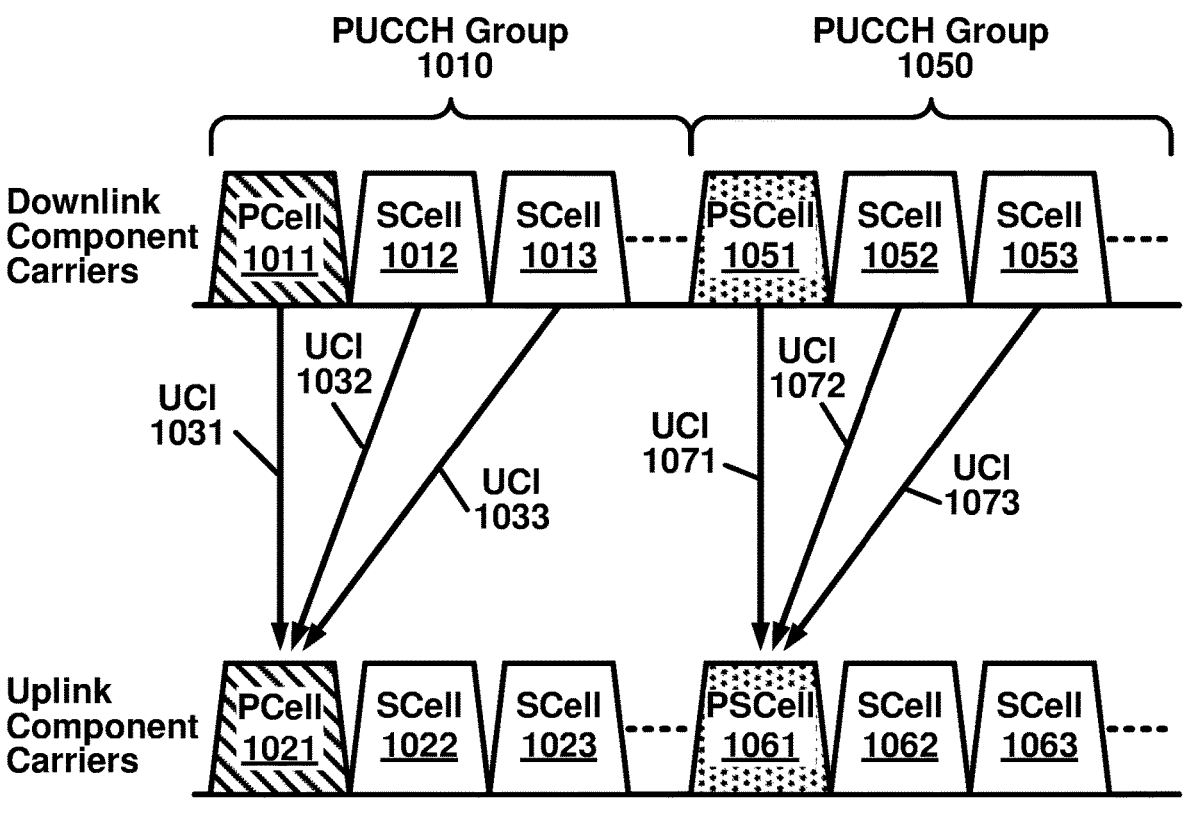
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
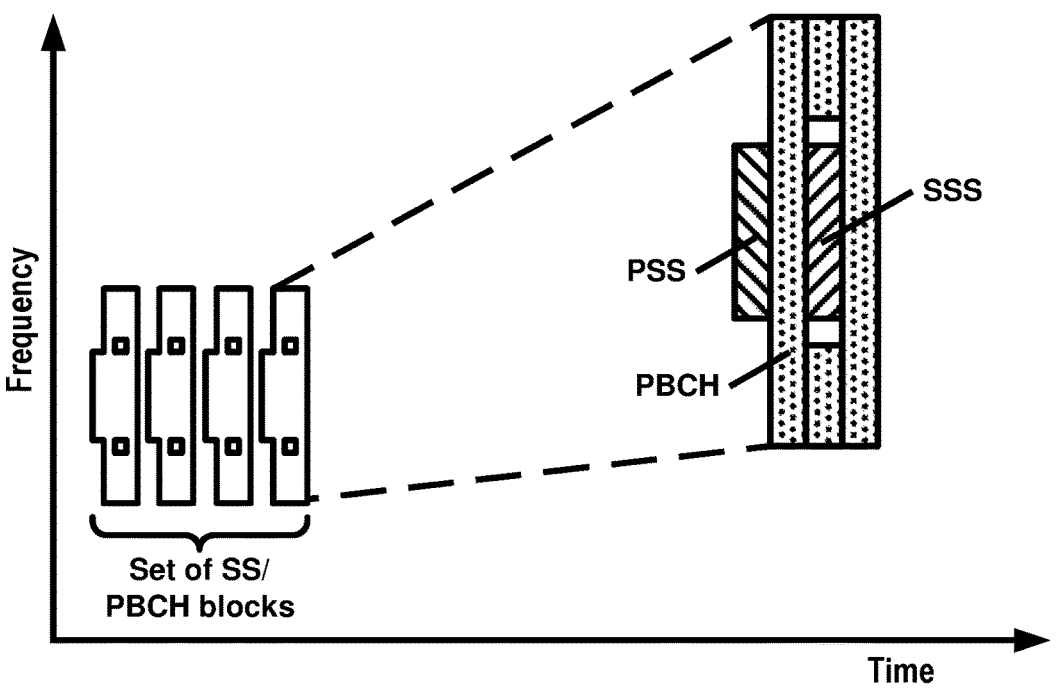
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
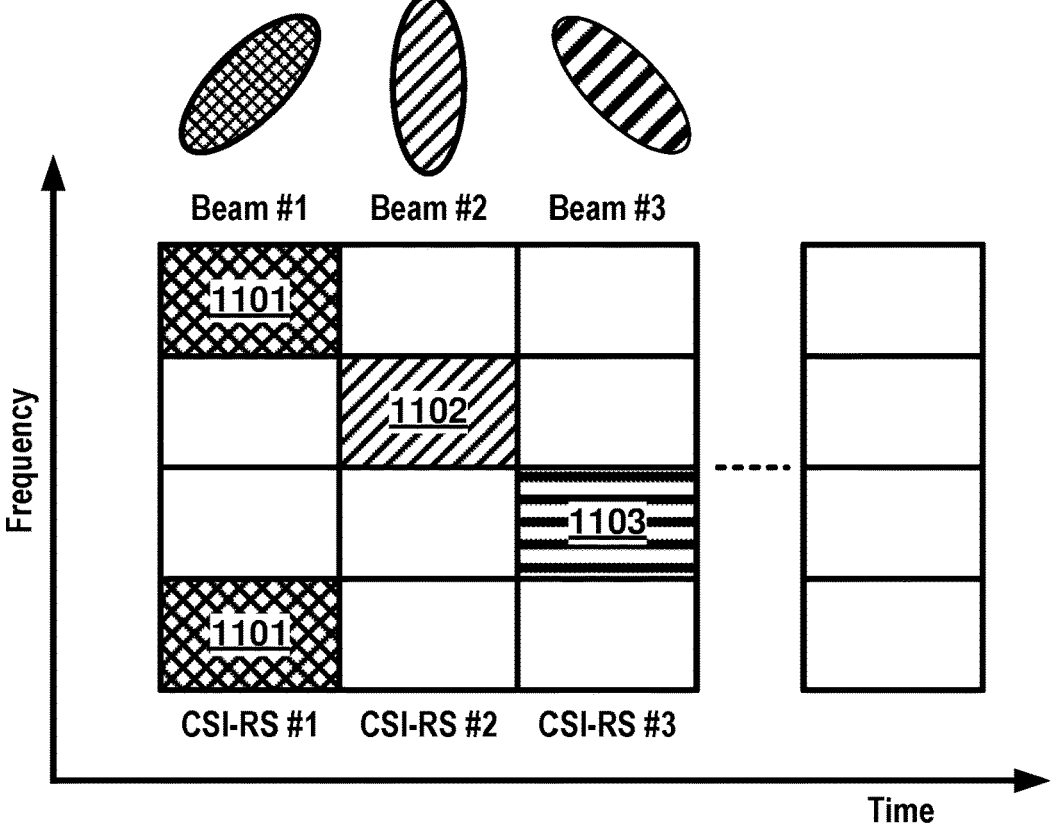
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
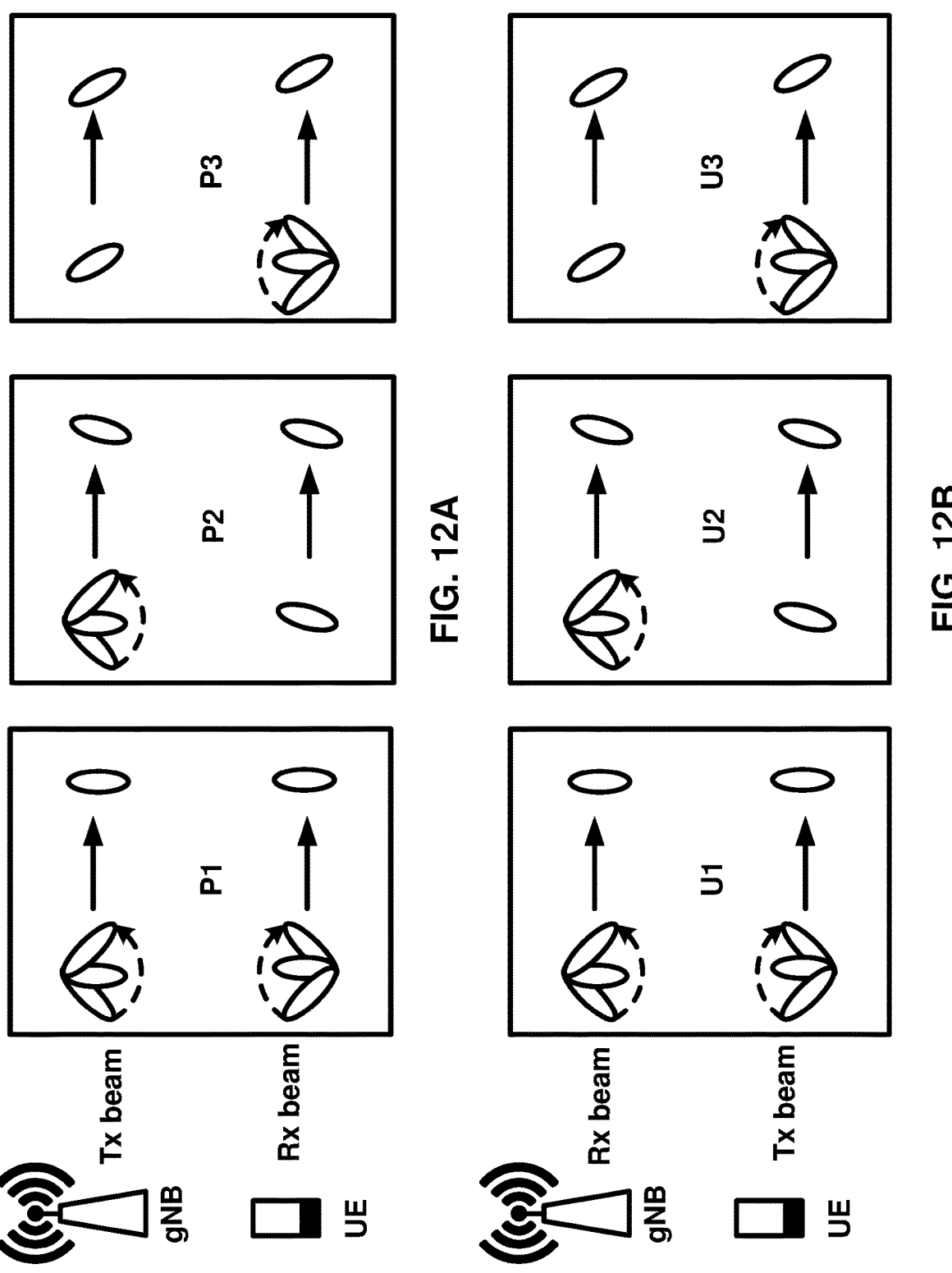
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
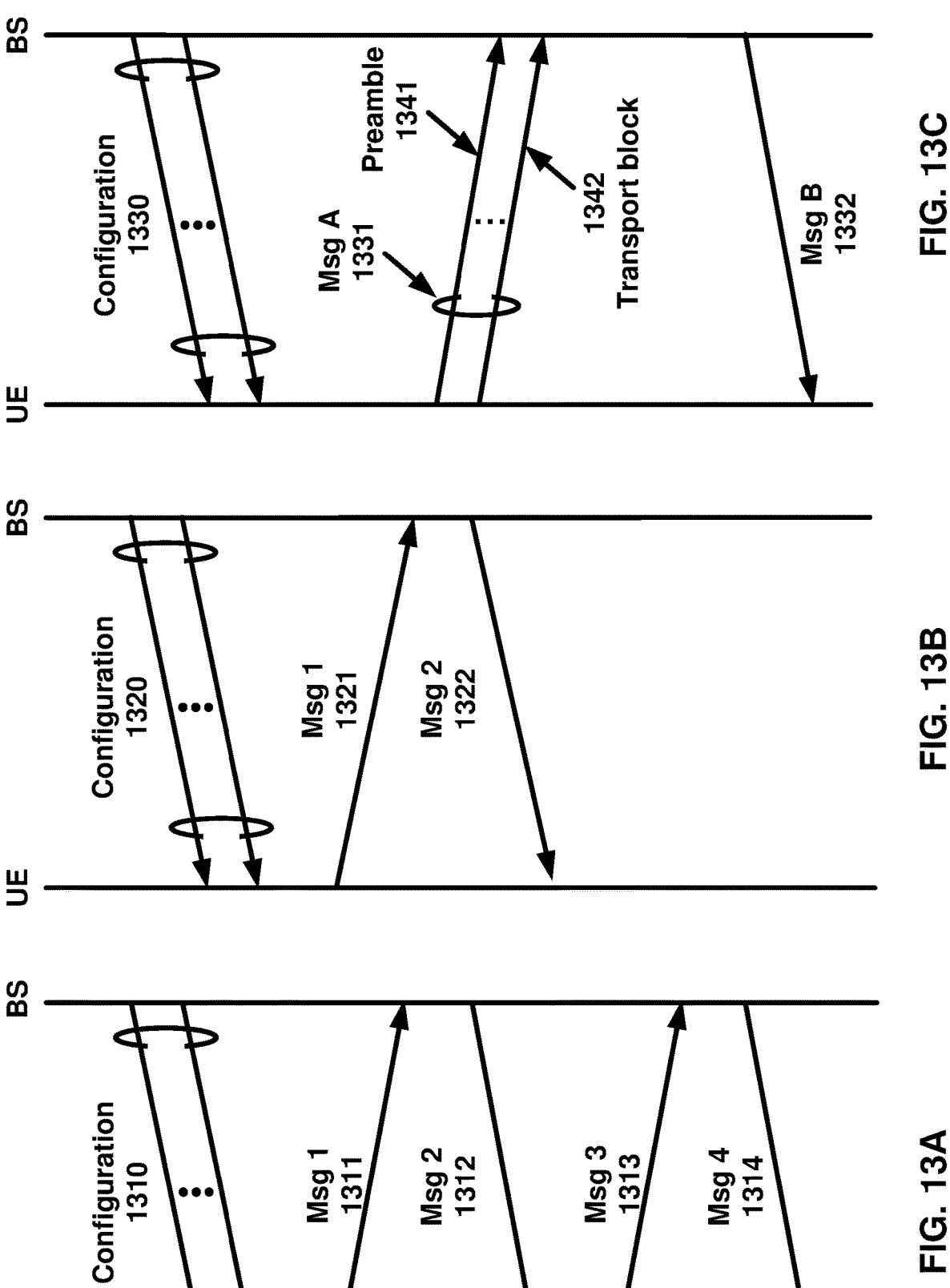
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id,$$ where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
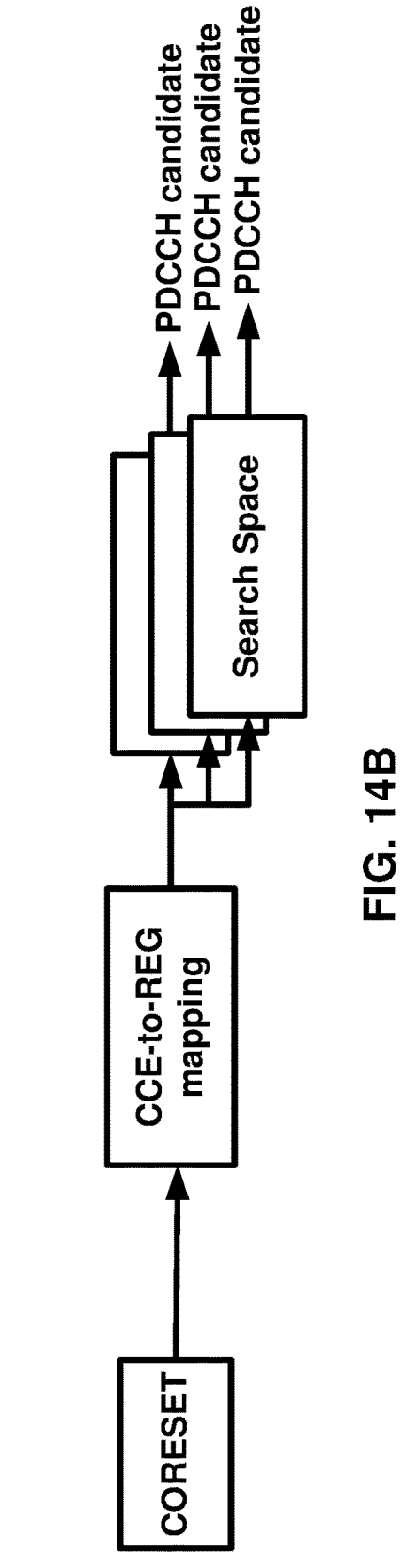
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
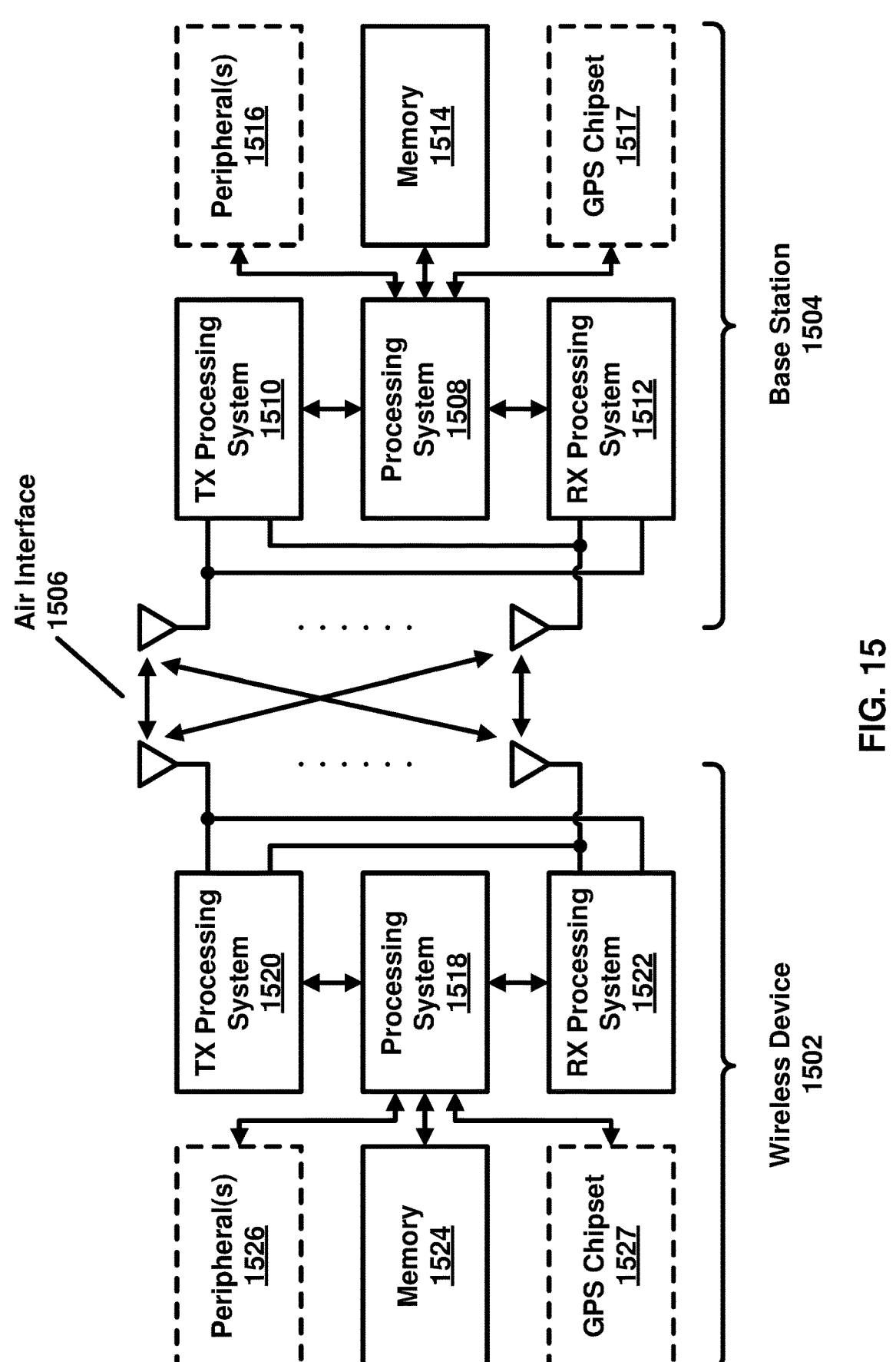
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
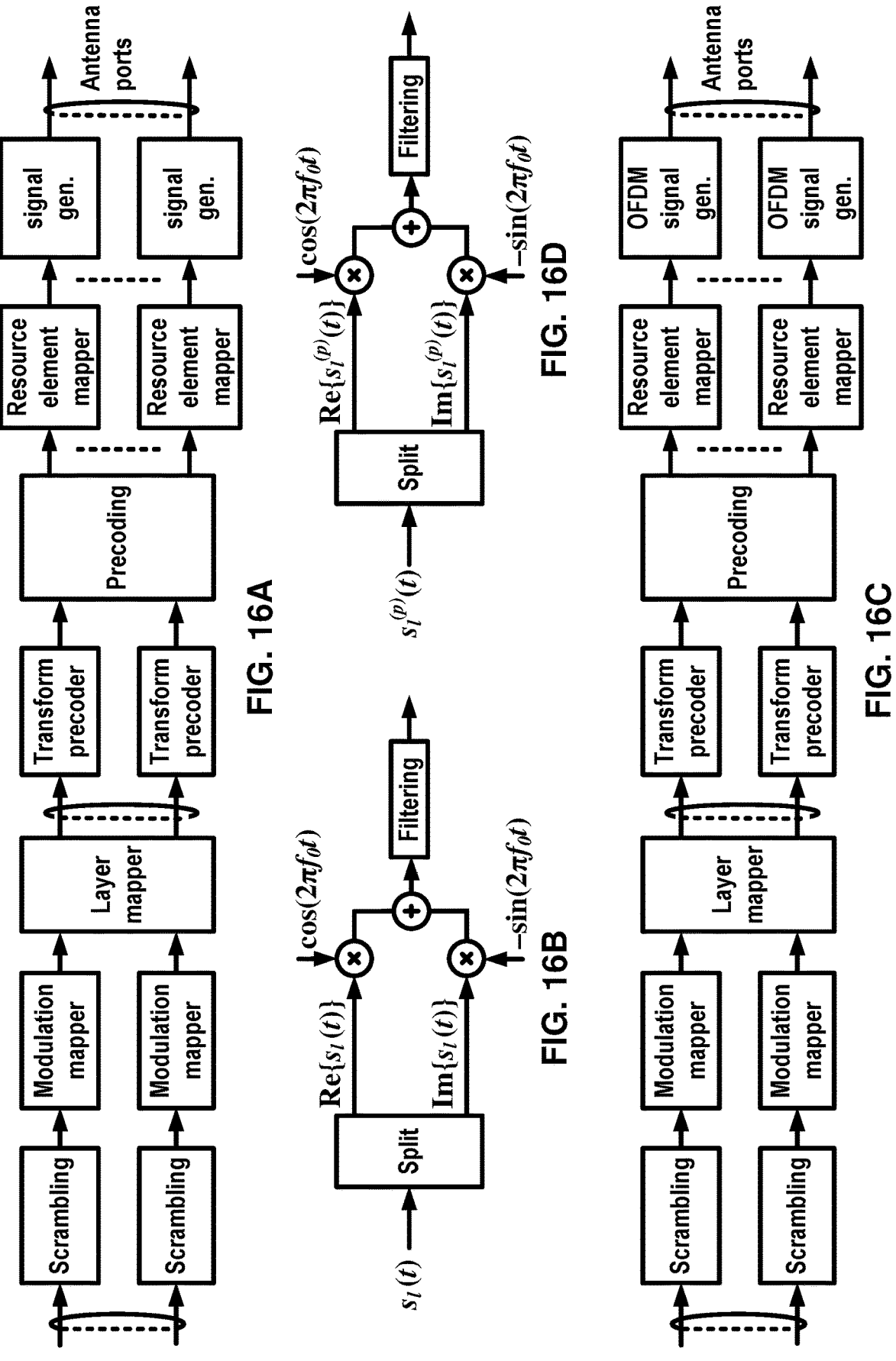
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may receive, e.g., from a base station, one or more messages comprising one or more configuration parameters for a cell.

The one or more configuration parameters may indicate an SRS resource set. The one or more configuration parameters may indicate, for the SRS resource set, a codebook (or a non-codebook). The wireless device may receive a DCI (e.g., DCI format 0-1, DCI format 0-2) scheduling a transport block (e.g., PUSCH transmission).

In an example, the SRS resource set may comprise a plurality of SRS resources. The DCI may comprise a TCI field (or an SRI field) indicating an SRS resource among the plurality of SRS resources. The DCI may comprise the TCI field (or the SRI field), for example, based on the SRS resource set comprising the plurality of SRS resources. The wireless device may transmit the transport block with a spatial domain transmission filter (e.g., transmitting beam). The wireless device may determine the spatial domain transmission filter based on the SRS resource indicated by the DCI.

In an example, the SRS resource set may comprise a single SRS resource. The DCI may not comprise a TCI field (or an SRI field), for example, based on the SRS resource set comprising the single SRS resource. The wireless device may transmit the transport block with a spatial domain transmission filter (e.g., transmitting beam). The wireless device may determine the spatial domain transmission filter based on the single SRS resource in the SRS resource set.

In an example, the one or more configuration parameters may not indicate an SRS resource set with a codebook (or non-codebook). The one or more configuration parameters may not comprise tci-PresentInDCI parameter for a coreset of the cell. The wireless device may receive, via the coreset, a DCI (e.g., DCI format 0-1, DCI format 0-2) scheduling a transport block (e.g., PUSCH transmission). The DCI may not comprise a TCI field, for example, based on the receiving the DCI via the coreset without the tci-PresentInDCI parameter. In the implementation of the existing behavior, the wireless device may transmit the transport block based on a single SRS resource in the SRS resource set. This may not be applicable, for example, when the SRS resource set is not configured. This may not be applicable, for example, when the wireless device receives the DCI via the coreset without the tci-PresentInDCI parameter. The wireless device may transmit the transport block with a spatial domain transmission filter that is unknown at the base station. This spatial domain transmission filter misalignment between the base station and the wireless device may result in decoding error of the transport block leading to increased error rate, increased retransmissions, and/or increased power consumption.

Example embodiments may reduce a spatial domain transmission filter misalignment between a base station and a wireless device when the wireless device receives, via a coreset of a downlink BWP of the cell, a DCI (e.g., DCI format 0-1, DCI format 0-2) scheduling a transport block via an uplink BWP of the cell. The DCI may not comprise a TCI field. The one or more configuration parameters may not comprise tci-PresentInDCI parameter for the coreset.

In an example embodiment, the wireless device may determine a spatial domain transmission filter based on a TCI state (or a spatial relation) of a PUCCH resource with a lowest/highest PUCCH resource index in the uplink BWP of the cell.

In an example embodiment, the wireless device may determine a spatial domain transmission filter based on a TCI state of the coreset that the wireless device receives the DCI.

In an example embodiment, the wireless device may determine a spatial domain transmission filter based on a TCI state of a coreset with a lowest coreset index in the downlink BWP of the cell.

The one or more configuration parameters may indicate a plurality of TCI states. The wireless device may receive an activation command (e.g., MAC-CE) activating/updating/indicating one or more activated TCI states among/of the plurality of TCI state. The wireless device may map the one or more activated TCI states to one or more TCI codepoints. A TCI codepoint may be a series of one or more bits that represent (e.g., correspond to, identify, etc.) a TCI state. The wireless device may map each activated TCI state of the one or more activated TCI states to a respective TCI codepoint of the one or more TCI codepoints. In an example embodiment, the wireless device may determine a spatial domain transmission filter based on a TCI state with a lowest/highest TCI state index among the one or more activated TCI states. In an example embodiment, the wireless device may determine a spatial domain transmission filter based on a TCI state indicated by a lowest/highest TCI codepoint among the one or more TCI codepoints.

Implementation of the example embodiments may result in reduced error rate, reduced retransmissions, and/or reduced power consumption.

A wireless device may receive, e.g., from a base station, one or more messages comprising one or more configuration parameters for a cell.

The one or more configuration parameters may indicate one or more power control parameter sets (e.g., SRI-PUSCH-PowerControl).

The one or more configuration parameters may indicate an SRS resource set. The one or more configuration parameters may indicate, for the SRS resource set, a codebook (or a non-codebook). The wireless device may receive a DCI (e.g., DCI format 0-1, DCI format 0-2) scheduling a transport block (e.g., PUSCH transmission).

In an example, the SRS resource set may comprise a plurality of SRS resources. The DCI may comprise a TCI field (or an SRI field) indicating a power control parameter set among the one or more power control parameter sets. The DCI may comprise the TCI field (or the SRI field), for example, based on the SRS resource set comprising the plurality of SRS resources. The wireless device may transmit the transport block with a transmission power. The wireless device may determine the transmission power based on the power control parameter set indicated by the DCI. The wireless device may determine the transmission power based on a pathloss reference signal mapped to the power control parameter set.

In an example, the SRS resource set may comprise a single SRS resource. The DCI may not comprise a TCI field (or an SRI field), for example, based on the SRS resource set comprising the single SRS resource. The wireless device may transmit the transport block with a transmission power. The wireless device may determine the transmission power based on a power control parameter set, among the one or more power control parameter sets, indicated/identified by a power control parameter set index that is equal to zero (e.g., SRI-PUSCH-PowerControl-Id=0). The wireless device may determine the transmission power based on the power control parameter set, for example, in response to the DCI not comprising the TCI field (or the SRI field). The wireless device may determine the transmission power based on a pathloss reference signal mapped to the power control parameter set.

In an example, the one or more configuration parameters may not indicate one or more power control parameter sets (e.g., SRI-PUSCH-PowerControl). The one or more configuration parameters may not comprise tci-PresentInDCI parameter for a coreset of the cell. The wireless device may receive, via the coreset, a DCI (e.g., DCI format 0-1, DCI format 0-2) scheduling a transport block (e.g., PUSCH transmission). The DCI may not comprise a TCI field, for example, based on the receiving the DCI via the coreset without the tci-PresentInDCI parameter. In the implementation of the existing behavior, the wireless device may transmit the transport block based on a power control parameter sets with a power control parameter set index that is equal to zero. This may not be applicable, for example, when one or more power control parameter sets are not configured. This may not be applicable, for example, when the wireless device receives the DCI via the coreset without the tci-PresentInDCI parameter. The wireless device may transmit the transport block with a transmission power determined based on a pathloss reference signal that is unknown at the base station. This pathloss reference signal misalignment between the base station and the wireless device may result in decoding error of the transport block leading to increased error rate, increased retransmissions, and/or increased power consumption.

Example embodiments may reduce a pathloss reference signal misalignment between a base station and a wireless device when the wireless device receives, via a coreset of a downlink BWP of the cell, a DCI (e.g., DCI format 0-1, DCI format 0-2) scheduling a transport block via an uplink BWP of the cell. The DCI may not comprise a TCI field. The one or more configuration parameters may not comprise tci-PresentInDCI parameter for the coreset.

In an example embodiment, the wireless device may determine a transmission power based on a TCI state (or a spatial relation) of a PUCCH resource with a lowest/highest PUCCH resource index in the uplink BWP of the cell.

In an example embodiment, the wireless device may determine a transmission power based on a TCI state of the coreset that the wireless device receives the DCI.

In an example embodiment, the wireless device may determine a transmission power based on a TCI state of a coreset with a lowest coreset index in the downlink BWP of the cell.

The one or more configuration parameters may indicate a plurality of TCI states. The wireless device may receive an activation command (e.g., MAC-CE) activating/updating/indicating one or more activated TCI states among/of the plurality of TCI state. The wireless device may map the one or more activated TCI states to one or more TCI codepoints. The wireless device may map each activated TCI state of the one or more activated TCI states to a respective TCI codepoint of the one or more TCI codepoints. In an example embodiment, the wireless device may determine a transmission power based on a TCI state with a lowest/highest TCI state index among the one or more activated TCI states. In an example embodiment, the wireless device may determine a transmission power based on a TCI state indicated by a lowest/highest TCI codepoint among the one or more TCI codepoints.

Determining a transmission power based on a TCI state may comprise determining the transmission power based on a pathloss reference signal associated with the TCI state.

Implementation of the example embodiments may result in reduced error rate, reduced retransmissions, and/or reduced power consumption.

In an example, a wireless device may determine/calculate/compute a transmission power (e.g., for a PUSCH transmission) in a PUSCH transmission occasion i on an active uplink BWP b of carrier f of a serving cell c and with a PUSCH power control adjustment state with index l, for example, based on the equation below:

43 44

$$P_{PUSCH,b,f,c}(i, j, q_d, l) =$$

$$\min \begin{cases} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{cases} [dBm],$$

where $P_{CMAX,f,c}(j)$ is the UE configured maximum output power for carrier f of serving cell C in PUSCH transmission occasion i.

$P_{O\_PUSCH,b,f,c}(j)$ is a parameter composed of the sum of a component $P_{O\_NOMINALPUSCH,f,c}(j)$ and a component $P_{O\_UE\_PUSCH,b,f,c}(j)$ $$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is a SCS configuration $PL_{b,f,c}(q_d)$ is a downlink pathloss estimate in dB calculated by the UE using reference signal (RS) index $q_d$ for the active DL BWP of carrier f of serving cell c $$\Delta_{TF,b,f,c}(i) = 10\log_{10}\left(\left(2^{BPREK_s} - 1\right) \cdot \beta_{offset}^{PUSCH}\right)$$

for $K_s=1.25$ and $\Delta_{TF,b,f,c}(i)=0$ for $K_S=0$ where $K_s$ is provided by deltaMCS for each UL BWP b of each carrier f and serving cell c. If the PUSCH transmission is over more than one layer, $\Delta_{TF,b,f,c}(i)=0$.

$$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for active UL BWP b of carrier f of serving cell c and PUSCH transmission occasion i.

Figure 17:
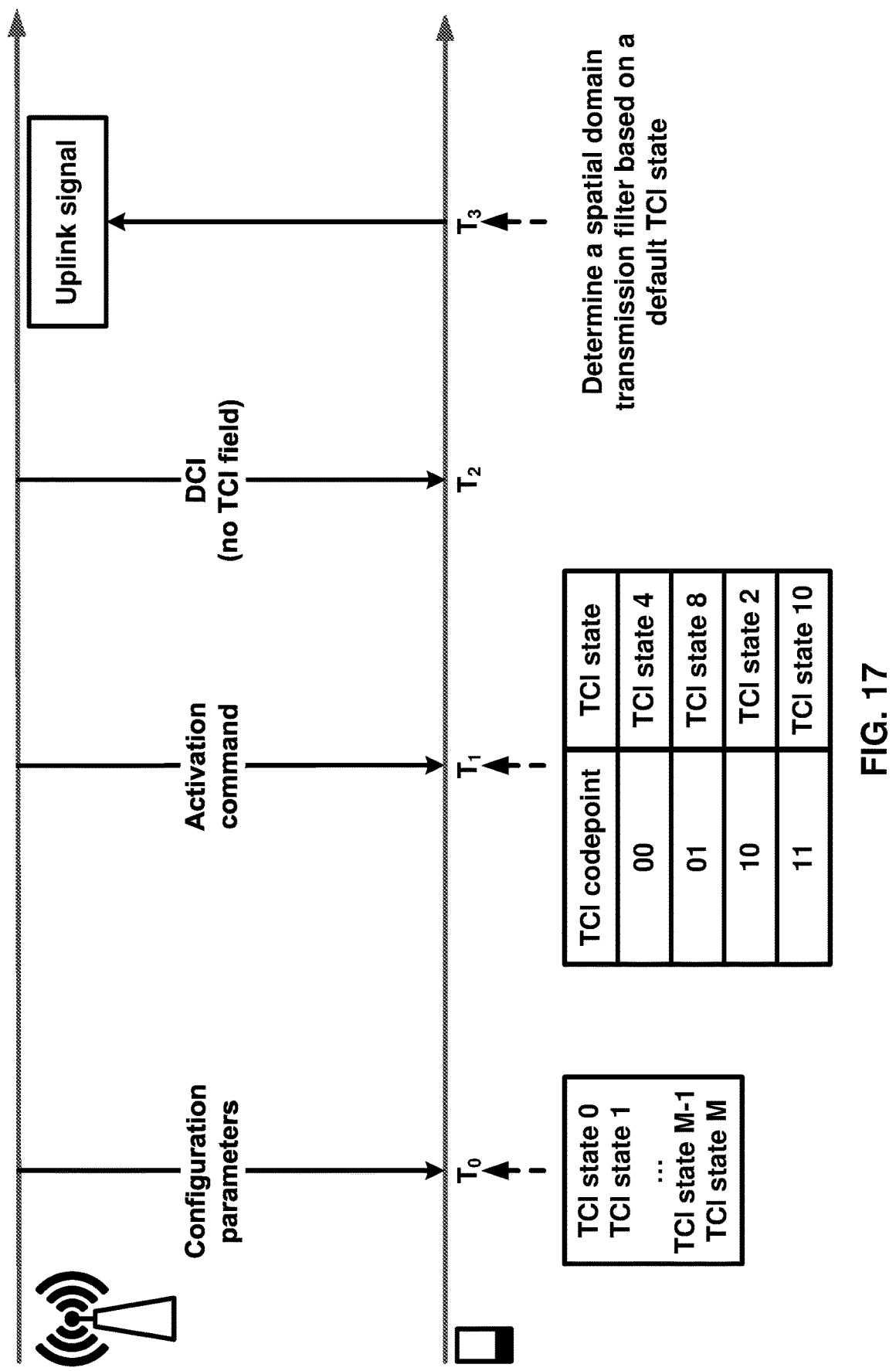
FIG. 17 illustrates an example of a default transmitting beam determination as per an aspect of an embodiment of the present disclosure.

FIG. 17 illustrates an example of a default transmitting beam determination as per an aspect of an embodiment of the present disclosure.

Figure 20:
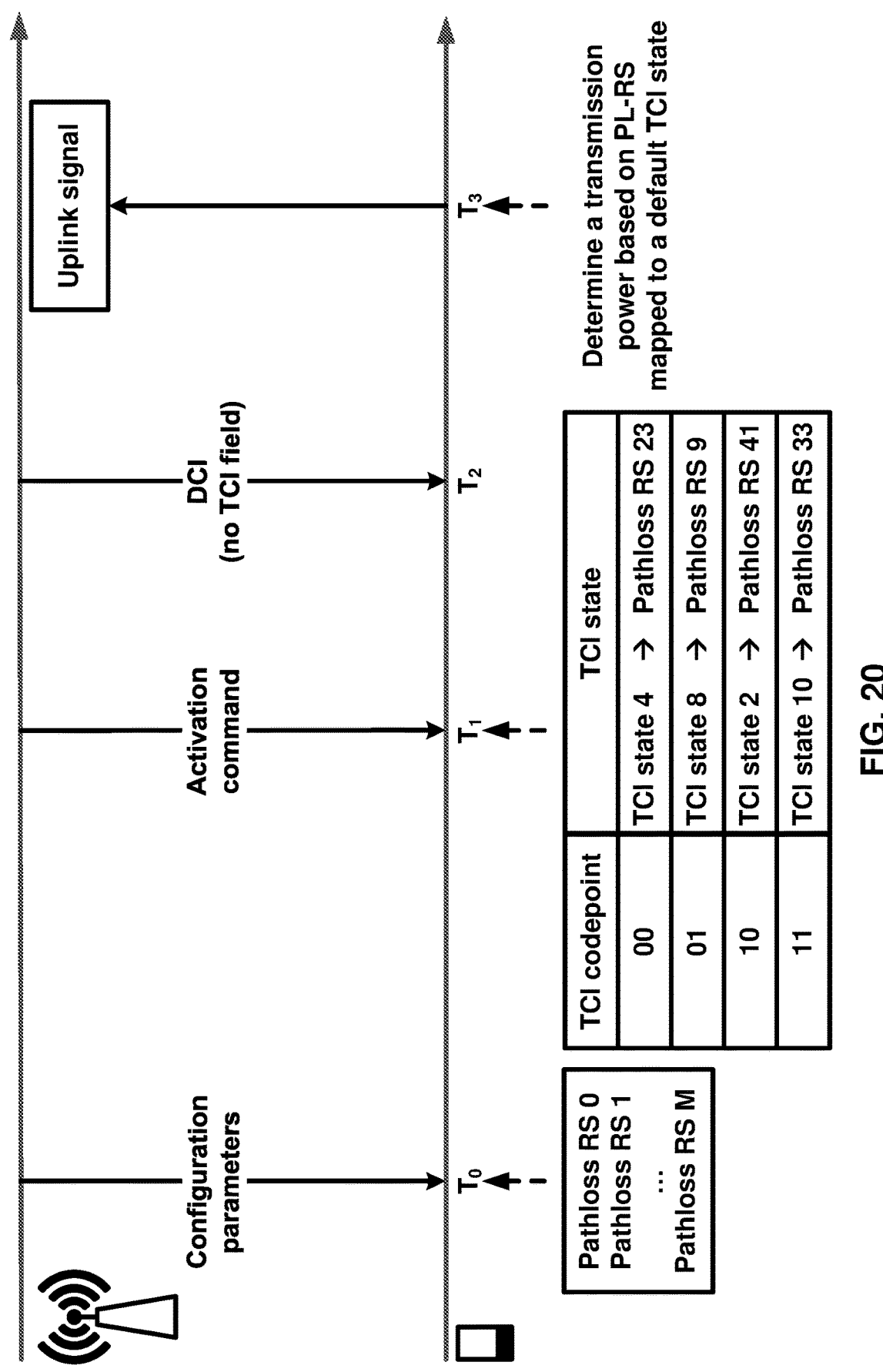
FIG. 20 illustrates an example of a default pathloss reference signal determination as per an aspect of an embodiment of the present disclosure.

FIG. 20 illustrates an example of a default pathloss reference signal determination as per an aspect of an embodiment of the present disclosure.

In an example, a wireless device may receive one or more messages (e.g., at time TO in FIG. 17 and FIG. 20). In an example, the wireless device may receive the one or more messages from a base station. The one or more messages may comprise one or more configuration parameters (e.g., Configuration parameters at time TO in FIG. 17 and FIG. 20). In an example, the one or more configuration parameters may be RRC configuration parameter(s). In an example, the one or more configuration parameters may be RRC reconfiguration parameter(s). In an example, the one or more configuration parameters may be one or more dedicated configuration parameters (e.g., not shared/used among/by a plurality of wireless devices). In an example, the one or more configuration parameters may be one or more broadcast configuration parameters (e.g., shared/used among/by a plurality of wireless devices).

In an example, the one or more configuration parameters may be for a cell. In an example, at least one configuration parameter of the one or more configuration parameters may be for a cell. In an example, the cell may be a primary cell (PCell). In an example, the cell may be a secondary cell (SCell). The cell may be a secondary cell configured with PUCCH (e.g., PUCCH SCell). In an example, the cell may be an unlicensed cell, e.g., operating in an unlicensed band. In an example, the cell may be a licensed cell, e.g., operating in a licensed band. In an example, the cell may operate in a first frequency range (FR1). The FR1 may, for example, comprise frequency bands below 6 GHz. In an example, the cell may operate in a second frequency range (FR2). The FR2 may, for example, comprise frequency bands from 24 GHz to 52.6 GHz. In an example, the cell may operate in a third frequency range (FR3). The FR3 may, for example, comprise frequency bands from 52.6 GHz to 71 GHz. The FR3 may, for example, comprise frequency bands starting from 52.6 GHz.

In an example, the wireless device may perform uplink transmissions (e.g., PUSCH, PUCCH, SRS) via the cell in a first time and in a first frequency. The wireless device may perform downlink receptions (e.g., PDCCH, PDSCH) via the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode. In an example, the wireless device may be in an RRC idle mode. In an example, the wireless device may be in an RRC inactive mode.

In an example, the cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, in the active state of an uplink BWP of the one or more uplink BWPs, the wireless device may transmit an uplink signal/channel (e.g., PUCCH, preamble, PUSCH, PRACH, SRS, etc) on/via the uplink BWP. In an example, in the inactive state of an uplink BWP of the one or more uplink BWPs, the wireless device may not transmit an uplink signal/channel (e.g., PUCCH, preamble, PUSCH, PRACH, SRS, etc) on/via the uplink BWP.

In an example, the wireless device may activate the downlink BWP of the one or more downlink BWPs of the cell. In an example, the activating the downlink BWP may comprise that the wireless device sets (or switches to) the downlink BWP as an active downlink BWP of the cell. In an example, the activating the downlink BWP may comprise that the wireless device sets the downlink BWP in the active state. In an example, the activating the downlink BWP may comprise switching the downlink BWP from the inactive state to the active state.

In an example, the wireless device may activate the uplink BWP of the one or more uplink BWPs of the cell. In an example, the activating the uplink BWP may comprise that the wireless device sets (or switches to) the uplink BWP as an active uplink BWP of the cell. In an example, the activating the uplink BWP may comprise that the wireless device sets the uplink BWP in the active state. In an example, the activating the uplink BWP may comprise switching the uplink BWP from the inactive state to the active state.

In an example, the one or more configuration parameters may be for the (active) downlink BWP of the cell. In an example, at least one configuration parameter of the one or more configuration parameters may be for the downlink BWP of the cell.

In an example, the one or more configuration parameters may be for the (active) uplink BWP of the cell. In an example, at least one configuration parameter of the one or more configuration parameters may be for the uplink BWP of the cell.

In an example, the one or more configuration parameters may indicate one or more coresets. The one or more configuration parameters may indicate the one or more coresets for the (active) downlink BWP of the cell. The (active) downlink BWP may comprise the one or more coresets.

In an example, the one or more configuration parameters may indicate one or more coreset indexes/identifiers/indicators (e.g., provided by a higher layer parameter Control-ResourceSetId) for the one or more coresets. In an example, each coreset of the one or more coresets may be identified/indicated by a respective coreset index of the one or more coreset indexes. In an example, a first coreset of the one or more coresets may be identified by a first coreset index of the one or more coreset indexes. A second coreset of the one or more coresets may be identified by a second coreset index of the one or more coreset indexes.

The one or more configuration parameters may comprise an enabling parameter (e.g., enableDefaultBeamPL, enableDefaultBeamPL-ForSRS, enableDefaultBeamPL-ForPUCCH, enableDefaultBeamPL-ForPUSCH0-0, enableDefaultBeamPL-ForPUSCH0-1, and the like). The enabling parameter may be present in the one or more configuration parameters. The enabling parameter may be set to "enabled". The one or more configuration parameters may indicate "enabled" for the enabling parameter. A value of the enabling parameter may indicate/be "enabled". The enabling parameter may be for the cell. The enabling parameter may enable determination/selection of a default spatial relation (e.g., spatial domain transmission filter/beam) for transmission of an uplink signal (e.g., SR, CSI, HARQ-ACK, UCI, PUCCH, PUSCH, SRS, transport block) via an uplink resource (e.g., PUCCH resource, SRS resource, PUSCH resource). The enabling parameter may enable determination/selection of a default pathloss reference signal for transmission of the uplink signal via the uplink resource. In an example, the wireless device may determine/select, for transmission of the uplink signal via the uplink resource, a default spatial relation and a default path loss reference signal based on the one or more configuration parameters comprising the enabling parameter that is set to "enabled. The wireless device may determine/select, for transmission of the uplink signal via the uplink resource, the default spatial relation and the default path loss reference signal based on the enabling parameter being present in the one or more configuration parameters.

In an example, the one or more configuration parameters may indicate/comprise a pathloss reference signal update parameter (e.g., enablePL-RS-UpdateForPUSCH-SRS, MAC-CE based pathloss reference signal update enabling parameter, and the like). The pathloss reference signal update parameter may enable MAC CE based pathloss reference signal update for at least one of: PUCCH, PUSCH and/or SRS transmissions. Based on the one or more configuration parameters indicating/comprising the pathloss reference signal update parameter, the wireless device may receive, e.g., from a base station, an activation command (e.g., PUSCH Pathloss Reference RS Update MAC CE, DCI, RRC) updating/indicating/activating/selecting a pathloss reference signal among/of a plurality of pathloss reference signals. The wireless device may not track radio link qualities of the plurality of pathloss reference signals, e.g., simultaneously. A number of the plurality of pathloss reference signals may be greater than a number of pathloss reference signals that the wireless device is capable of tracking. For example, the activation command may indicate/update a mapping between one or more pathloss reference signals of a plurality of pathloss reference signals and one or more power control parameter sets of a plurality of power control parameter sets (e.g., SRI PUSCH Power Control). For example, the activation command may update a mapping between a value of a power control parameter set index (e.g., sri-PUSCH-PowerControlId) identifying/indicating a power control parameter set and a value of a pathloss reference signal index (e.g., PUSCH-PathlossReferenceRS-Id) identifying/indicating a pathloss reference signal. The wireless device may map the power control parameter set to the pathloss reference signal, for example based on receiving the activation command updating the mapping between the power control parameter set and the pathloss reference signal. The plurality of pathloss reference signals may comprise the pathloss reference signal. The plurality of power control parameter sets may comprise the power control parameter set. A plurality of pathloss reference signal indexes, of the plurality of pathloss reference signals, may comprise the pathloss reference signal index. A plurality of power control parameter set indexes, of/associated with the plurality of power control parameter sets, may comprise the power control parameter set index.

In an example, the one or more configuration parameters may indicate a plurality of TCI states (e.g., provided by a higher layer parameter tci-StatesToAddModList in PDSCH_Config, PUSCH_Config, or PUCCH_Config, etc). In FIG. 17, the plurality of TCI states are TCI state 0, TCI state 1, . . . , TCI state M−1, and TCI state M.

In an example, the wireless device may receive an activation command (e.g., TCI States Activation/Deactivation for UE-specific PDSCH MAC CE, TCI States Activation/Deactivation for UE-specific PUSCH MAC CE, MAC-CE, DCI, control command, and the like at time T1 in FIG. 17 and FIG. 20) activating/selecting/indicating/updating one or more TCI states of the plurality of TCI states. The wireless device may map the one or more TCI states to one or more TCI codepoints. The mapping the one or more TCI states to the one or more TCI codepoints may comprise grouping the one or more TCI states into/in the one or more TCI codepoints. Each TCI codepoint of the one or more TCI codepoints may comprise/indicate at least one TCI state of the one or more TCI states. A TCI field in a DCI may be equal to a TCI codepoint of the one or more TCI codepoints. In FIG. 17 and FIG. 20, the one or more TCI states are TCI state 4, TCI state 8, TCI state 2, and TCI state 10. The one or more TCI codepoints are TCI codepoint 00, TCI codepoint 01, TCI codepoint 10, and TCI codepoint 11. The TCI codepoint 00 may indicate TCI state 4, the TCI codepoint 01 may indicate TCI state 8, the TCI codepoint 10 may indicate TCI state 2, and the TCI codepoint 11 may indicate TCI state 10. The TCI codepoint 00 may be mapped to TCI state 4, the TCI codepoint 01 may be mapped to TCI state 8, the TCI codepoint 10 may be mapped to TCI state 2, and the TCI codepoint 11 may be mapped to TCI state 10.

For example, the plurality of TCI states may be for (decoding) PDSCH of/for the cell. The one or more configuration parameters may indicate the plurality of TCI states for decoding PDSCH of/for the downlink BWP of the cell. For example, the one or more TCI states may be for (decoding) PDSCH of/for the cell. The activation command may indicate/activate/update/select the one or more TCI states for decoding PDSCH of/for the downlink BWP of the cell.

For example, the plurality of TCI states may be for transmission of uplink signals (e.g., UCI, PUSCH, SRS, PUCCH, transport block, SR, CSI, HARQ-ACK) of/for/on/via an uplink resource (e.g., PUSCH resource, PUCCH resource, SRS resource) of the cell. The one or more configuration parameters may indicate the plurality of TCI states for transmission of the uplink signals of/for/on/via the uplink resource of the uplink BWP of the cell. For example, the one or more TCI states may be for transmission of uplink signals (e.g., UCI, PUSCH, SRS, PUCCH, transport block, SR, CSI, HARQ-ACK) of/for/on/via an uplink resource (e.g., PUSCH resource, PUCCH resource, SRS resource) of the cell. The activation command may indicate/activate/update/select the one or more TCI states for transmission of the uplink signals of/for/on/via the uplink resource of the uplink BWP of the cell.

In an example, the plurality of TCI states may be/comprise a plurality of downlink TCI states. The wireless device may use the plurality of downlink TCI states for reception/decoding of transport blocks (or PDSCH transmissions/receptions). The wireless device may use the plurality of downlink TCI states, for example, for reception/decoding of transport blocks (or PDSCH transmissions/receptions) scheduled for the downlink BWP of the cell. The wireless device may use the plurality of downlink TCI states, for example, for reception of downlink signals (e.g., PDSCH, PDCCH, DCI, transport block, and the like) via the downlink BWP of the cell. In an example, the one or more TCI states may be/comprise one or more downlink TCI states. The wireless device may use the one or more downlink TCI states for reception/decoding of transport blocks (or PDSCH transmissions/receptions). The wireless device may use the one or more downlink TCI states, for example, for reception/decoding of transport blocks (or PDSCH transmissions/receptions) scheduled for the downlink BWP of the cell. The wireless device may use the one or more downlink TCI states, for example, for reception of downlink signals (e.g., PDSCH, PDCCH, DCI, transport block, and the like) via the downlink BWP of the cell.

In an example, the plurality of TCI states may be/comprise a plurality of uplink TCI states. The wireless device may use the plurality of uplink TCI states for transmission of transport blocks (or PUSCH transmissions). The wireless device may use the plurality of uplink TCI states, for example, for transmission of transport blocks (or PUSCH transmissions) scheduled for the uplink BWP of the cell. The wireless device may use the plurality of uplink TCI states, for example, for transmission of uplink signals (e.g., PUSCH, PUCCH, UCI, transport block, SRS and the like) via the uplink BWP of the cell. In an example, the one or more TCI states may be/comprise one or more uplink TCI states. The wireless device may use the one or more uplink TCI states for transmission of transport blocks (or PUSCH transmissions/receptions). The wireless device may use the one or more uplink TCI states for transmission of transport blocks (or PUSCH transmissions/receptions) scheduled for the uplink BWP of the cell. The wireless device may use the one or more uplink TCI states, for example, for transmission of uplink signals (e.g., PUSCH, PUCCH, UCI, transport block, SRS and the like) via the uplink BWP of the cell.

In an example, the plurality of TCI states may be/comprise a plurality of common/joint TCI states. The wireless device may use the plurality of common/joint TCI states, for example, for reception of downlink signals (e.g., PDSCH, PDCCH, DCI, transport block, and the like) via the downlink BWP of the cell. The wireless device may use the plurality of common/joint TCI states, for example, for transmission of uplink signals (e.g., PUSCH, PUCCH, UCI, transport block, SRS and the like) via the uplink BWP of the cell. In an example, the one or more TCI states may be/comprise one or more common/joint TCI states. The wireless device may use the one or more common/joint TCI states, for example, for reception of downlink signals (e.g., PDSCH, PDCCH, DCI, transport block, and the like) via the downlink BWP of the cell. The wireless device may use the one or more common/joint TCI states, for example, for transmission of uplink signals (e.g., PUSCH, PUCCH, UCI, transport block, SRS and the like) via the uplink BWP of the cell.

In an example, the one or more configuration parameters may indicate a plurality of pathloss reference signals (e.g., provided by a higher layer parameter pathlossReferenceRSs, PUSCH-PathlossReferenceRS, PUCCH-PathlossReferenceRS, SRS-PathlossReferenceRS, etc). In FIG. 20, the plurality of pathloss reference signals are Pathloss RS 0, Pathloss RS 1, . . . , Pathloss RS M−1, and Pathloss RS state M.

The one or more TCI states may indicate (or be associated with or be mapped to) one or more pathloss reference signals. The plurality of pathloss reference signals may comprise the one or more pathloss reference signals. Each TCI state of the one or more TCI states may indicate (or be associated with or be mapped to) a respective pathloss reference signal of the one or more pathloss reference signals. For example, in FIG. 20, the one or more pathloss reference signals are Pathloss RS 23, Pathloss RS 9, Pathloss RS 41, and Pathloss RS 33. The TCI state 4 indicates (or is associated with or is mapped to) Pathloss RS 23. The TCI state 8 indicates (or is associated with or is mapped to) Pathloss RS 9. The TCI state 2 indicates (or is associated with or is mapped to) Pathloss RS 41. The TCI state 10 indicates (or is associated with or is mapped to) Pathloss RS 33.

A TCI state indicating (or being associated with or being mapped to) a pathloss reference signal may comprise the TCI state comprising a reference signal index/identifier/indicator identifying/indicating the pathloss reference signal. The TCI state may comprise/have/indicate the pathloss reference signal. The one or more configuration parameters may indicate, for the TCI state, the reference signal index/identifier/indicator identifying/indicating the pathloss reference signal. The pathloss reference signal may be same as a reference signal indicated by the TCI state. The TCI state may indicate/comprise/have the reference signal. The reference signal index/identifier/indicator may identify/indicate the reference signal. The wireless device may use the reference signal indicated by the TCI state as the pathloss reference signal. The wireless device may use the reference signal indicated by the TCI state as a downlink pathloss estimate The reference signal may be, for example, periodic. The one or more configuration parameters may indicate, for the reference signal, a periodicity. The one or more TCI states may comprise the TCI state. The one or more pathloss reference signals may comprise the pathloss reference signal.

A TCI state indicating (or being associated with or being mapped to) a pathloss reference signal may comprise the TCI state comprising an index/identifier/indicator indicating (or mapped to or associated with) the pathloss reference signal. The index/identifier/indicator may be, for example, a power control parameter set index (e.g., sri-PUSCH-PowerControlId) identifying/indicating a power control parameter set (e.g., sri-PUSCH-PowerControl). The power control parameter set may indicate (or be mapped to) the pathloss reference signal. The power control parameter set may, for example, comprise a pathloss reference signal index/identifier/indicator identifying/indicating the pathloss reference signal. The one or more configuration parameters may indicate, for the power control parameter set, the pathloss reference signal index/identifier/indicator identifying/indicating the pathloss reference signal. The power control parameter set may, for example, comprise/have/indicate the pathloss reference signal. The one or more configuration parameters may indicate, for the power control parameter set, the pathloss reference signal. The one or more TCI states may comprise the TCI state. The one or more pathloss reference signals may comprise the pathloss reference signal.

In an example, the one or more configuration parameters may indicate one or more TCI state indexes/identifiers/indicators (e.g., provided by a higher layer parameter TCI-StateId) for the one or more TCI states. In an example, each TCI state of the one or more TCI states may be identified/indicated by a respective TCI state index of the one or more TCI state indexes. In an example, a first TCI state of the one or more TCI states may be identified by a first TCI state index of the one or more TCI state indexes. A second TCI state of the one or more TCI states may be identified by a second TCI state index of the one or more TCI state indexes.

In an example, the one or more configuration parameters may indicate one or more pathloss reference signal indexes/identifiers/indicators (e.g., provided by a higher layer parameter PathlossReferenceRS-Id, PUSCH-PathlossReferenceRS-Id, PUCCH-PathlossReferenceRS-Id, SRS-PathlossReferenceRS-Id, and the like) for the one or more pathloss reference signals. In an example, each pathloss reference signal of the one or more pathloss reference signals may be identified/indicated by a respective pathloss reference signal index of the one or more pathloss reference signal indexes. In an example, a first pathloss reference signal of the one or more pathloss reference signals may be identified by a first pathloss reference signal index of the one or more pathloss reference signal indexes. A second pathloss reference signal of the one or more pathloss reference signals may be identified by a second pathloss reference signal index of the one or more pathloss reference signal indexes.

The wireless device may transmit an uplink signal (e.g., at time T3 in FIG. 17 and FIG. 20). The wireless device may transmit, via the active uplink BWP of the cell, the uplink signal. The wireless device may transmit, via an uplink resource, the uplink signal. The active uplink BWP of the cell may comprise the uplink resource.

The uplink signal may be, for example, a PUSCH transmission. The PUSCH transmission may comprise/carry/indicate a transport block (or an uplink data). The PUSCH transmission may comprise/carry/indicate a CSI report (e.g., aperiodic CSI report, semi-persistent CSI report). The uplink resource may be/comprise a PUSCH resource.

The uplink signal may be, for example, a PUCCH transmission. The PUCCH transmission may comprise/carry/indicate an uplink control information (UCI). The UCI may be/comprise, for example, a scheduling request. The UCI may be/comprise, for example, a HARQ-ACK information bit (or a HARQ-ACK codebook). The UCI may be/comprise, for example, a CSI report (e.g., periodic CSI report, semi-persistent CSI report). The uplink resource may be/comprise a PUCCH resource.

The uplink signal may be, for example, an SRS transmission (or an SRS). The uplink resource may be/comprise an SRS resource.

The wireless device may transmit the uplink signal based on a selected/default TCI state.

The one or more TCI states may, for example, comprise the selected/default TCI state. The wireless device may transmit the uplink signal based on the selected/default TCI state among/of the one or more TCI states.

The wireless device may transmit the uplink signal based on the selected/default TCI state, for example, based on the one or more configuration parameters not indicating at least one spatial relation (e.g., PUCCH-SpatialRelationInfo, spatialRelationInfo, and the like). The wireless device may transmit the uplink signal based on the selected/default TCI state, for example, based on the one or more configuration parameters not indicating, for the uplink resource, a spatial relation. The wireless device may transmit the uplink signal based on the selected/default TCI state, for example, based on not receiving a MAC-CE indicating, for the uplink resource, a spatial relation.

In an example, the one or more configuration parameters may not indicate at least one pathloss reference signal (e.g., pathlossReferenceRSs, PUSCH-PathlossReferenceRS, PUCCH-PathlossReferenceRS, SRS-PathlossReferenceRS, and the like). The wireless device may transmit the uplink signal based on the selected/default TCI state, for example, based on the one or more configuration parameters not indicating the at least one pathloss reference signal.

The wireless device may transmit the uplink signal based on the selected/default TCI state, for example, based on the one or more configuration parameters comprising the enabling parameter. The wireless device may transmit the uplink signal based on the selected/default TCI state, for example, based on the enabling parameter being present in the one or more configuration parameters.

The wireless device may transmit the uplink signal based on the selected/default TCI state, for example, based on the one or more configuration parameters comprising the pathloss reference signal update parameter. The wireless device may transmit the uplink signal based on the selected/default TCI state, for example, based on the pathloss reference signal update parameter being present in the one or more configuration parameters.

In an example, the one or more configuration parameters may not indicate at least one uplink resource, for example, for the active uplink BWP of the cell. The at least one uplink resource may comprise/be, for example, at least one PUCCH resource. The at least one uplink resource may comprise/be, for example, at least one PUSCH resource. The at least one uplink resource may comprise/be, for example, at least one SRS resource. The wireless device may transmit the uplink signal based on the selected/default TCI state, for example, based on the one or more configuration parameters not indicating, for the active uplink BWP of the cell, the at least one uplink resource.

In an example, the one or more configuration parameters may indicate at least one uplink resource, for example, for the active uplink BWP of the cell. The at least one uplink resource may comprise/be, for example, at least one PUCCH resource. The at least one uplink resource may comprise/be, for example, at least one PUSCH resource. The at least one uplink resource may comprise/be, for example, at least one SRS resource. The at least one uplink resource may not be associated/provided with a spatial relation. Each uplink resource of the at least one uplink resource may not be associated/provided with a spatial relation. The wireless device may not receive a MAC-CE indicating/activating a spatial relation for each uplink resource of the at least one uplink resource. The wireless device may transmit the uplink signal based on the selected/default TCI state, for example, based on the at least one uplink resource not being associated/provided with a spatial relation. The wireless device may transmit the uplink signal based on the selected/default TCI state, for example, based on each uplink resource of the at least one uplink resource not being associated/provided with a spatial relation.

The wireless device may receive/detect, via a coreset of the one or more coresets, a DCI (e.g., at time T2 in FIG. 17 and FIG. 20).

The DCI may, for example, schedule the uplink signal (e.g., the PUSCH transmission). The DCI may indicate, for transmission of the uplink signal, the uplink resource.

The DCI may, for example, indicate activation of a configured uplink grant (e.g., Type 2 configured uplink grant or configured grant Type 2). The wireless device may activate the configured uplink grant, for example, based on receiving the DCI. The wireless device may transmit the uplink signal for the configured uplink grant. The DCI may indicate, for transmission of the uplink signal, the uplink resource. The one or more configuration parameters may indicate one or more configured uplink grants comprising the configured uplink grant (e.g., by a higher layer (or RRC) parameter ConfiguredGrantConfig)

The DCI may not comprise a TCI field (or a TCI codepoint).

The DCI may be, for example, a fallback DCI (e.g., DCI format 0_0). The DCI may not comprise the TCI field, for example, based on the DCI being the fallback DCI.

In an example, the one or more configuration parameters may not comprise, for the coreset that the wireless device receives/detects the DCI, a TCI parameter (e.g., tci-PresentInDCI). The TCI parameter may be absent in configuration parameter(s) of the coreset. The TCI parameter may indicate whether DCI(s) received via the coreset comprises a TCI field or not. The TCI parameter may indicate if a TCI field is present or absent in DCI(s) received via the coreset. The one or more configuration parameters not comprising, for the coreset, the TCI parameter may comprise DCI(s) received via the coreset not comprising a TCI field. The one or more configuration parameters not comprising, for the coreset, the TCI parameter may comprise a TCI field being absent in DCI(s) received via the coreset.

The DCI may be, for example, a non-fallback DCI (e.g., DCI format 0_1, DCI format 02, and DCI format 0_x, and the like). The DCI may not comprise the TCI field, for example, based on the one or more configuration parameters not comprising, for the coreset that the wireless device receives/detects the DCI, the TCI parameter.

The wireless device may transmit the uplink signal based on the selected/default TCI state, for example, based on the DCI not comprising the TCI field.

The wireless device may transmit the uplink signal based on the selected/default TCI state, for example, based on the one or more configuration parameters not comprising, for the coreset that the wireless device receives/detects the DCI, the TCI parameter. The wireless device may transmit the uplink signal based on the selected/default TCI state, for example, based on receiving/detecting, via the coreset without the TCI parameter, the DCI scheduling/activating the uplink signal (or transmission of the uplink signal).

The wireless device may transmit the uplink signal with/using a spatial domain transmission filter (e.g., at time T3 in FIG. 17). The wireless device may determine the spatial domain transmission filter (or a transmitting beam) based on the selected/default TCI state.

Transmitting the uplink signal based on the selected TCI state may comprise transmitting the uplink signal with/using the spatial domain transmission filter that is determined based on the selected TCI state.

The selected TCI state may indicate/comprise/have a reference signal (e.g., CSI-RS, SS/PBCH block, SRS, and the like). For example, the one or more configuration parameters may indicate, for the selected TCI state, the reference signal. For example, the wireless device may receive a MAC-CE indicating, for the selected TCI state, the reference signal. The selected TCI state may indicate/comprise/have a reference signal index/identifier/indicator identifying/indicating the reference signal. The one or more configuration parameters may indicate, for the selected TCI state, the reference signal index.

The wireless device may determine the spatial domain transmitting filter based on the reference signal indicated by the selected TCI state. The spatial domain transmitting filter may be the same (or substantially the same) as, for example, a spatial domain receiving filter used to receive the reference signal. The spatial domain transmitting filter used to transmit the uplink signal may be the same (or substantially the same) as, for example, a spatial domain transmitting filter used to transmit the reference signal.

In an example, transmitting the uplink signal based on the selected TCI state may comprise at least one DMRS antenna port of the uplink signal being quasi co-located with the reference signal indicated by the selected TCI state. The at least one DMRS antenna port of the uplink signal may be quasi co-located with the reference signal indicated by the selected TCI state, for example, with respect to a quasi co-location type (e.g., QCL TypeA, QCL TypeD, and the like) indicated by the selected TCI state.

The wireless device may transmit the uplink signal with/using a transmission power (e.g., at time T3 in FIG. 20). The wireless device may determine/calculate/compute the transmission power based on the selected/default TCI state.

Transmitting the uplink signal based on the selected TCI state may comprise transmitting the uplink signal with/using the transmission power that is determined based on the selected TCI state.

The selected TCI state may indicate (or be associated with or be mapped to) a pathloss reference signal. The one or more pathloss reference signals indicated by (or associated with or mapped to) the one or more TCI states may, for example, comprise the pathloss reference signal.

The wireless device may determine/calculate/compute the transmission power based on the pathloss reference signal indicated by (or associated with or mapped to) the selected TCI state.

Determining/computing/calculating, for transmission of the uplink signal, the transmission power based on the pathloss reference signal may comprise determining/computing/calculating, for the transmission power, a downlink pathloss estimate (or a pathloss measurement) based on one or more measurement qualities (or one or more radio link qualities) (e.g., L1-RSRP, L3-RSRP, or a higher filtered RSRP measurement(s)) of the pathloss reference signal. The wireless device may use the downlink pathloss estimate in determining/computing/calculating the transmission power for transmission of the uplink signal. The transmission power may comprise the downlink pathloss estimate. In an example, the wireless device may determine/calculate/compute/measure, for the downlink pathloss estimate, a filtered RSRP value (e.g., L1-RSRP, L3-RSRP) of the pathloss reference signal. The wireless device may determine/calculate/compute/measure the filtered RSRP value for transmission of the uplink signal.

The wireless device may determine/compute/calculate the transmission power based on one or more power terms (e.g., by adding/subtracting/multiplying/dividing/taking a logarithm, power, and any mathematical expression of the one or more power terms). The one or more power terms may comprise, for example, the pathloss reference signal (or the downlink pathloss estimate of the pathloss reference signal). The one or more power terms may comprise, for example, a target received power. The one or more power terms may comprise, for example, a pathloss compensation factor. The one or more power terms may comprise, for example, a closed-loop process number/index, and so on.

The wireless device may transmit the uplink signal based on the selected/default TCI state among/of the one or more TCI states, for example, in response to a TCI state index of the selected/default TCI state being lowest/highest among the one or more TCI state indexes of the one or more TCI states. The one or more TCI state indexes may comprise the TCI state index of the selected/default TCI state.

The wireless device may transmit the uplink signal based on the selected/default TCI state among/of the one or more TCI states, for example, in response to the one or more configuration parameters indicating, for the selected/default TCI state, a TCI state index that is lowest/highest among the one or more TCI state indexes of the one or more TCI states. The one or more TCI state indexes may comprise the TCI state index of the selected/default TCI state.

For example, in FIG. 17 and FIG. 20, a TCI state index of the TCI state 2 may be lowest/highest among a TCI state index of the TCI state 4, a TCI state index of the TCI state 8, a TCI state index of the TCI state 2, and a TCI state index of the TCI state 10. The selected/default TCI state may be the TCI state 2, for example, based on the TCI state index of the TCI state 2 being lowest/highest among the TCI state index of the TCI state 4, the TCI state index of the TCI state 8, the TCI state index of the TCI state 2, and the TCI state index of the TCI state 10.

For example, a TCI state index of the TCI state 10 may be lowest/highest among a TCI state index of the TCI state 4, a TCI state index of the TCI state 8, a TCI state index of the TCI state 2, and a TCI state index of the TCI state 10. The selected/default TCI state may be the TCI state 10, for example, based on the TCI state index of the TCI state 10 being lowest/highest among the TCI state index of the TCI state 4, the TCI state index of the TCI state 8, the TCI state index of the TCI state 2, and the TCI state index of the TCI state 10.

For example, a TCI state index of the TCI state 8 may be lowest/highest among a TCI state index of the TCI state 4, a TCI state index of the TCI state 8, a TCI state index of the TCI state 2, and a TCI state index of the TCI state 10. The selected/default TCI state may be the TCI state 8, for example, based on the TCI state index of the TCI state 2 being lowest/highest among the TCI state index of the TCI state 4, the TCI state index of the TCI state 8, the TCI state index of the TCI state 2, and the TCI state index of the TCI state 10.

The wireless device may transmit the uplink signal based on the selected/default TCI state among/of the one or more TCI states, for example, in response to a TCI codepoint indicating the selected/default TCI state being lowest/highest among the one or more TCI codepoints indicating the one or more TCI states. The one or more TCI codepoints may comprise the TCI codepoint indicating the selected/default TCI state.

The wireless device may transmit the uplink signal based on the selected/default TCI state among/of the one or more TCI states, for example, in response to the selected/default TCI state being indicated by a TCI codepoint that is lowest/highest among the one or more TCI codepoints. The one or more TCI codepoints may comprise the TCI codepoint indicating the selected/default TCI state. The one or more TCI codepoints may indicate the one or more TCI states.

The wireless device may transmit the uplink signal based on the selected/default TCI state among/of the one or more TCI states, for example, in response to the selected/default TCI state being indicated by a lowest/highest TCI codepoint among/in the one or more TCI codepoints.

For example, in FIG. 17 and FIG. 20, the TCI codepoint 00 may be lowest among the TCI codepoint 00, the TCI codepoint 01, the TCI codepoint 10, and the TCI codepoint 11. The selected/default TCI state may be the TCI state 4 indicated by the TCI codepoint 00, for example, based on the TCI codepoint 00 being lowest among the TCI codepoint 00, the TCI codepoint 01, the TCI codepoint 10, and the TCI codepoint 11.

For example, in FIG. 17 and FIG. 20, the TCI codepoint 11 may be highest among the TCI codepoint 00, the TCI codepoint 01, the TCI codepoint 10, and the TCI codepoint 11. The selected/default TCI state may be the TCI state 10 indicated by the TCI codepoint 11, for example, based on the TCI codepoint 11 being highest among the TCI codepoint 00, the TCI codepoint 01, the TCI codepoint 10, and the TCI codepoint 11.

In an example, the wireless device may monitor downlink control channels in the coreset that the wireless device receives/detects the DCI based on the selected/default TCI state. The wireless device may receive, for example, a MAC-CE indicating/activating/updating, for the coreset, the selected/default TCI state. The one or more configuration parameters may, for example, indicate the selected/default TCI state for the coreset.

Monitoring the coreset based on the selected/default TCI state may comprise monitoring, for DCI(s), downlink control channels (e.g., PDCCH, PDCCH transmissions/receptions) in the coreset based on the selected/default TCI state. Monitoring the downlink control channels in the coreset based on the selected/default TCI state may comprise one or more DM-RS antenna ports of the downlink control channels in the coreset being quasi co-located with a reference signal (e.g., CSI-RS, SS/PBCH block) indicated by the selected/default TCI state. The one or more DM-RS antenna ports of the downlink control channels with/carrying the DCI(s) in the coreset may be quasi co-located with the reference signal. The one or more DM-RS antenna ports of the downlink control channels in the coreset may be quasi co-located with the reference signal with respect to a quasi co-location type (e.g., QCL TypeA, QCL TypeD, QCL TypeC, and the like) indicated by the selected/default TCI state.

The wireless device may transmit the uplink signal based on the selected/default TCI state, for example, in response to the coreset that the wireless device receives/detects the DCI being associated/activated/configured with the selected/default TCI state. The wireless device may transmit the uplink signal based on the selected/default TCI state, for example, in response to monitoring, based on the selected/default TCI state, the coreset that the wireless device receives/detects the DCI.

In an example, the wireless device may monitor downlink control channels in a selected coreset based on the selected/default TCI state. The one or more coresets may comprise the selected coreset. A coreset index of the selected coreset may be lowest/highest among/of the one or more coreset indexes of the one or more coresets. The one or more configuration parameters may indicate, for the selected coreset, a coreset index that is lowest/highest among the one or more coreset indexes of the one or more coresets. The one or more coreset indexes of the one or more coresets may comprise the coreset index of the selected coreset. The wireless device may receive, for example, a MAC-CE indicating/activating/updating, for the selected coreset, the selected/default TCI state. The one or more configuration parameters may, for example, indicate the selected/default TCI state for the selected coreset.

The wireless device may transmit the uplink signal based on the selected/default TCI state, for example, in response to the selected coreset being associated/activated/configured with the selected/default TCI state. The wireless device may transmit the uplink signal based on the selected/default TCI state, for example, in response to monitoring, based on the selected/default TCI state, the selected coreset with a lowest coreset index.

The wireless device may transmit the uplink signal based on the selected/default TCI state of the selected coreset, for example, in response to the coreset index of the selected coreset being lowest/highest among the one or more coreset indexes of the one or more coresets. The wireless device may transmit the uplink signal based on the selected/default TCI state of the selected coreset, for example, in response to the one or more configuration parameters indicating, for the selected coreset, the coreset index that is lowest/highest among the one or more coreset indexes of the one or more coresets.

In an example, the pathloss reference signal indicated by (or associated with or mapped to) the selected/default TCI state may be identified with a pathloss reference signal index that is lowest/highest among the one or more pathloss reference signal indexes of the one or more pathloss reference signals. The one or more pathloss reference signal indexes of the one or more pathloss reference signals may comprise the pathloss reference signal index of the pathloss reference signal.

The wireless device may transmit the uplink signal based on the selected/default TCI state among/of the one or more TCI states, for example, in response to the one or more configuration parameters indicating, for the pathloss reference signal indicated by the selected/default TCI state, a pathloss reference signal index that is lowest/highest among the one or more pathloss reference signal indexes of the one or more pathloss reference signals indicated by the one or more TCI states. The one or more pathloss reference signal indexes may comprise the pathloss reference signal index of the pathloss reference signal indicated by the selected/default TCI state.

For example, in FIG. 20, a pathloss reference signal index of the Pathloss RS 9 may be lowest/highest among a pathloss reference signal index of the Pathloss RS 23, a pathloss reference signal index of the Pathloss RS 9, a pathloss reference signal index of the Pathloss RS 41, and a pathloss reference signal index of the Pathloss RS 33. The selected/default TCI state may be the TCI state 8 indicated by the Pathloss RS 9, for example, based on the pathloss reference signal index of the Pathloss RS 9 being lowest/highest among the pathloss reference signal index of the Pathloss RS 23, the pathloss reference signal index of the Pathloss RS 9, the pathloss reference signal index of the Pathloss RS 41, and the pathloss reference signal index of the Pathloss RS 33.

For example, in FIG. 20, a pathloss reference signal index of the Pathloss RS 41 may be lowest/highest among a pathloss reference signal index of the Pathloss RS 23, a pathloss reference signal index of the Pathloss RS 9, a pathloss reference signal index of the Pathloss RS 41, and a pathloss reference signal index of the Pathloss RS 33. The selected/default TCI state may be the TCI state 2 indicated by the Pathloss RS 41, for example, based on the pathloss reference signal index of the Pathloss RS 41 being lowest/highest among the pathloss reference signal index of the Pathloss RS 23, the pathloss reference signal index of the Pathloss RS 9, the pathloss reference signal index of the Pathloss RS 41, and the pathloss reference signal index of the Pathloss RS 33.

Figure 18:
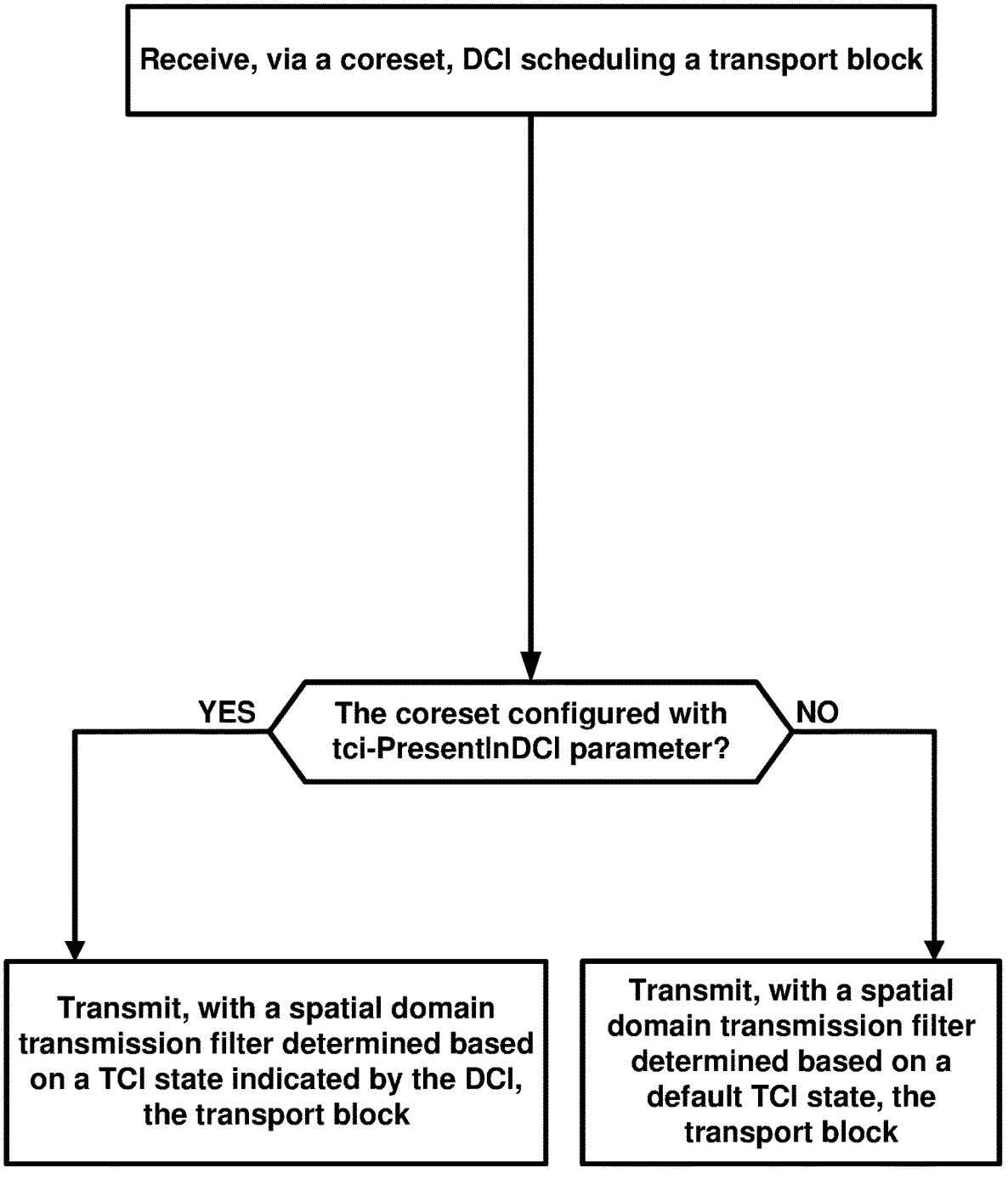
FIG. 18 illustrates an example flow diagram of a default transmitting beam determination as per an aspect of an embodiment of the present disclosure.
Figure 19:
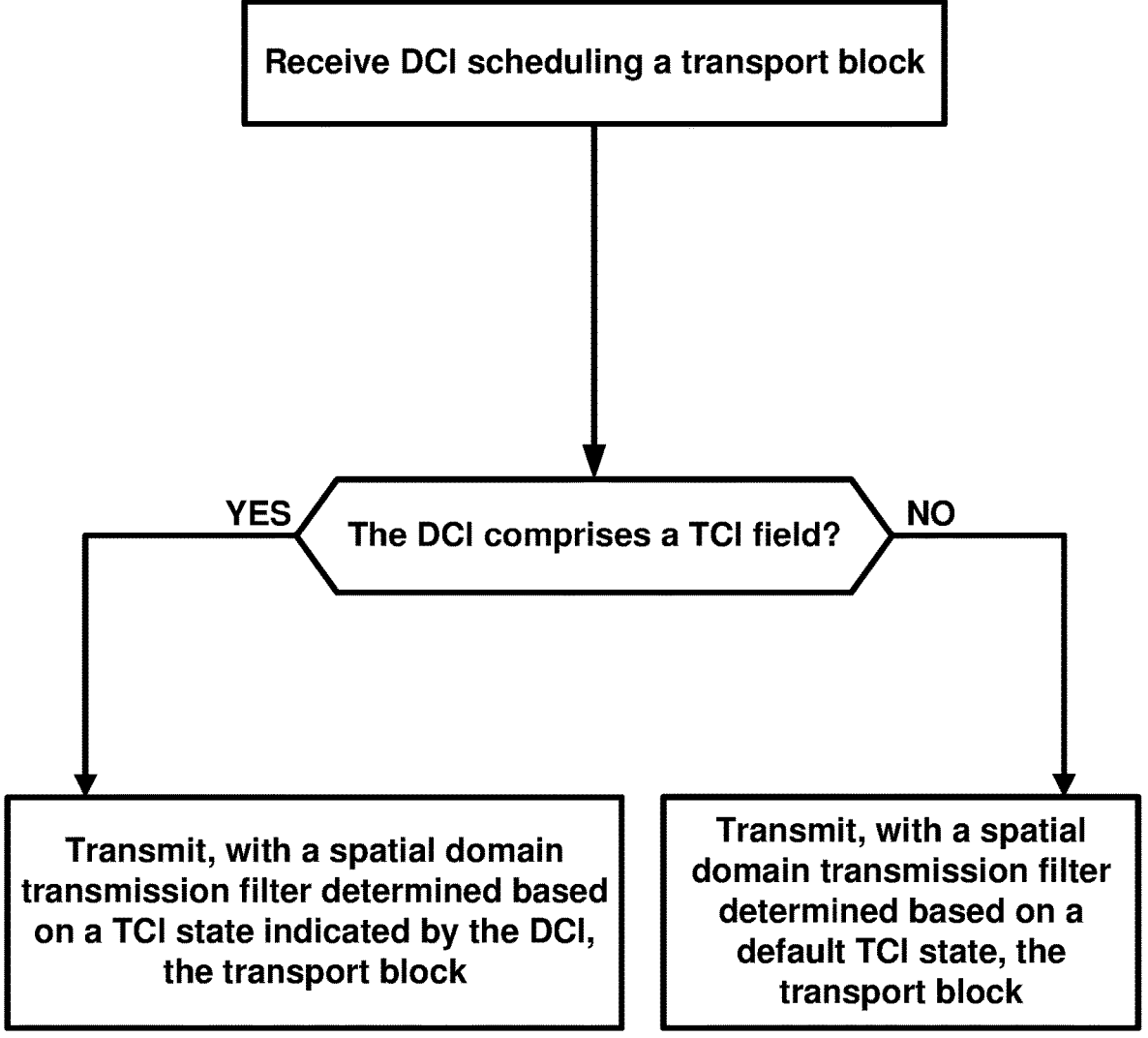
FIG. 19 illustrates an example flow diagram of a default transmitting beam determination as per an aspect of an embodiment of the present disclosure.

FIG. 18 and FIG. 19 illustrate example flow diagrams of a default transmitting beam determination as per an aspect of an embodiment of the present disclosure.

Figure 21:
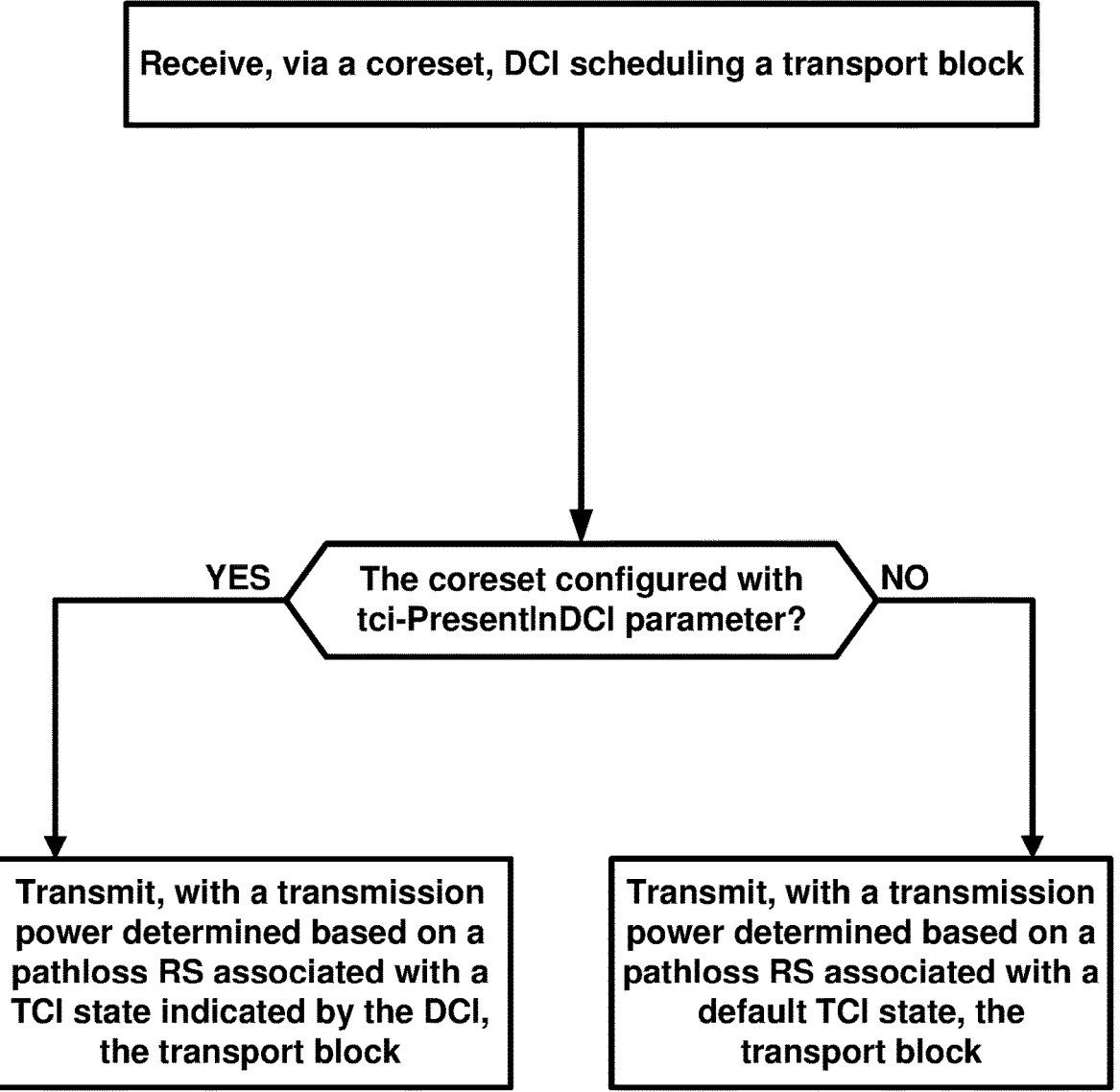
FIG. 21 illustrates an example flow diagram of a default pathloss reference signal determination as per an aspect of an embodiment of the present disclosure.
Figure 22:
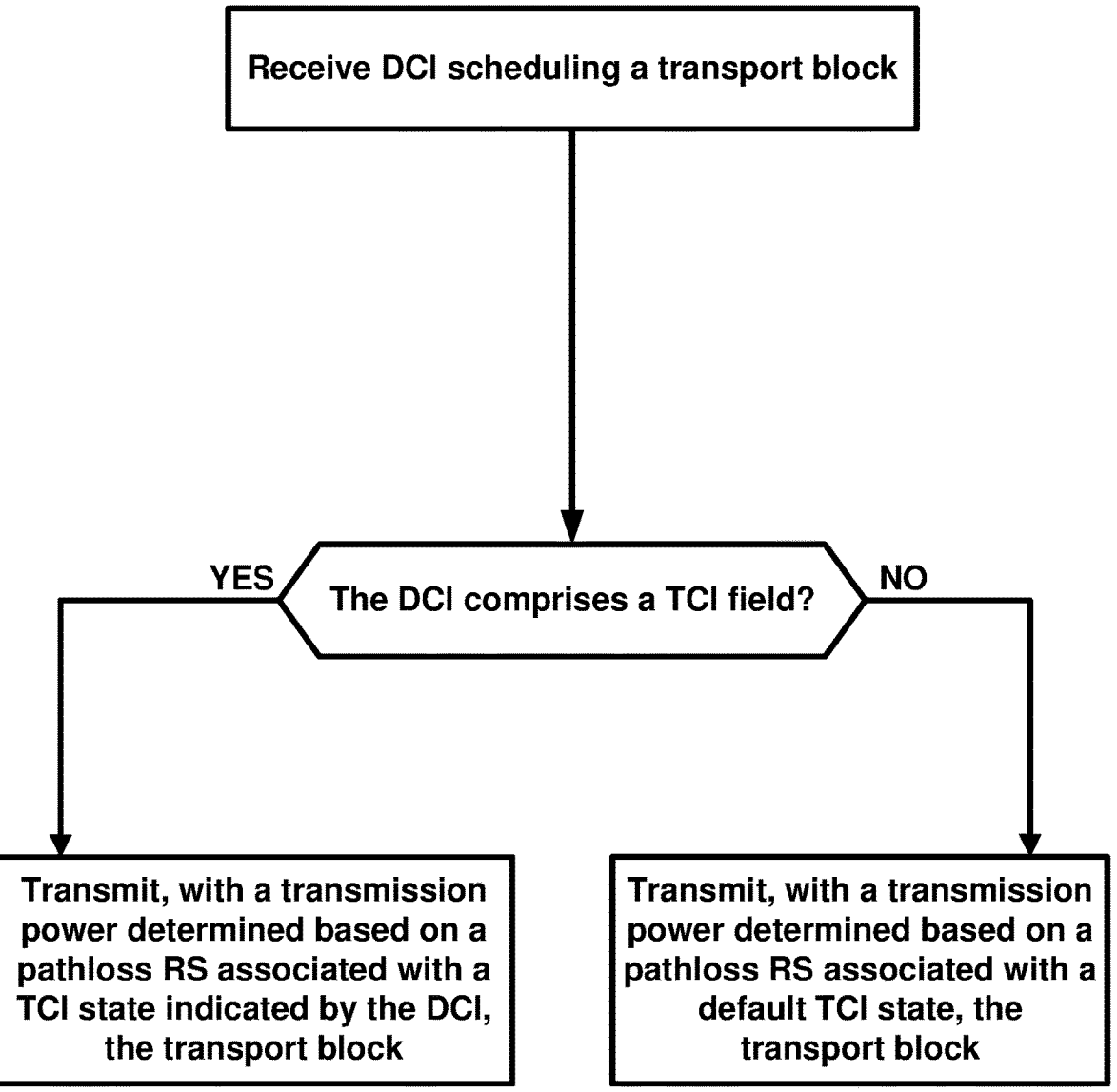
FIG. 22 illustrates an example flow diagram of a default pathloss reference signal determination as per an aspect of an embodiment of the present disclosure.

FIG. 21 and FIG. 22 illustrate example flow diagrams of a default pathloss reference signal determination as per an aspect of an embodiment of the present disclosure.

A wireless device may receive, e.g., from a base station, one or more messages comprising one or more configuration parameters. The one or more configuration parameters may be, for example, for a cell.

The one or more configuration parameters may indicate/comprise, for a first coreset, a TCI parameter (e.g., tci-PresentInDCI). The one or more configuration parameters may not indicate/comprise, for a second coreset, a TCI parameter (e.g., tci-PresentInDCI). A downlink BWP of the cell may comprise the first coreset and the second coreset. The one or more configuration parameters may indicate, for the downlink BWP, the first coreset and the second coreset. The wireless device may activate the downlink BWP as an active downlink BWP of the cell.

The wireless device may receive, via the first coreset, a first DCI. The first DCI may schedule a first uplink signal (e.g., a first transport block, a first PUSCH transmission). The first DCI may schedule transmission of the first uplink signal. The first DCI may be a non-fallback DCI (e.g., DCI format 01). The first DCI may be a DCI with a first format (e.g., DCI format 0_1). The first DCI may comprise a TCI field. The first DCI may comprise the TCI field, for example, based on the first DCI being the non-fallback DCI. The first DCI may comprise the TCI field, for example, based on the receiving the first DCI via the first coreset with the TCI parameter. The first DCI may comprise the TCI field, for example, based on transmitting, by the base station, the first DCI via the first coreset with the TCI parameter.

The wireless device may transmit the first uplink signal based on a TCI state indicated by the TCI field of the first DCI. The wireless device may transmit the first uplink signal based on the TCI state, for example, in response to the first DCI comprising the TCI field. The wireless device may transmit the first uplink signal based on the TCI state, for example, in response to receiving, via the first coreset with the TCI parameter, the first DCI scheduling the first uplink signal.

In FIG. 18 and FIG. 19, the wireless device may transmit the first uplink signal, for example, with/using a spatial domain transmission filter determined based on a reference signal indicated by (or configured for/in) the TCI state. In FIG. 21 and FIG. 22, the wireless device may transmit the first uplink signal, for example, with/using a transmission power determined based on a pathloss reference signal indicated by (or associated with or mapped to) the TCI state.

The wireless device may receive, via the second coreset, a second DCI. The second DCI may schedule a second uplink signal (e.g., a second transport block, a second PUSCH transmission). The second DCI may schedule transmission of the second uplink signal. The second DCI may be a non-fallback DCI (e.g., DCI format 0_1). The second DCI may be a DCI with the first format (e.g., DCI format 0_1). The second DCI may not comprise a TCI field. The second DCI may not comprise the TCI field, for example, based on the receiving the second DCI via the second coreset without the TCI parameter. The second DCI may not comprise the TCI field, for example, based on transmitting, by the base station, the second DCI via the second coreset without the TCI parameter.

The wireless device may transmit the second uplink signal based on a selected/default TCI state. The wireless device may transmit the second uplink signal based on the selected/default TCI state, for example, in response to the second DCI not comprising the TCI field. The wireless device may transmit the second uplink signal based on the selected/default TCI state, for example, in response to receiving, via the second coreset without the TCI parameter, the second DCI scheduling the second uplink signal.

In FIG. 18 and FIG. 19, the wireless device may transmit the second uplink signal, for example, with/using a spatial domain transmission filter determined based on a reference signal indicated by (or configured for/in) the selected/default TCI state. In FIG. 21 and FIG. 22, the wireless device may transmit the second uplink signal, for example, with/using a transmission power determined based on a pathloss reference signal indicated by (or associated with or mapped to) the selected/default TCI state. One or more rules to select/determine the selected/default TCI state have been discussed in FIG. 17 and FIG. 20.

The wireless device may receive a DCI. The wireless device may receive the DCI, for example, via the first coreset. The wireless device may receive the DCI, for example, via the second coreset. The DCI may schedule an uplink signal (e.g., a transport block, a PUSCH transmission). The DCI may schedule transmission of the uplink signal. The DCI may be a fallback DCI (e.g., DCI format 0_0). The DCI may be a DCI with a second format (e.g., DCI format 0_0). The DCI may not comprise a TCI field. The DCI may not comprise the TCI field, for example, based on the DCI being the fallback DCI.

The wireless device may transmit the uplink signal based on a selected/default TCI state. The wireless device may transmit the uplink signal based on the selected/default TCI state, for example, in response to the DCI not comprising the TCI field. The wireless device may transmit the uplink signal based on the selected/default TCI state, for example, in response to the DCI being the fallback DCI. The wireless device may transmit the uplink signal based on the selected/default TCI state, for example, in response to the DCI being the DCI with the second format.

The wireless device may transmit the uplink signal, for example, with/using a spatial domain transmission filter determined based on a reference signal indicated by (or configured for/in) the selected/default TCI state. The wireless device may transmit the uplink signal, for example, with/using a transmission power determined based on a pathloss reference signal indicated by (or associated with or mapped to) the selected/default TCI state.

The wireless device may transmit the uplink signal based on the selected/default TCI state, for example, regardless of receiving, via the first coreset with the TCI parameter or the second coreset without the TCI parameter, the DCI scheduling the uplink signal.

A wireless device may receive, e.g., from a base station, one or more messages comprising one or more configuration parameters for a cell. The one or more configuration parameters may indicate a plurality of PUCCH resource groups.

The wireless device may receive an activation command (e.g., MAC CE) indicating/activating/updating a spatial relation (or a TCI state or a transmitting beam) for a PUCCH resource. A PUCCH resource group of the plurality of PUCCH resource groups may comprise the PUCCH resource. The wireless device may apply the spatial relation to one or more PUCCH resources of the PUCCH resource group that comprise the PUCCH resource. The wireless device may apply the spatial relation to each PUCCH resource of the one or more PUCCH resources of the PUCCH resource group that comprise the PUCCH resource.

In an example, the wireless device may be served by (e.g., transmit/receive to/from) a plurality of TRPs comprising a first TRP and a second TRP. The wireless device may transmit repetitions of an uplink signal via a PUCCH resource activated with two spatial relations. Transmission of the uplink signal may be repeated among the first TRP and the second TRP via the PUCCH resource. The wireless device may transmit, via the PUCCH resource, the uplink signal to/for the first TRP based on a first spatial relation of the two spatial relations and to/for the second TRP based on a second spatial relation of the two spatial relations. This may increase the reliability of transmission of the uplink signal. For example, when the first TRP experiences blockage (e.g., due to trees, building, etc.), the second TRP may receive the uplink signal.

At least two PUCCH resource groups of the plurality of PUCCH resource groups may comprise the PUCCH resource activated with two spatial relations. A first PUCCH resource group of the at least two PUCCH resource groups may comprise one or more first PUCCH resources that are associated (or activated) with a first spatial relation of the two spatial relations. The one or more first PUCCH resources may comprise the PUCCH resource. A second PUCCH resource group of the at least two PUCCH resource groups may comprise one or more second PUCCH resources that are associated (or activated) with a second spatial relation of the two spatial relations. The one or more second PUCCH resources may comprise the PUCCH resource.

The wireless device may receive an activation command (e.g., MAC-CE) indicating/activating/updating one or more new spatial relations for the PUCCH resource. In the implementation of the existing systems, the wireless device applies the one or more new spatial relations to i) the one or more first PUCCH resources in the first PUCCH resource group that comprises the PUCCH resource, and ii) the one or more second PUCCH resources in the second PUCCH resource group that comprises the PUCCH resource. Applying the one or more new spatial relations (or the same spatial relations) to the first PUCCH resource group and the second PUCCH resource group may not be efficient. The first PUCCH resource group may be associated with the first TRP and the second PUCCH resource group may be associated with the second TRP. The first TRP and the second TRP may not be co-located. The locations/directions of the first TRP and the second TRP may be different. The first TRP and the second TRP may be subject to different channel conditions (e.g., channel fading, distance, pathloss blockage, etc.).

Example embodiments may enhance spatial relation update when a wireless device receive an activation command (e.g., MAC-CE) indicating/activating/updating one or more new spatial relations for a PUCCH resource that belongs to at least two PUCCH resource groups.

In an example embodiment, the wireless device may apply a first spatial relation of the one or more new spatial relations to a first PUCCH resource group of the at least two PUCCH resource groups. The first PUCCH resource group may be, for example, a first/starting/earliest PUCCH resource group among the at least two PUCCH resource groups. The first PUCCH resource group may be, for example, identified by a lowest/highest PUCCH resource group index among at least two PUCCH resource group indexes of the at least two PUCCH resource groups. The first PUCCH resource group may be, for example, indicated by a field in the activation command indicating/activating/updating the one or more new spatial relations. The field (or a value of the field, e.g., 0) may associate/map the first spatial relation and the first PUCCH resource group. The wireless device may apply a second spatial relation of the one or more new spatial relations to a second PUCCH resource group of the at least two PUCCH resource groups. The second PUCCH resource group may be, for example, a second/second starting/second earliest PUCCH resource group among the at least two PUCCH resource groups. The second PUCCH resource group may be, for example, identified by a lowest/highest PUCCH resource group index among at least two PUCCH resource group indexes of the at least two PUCCH resource groups. The second PUCCH resource group may be, for example, indicated by a field in the activation command indicating/activating/updating the one or more new spatial relations. The field (or a value of the field, e.g., 1) may associate/map the second spatial relation and the second PUCCH resource group.

Applying a spatial relation to a PUCCH resource group may comprise applying the spatial relation to one or more PUCCH resources in the PUCCH resource group.

In the existing systems, the plurality of PUCCH resource groups may be updated semi-statically (e.g., by RRC reconfiguration). This may increase the signaling overhead and latency. In an example embodiment, the wireless device may dynamically, e.g., by MAC-CE, DCI and the like, update the plurality of PUCCH resource groups. Updating the plurality of PUCCH resource groups may comprise updating PUCCH resource(s) that belong(s) to a PUCCH resource group of the plurality of PUCCH resource groups.

For example, a wireless device may receive an activation command (e.g., MAC-CE) indicating/activating/updating a new (single) spatial relation for a PUCCH resource with two spatial relations. At least two PUCCH resource groups of the plurality of PUCCH resource groups may comprise the PUCCH resource. The wireless device may apply the new (single) spatial relation to a first PUCCH resource group of the at least two PUCCH resource groups. The wireless device may not apply the new (single) spatial relation to a second PUCCH resource group of the at least two PUCCH resource groups. A field (or a value of a field) of the activation command may indicate the first PUCCH resource group. The wireless device may remove the PUCCH resource from the second PUCCH resource group. The second PUCCH resource group may not comprise the PUCCH resource, for example, based on the removing. The PUCCH resource may not belong to the second PUCCH resource group, for example, based on the removing.

For example, a wireless device may receive an activation command (e.g., MAC-CE) indicating/activating/updating two new spatial relations for a PUCCH resource with a (single) spatial relation. At least one of the two new spatial relations may or may not be the same as the (single) spatial relation. A first PUCCH resource group of the plurality of PUCCH resource groups may comprise the PUCCH resource. The wireless device may add the PUCCH resource to a second PUCCH resource group of the plurality of PUCCH resource groups. The second PUCCH resource group may comprise the PUCCH resource, for example, based on the adding. The PUCCH resource may belong to the second PUCCH resource group, for example, based on the adding. The second PUCCH resource group may be associated (or activated) with a second spatial relation of the two new spatial relations. The first PUCCH resource group may comprise the PUCCH resource. The PUCCH resource may belong to the first PUCCH resource group.

Implementation of the example embodiments may reduce the signaling overhead and latency.

FIG. 23, FIG. 24, FIG. 25, and FIG. 26 illustrate examples of a resource grouping as per an aspect of an embodiment of the present disclosure.

The one or more configuration parameters (e.g., discussed in FIG. 17 and FIG. 20) may indicate a plurality of uplink resource groups/sets/pools (e.g., by a higher layer parameter PUCCH-ResourceGroup). In FIG. 23-FIG. 26, the plurality of uplink resource groups are a first uplink resource group (e.g., PUCCH group 1) and a second uplink resource group (e.g., PUCCH group 2). The one or more configuration parameters may indicate the plurality of uplink resource groups, for example, for the (active) uplink BWP of the cell.

The plurality of uplink resource groups may, for example, be/comprise a plurality of PUCCH resource groups. The plurality of uplink resource groups may, for example, be/comprise a plurality of PUSCH resource groups. The plurality of uplink resource groups may, for example, be/comprise a plurality of SRS resource groups.

The plurality of uplink resource groups may comprise/indicate a plurality of uplink resources. Each uplink resource group of the plurality of uplink resource groups may comprise/indicate respective uplink resource(s) of the plurality of uplink resources. The one or more configuration parameters may indicate, for each uplink resource group of the plurality of uplink resource groups, the respective uplink resource(s) of the plurality of uplink resources (e.g., by a higher layer parameter resourcePerGroupList). The (active) uplink BWP of the cell may comprise the plurality of uplink resources. For example, in FIG. 23-FIG. 26, the plurality of uplink resources are PUCCH resource 1, PUCCH resource 2, PUCCH resource 3, PUCCH resource 4, and PUCCH resource 5. The first uplink resource group (e.g., PUCCH group 1) comprises the PUCCH resource 1, the PUCCH resource 2, and the PUCCH resource 3. The second uplink resource group (e.g., PUCCH group 2) comprises the PUCCH resource 3, the PUCCH resource 4, and the PUCCH resource 5.

The one or more configuration parameters may indicate, for the plurality of uplink resource groups/sets/pools, a plurality of uplink resource group/set/pool indexes/identifiers/indicators (e.g., by a higher layer parameter pucch-ResourceGroupId). The one or more configuration parameters may indicate, for each uplink resource group of the plurality of uplink resource groups, a respective uplink resource group index of the plurality of uplink resource group indexes. For example, in FIG. 23-FIG. 26, the one or more configuration parameters may indicate, for the first uplink resource group (e.g., PUCCH group 1), a first uplink resource group index (e.g., a first PUCCH resource group index) of the plurality of uplink resource group/set/pool indexes. The first uplink resource group may be identified/indicated by the first uplink resource group index. The one or more configuration parameters may indicate, for the second uplink resource group (e.g., PUCCH group 2), a second uplink resource group index (e.g., a second PUCCH resource group index) of the plurality of uplink resource group/set/pool indexes. The second uplink resource group may be identified/indicated by the second uplink resource group index.

The wireless device may transmit, via the plurality of uplink resource groups, uplink signals with/using a plurality of spatial domain transmission filters/beams. The wireless device may transmit, via each uplink resource group of the plurality of uplink resource groups, uplink signals with/using a respective spatial domain transmission filter/beam of the plurality of spatial domain transmission filters/beams. For example, in FIG. 23-FIG. 26, the wireless device may transmit, via the first uplink resource group (e.g., PUCCH group 1), uplink signals with/using a first spatial domain transmission filter/beam (e.g., Beam 1). The wireless device may transmit, via the second uplink resource group (e.g., PUCCH group 2), uplink signals with/using a second spatial domain transmission filter/beam (e.g., Beam 2). The uplink signals may comprise, for example, PUCCH transmissions. The uplink signals may comprise, for example, UCI (e.g., SR, HARQ-ACK, CSI report, and the like). The uplink signals may comprise, for example, PUSCH transmissions. The uplink signals may comprise, for example, SRS transmissions. The plurality of spatial domain transmission filters/beams may comprise the first spatial domain transmission filter/beam and the second spatial domain transmission filter/beam.

Transmitting, via an uplink resource group, uplink signals with a spatial domain transmission filter/beam may comprise transmitting, via one or more uplink resources in the uplink resource group, uplink signals with the spatial domain transmission filter/beam. Transmitting, via an uplink resource group, uplink signals with a spatial domain transmission filter/beam may comprise transmitting, via each uplink resource of one or more uplink resources in the uplink resource group, uplink signals with the spatial domain transmission filter/beam. For example, in FIG. 23-FIG. 26, the wireless device transmits, via the PUCCH resource 1 in the first uplink resource group (e.g., PUCCH group 1), uplink signals with/using the first spatial domain transmission filter/beam (e.g., Beam 1). The wireless device transmits, via the PUCCH resource 2 in the first uplink resource group (e.g., PUCCH group 1), uplink signals with/using the first spatial domain transmission filter/beam (e.g., Beam 1). The wireless device transmits, via the PUCCH resource 3 in the first uplink resource group (e.g., PUCCH group 1), uplink signals with/using the first spatial domain transmission filter/beam (e.g., Beam 1). The wireless device transmits, via the PUCCH resource 3 in the second uplink resource group (e.g., PUCCH group 2), uplink signals with/using the second spatial domain transmission filter/beam (e.g., Beam 2). The wireless device transmits, via the PUCCH resource 4 in the second uplink resource group (e.g., PUCCH group 2), uplink signals with/using the second spatial domain transmission filter/beam (e.g., Beam 2). The wireless device transmits, via the PUCCH resource 5 in the second uplink resource group (e.g., PUCCH group 2), uplink signals with/using the second spatial domain transmission filter/beam (e.g., Beam 2).

The wireless device may determine the plurality of spatial domain transmission filters/beams of (or associated with) the plurality of uplink resource groups, for example, based on a plurality of spatial relations (e.g., PUCCH-SpatialRelation-Info). The wireless device may determine each spatial domain transmission filter/beam of the plurality of spatial domain transmission filters/beams, for example, based on a respective spatial relation of the plurality of spatial relations. For example, in FIG. 23-FIG. 26, the wireless device may determine the first spatial domain transmission filter/beam (e.g., Beam 1) based on a first spatial relation. The wireless device may determine the second spatial domain transmission filter/beam (e.g., Beam 2) based on a second spatial relation. The plurality of spatial relations may comprise the first spatial relation and the second spatial relation.

The wireless device may receive one or more activation commands (e.g., MAC-CEs) indicating/activating/updating the plurality of spatial relations for the plurality of uplink resource groups. Each activation command of the one or more activation commands may indicate/activate/update a respective spatial relation of the plurality of spatial relations for an uplink resource group of the plurality of uplink resource groups. For example, a first activation command may indicate/activate/update the first spatial relation for the first uplink resource group (e.g., PUCCH group 1). A second activation command may indicate/activate/update the second spatial relation for the second uplink resource group (e.g., PUCCH group 2). The one or more activation commands may comprise the first activation command and the second activation command. The first activation command and the second activation command may be, for example, the same. The first activation command and the second activation command may be, for example, different.

In an example, at least two uplink resource groups of the plurality of uplink resource groups may comprise an uplink resource (e.g., PUCCH/PUSCH/SRS resource). The at least two uplink resource groups of the plurality of uplink resource groups may comprise the (same) uplink resource. The one or more configuration parameter may indicate, for the at least two uplink resource groups, the uplink resource. The one or more configuration parameter may indicate, for each uplink resource group of the at least two uplink resource groups, the uplink resource. The one or more configuration parameter may indicate, for the at least two uplink resource groups, the uplink resource, for example, for an uplink repetition (e.g., PUCCH repetition). The wireless device may transmit, via the uplink resource, repetitions of an uplink signal (e.g., PUCCH/PUSCH/SRS transmission, UCI, and the like) with/using at least two spatial domain transmission filters associated with the at least two uplink resource groups. Each spatial domain transmission filter of the at least two spatial domain transmission filters may be associated with a respective uplink resource group of the at least two uplink resource groups. The wireless device may transmit, via the uplink resource, each repetition of the repetitions of the uplink signal with/using a respective spatial domain transmission filter of the at least two spatial domain transmission filters. For example, in FIG. 23-FIG. 26, the at least two uplink resource groups are the first uplink resource group (e.g., PUCCH group 1) and the second uplink resource group (e.g., PUCCH group 2). The uplink resource is the PUCCH resource 3. The first uplink resource group (e.g., PUCCH group 1) comprises the PUCCH resource 3. The second uplink resource group (e.g., PUCCH group 2) comprises the PUCCH resource 3. The wireless device may transmit, via the uplink resource (or the PUCCH resource 3), an uplink signal (or repetition of an uplink signal) with/using the first spatial domain transmission filter/ beam (e.g., Beam 1) determined based on the first spatial relation. The wireless device may transmit, via the uplink resource (or the PUCCH resource 3), the uplink signal (or repetition of the uplink signal) with/using the second spatial domain transmission filter/beam (e.g., Beam 2) determined based on the second spatial relation. The wireless device may transmit, via the uplink resource (or the PUCCH resource 3), one or more first repetitions of an uplink signal with/using the first spatial domain transmission filter/beam (e.g., Beam 1) determined based on the first spatial relation. The wireless device may transmit, via the uplink resource (or the PUCCH resource 3), one or more second repetitions of the uplink signal with/using the second spatial domain transmission filter/beam (e.g., Beam 2) determined based on the second spatial relation.

The wireless device may receive an activation command (e.g., MAC-CE, DCI, PUCCH Spatial Relation Activation/ Deactivation MAC CE, Enhanced PUCCH Spatial Relation Activation/Deactivation MAC CE, control command, and the like at time TO in FIG. 23-FIG. 26). The activation command may comprise a plurality of fields.

A field of the plurality of fields may indicate the cell. The field (e.g., Serving cell ID) may comprise a serving cell index/identifier/indicator (e.g., ServCell-ID, ServCellIndex) identifying/indicating the cell. The one or more configuration parameters may indicate, for the cell, the serving cell index/identifier/indicator.

A field of the plurality of fields may indicate the cell. The field (e.g., BWP ID) may comprise a BWP index/identifier/ indicator (e.g., BWP-ID) identifying/indicating the uplink BWP. The one or more configuration parameters may indicate, for the uplink BWP, the BWP index/identifier/indicator.

A field of the plurality of fields may indicate the uplink resource (e.g., PUCCH resource 3). The at least two uplink resource groups may comprise the uplink resource. The field may indicate the uplink resource in the at least two uplink resource groups. The field may comprise an uplink resource index/identifier/indicator (e.g., PUCCH Resource ID) identifying/indicating the uplink resource. The one or more configuration parameters may indicate, for the uplink resource, the uplink resource index/identifier/indicator.

Figure 23:
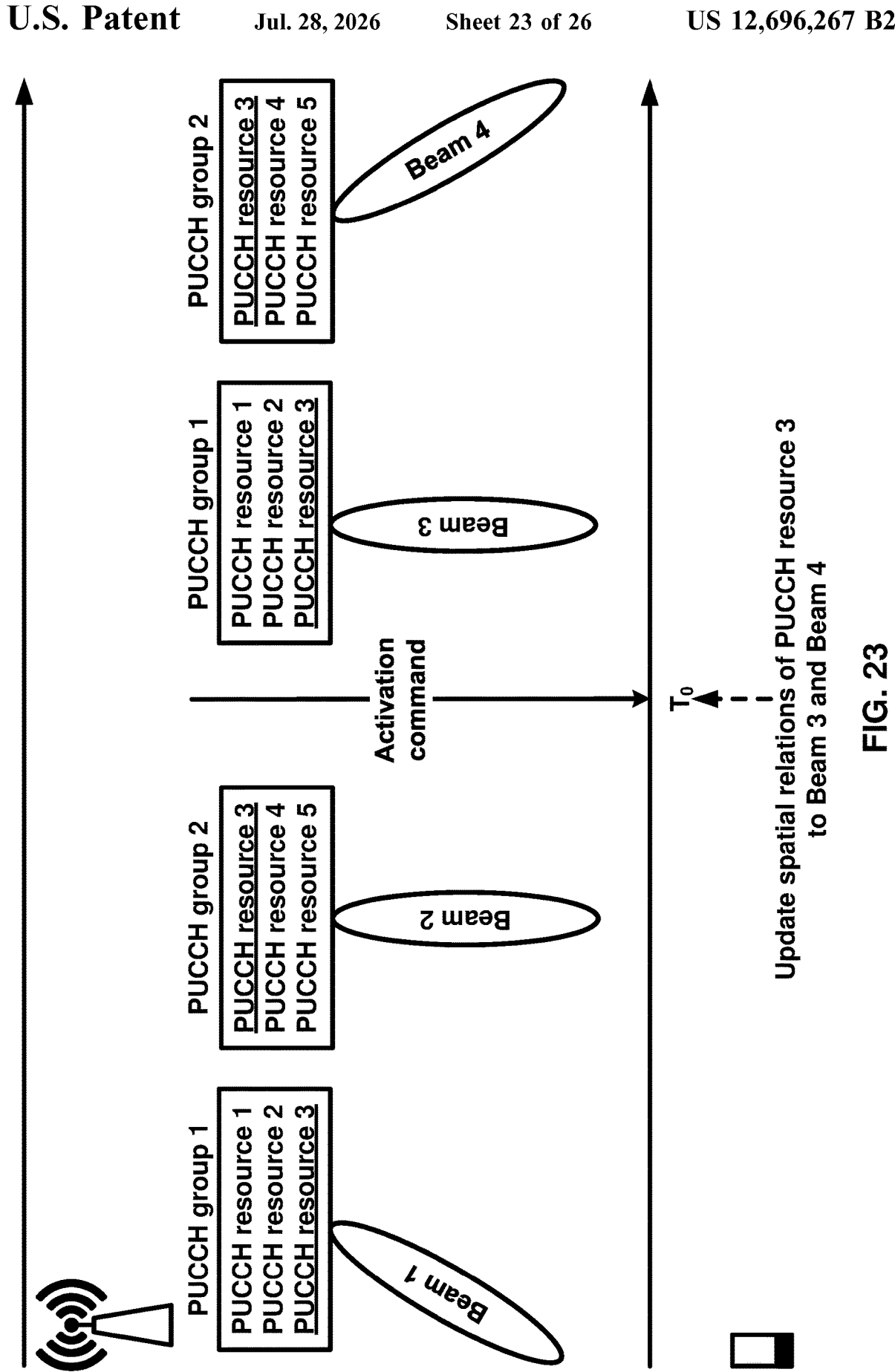
FIG. 23 illustrates an example of a resource grouping as per an aspect of an embodiment of the present disclosure.

In FIG. 23, at least two fields of the plurality of fields may indicate at least two spatial relations. Each field of the at least two fields may indicate a respective spatial relation of the at least two spatial relations. Each field of the at least two fields may comprise a spatial relation index/identifier/indicator indicating/identifying the respective spatial relation of the at least two spatial relations. The at least two spatial relations may comprise a third spatial relation and a fourth spatial relation. For example, a first field of the at least two fields may indicate the third spatial relation of the at least two spatial relations. A second field of the at least two fields may indicate the fourth spatial relation of the at least two spatial relations. A position/location/octet of the first field in the activation command may be lower than a position/ location/octet of the second field in the activation command. For example, n-th octet of the activation command may comprise the first field and m-th octet of the activation command may comprise the second field, where m>n.

The wireless device may apply the at least two spatial relations to the at least two uplink resource groups comprising the uplink resource. The wireless device may apply each spatial relation of the at least two spatial relations to a respective uplink resource group of the at least two uplink resource groups comprising the uplink resource. The wireless device may apply the at least two spatial relations to the at least two uplink resource groups, for example, based on receiving the activation command. The wireless device may apply the at least two spatial relations to the at least two uplink resource groups comprising the uplink resource, for example, based on receiving the activation command indicating the uplink resource. For example, the wireless device may apply the third spatial relation to a first uplink resource group of the at least two uplink resource groups. The wireless device may apply the fourth spatial relation to a second uplink resource group of the at least two uplink resource groups.

The first uplink resource group that the wireless device applies the third spatial relation may be configured in a lowest element/position/location among/in a vector/set/list of the at least two uplink resource groups. The second uplink resource group that the wireless device applies the fourth spatial relation may be configured in a highest element/ position/location among/in the vector/set/list of the at least two uplink resource groups. A position/location of the first uplink resource group may be lower than a position/location of the second uplink resource group in the vector/set/list of the at least two uplink resource groups. For example, n-th element/row/column of the vector/set/list of the at least two uplink resource groups may comprise the first uplink resource group and m-th element/row/column of the vector/ set/list of the at least two uplink resource groups may comprise the second uplink resource group, where m>n. The one or more configuration parameters may comprise/indicate the vector/set/list of the at least two uplink resource groups.

The wireless device may apply the third spatial relation to the first uplink resource group of the at least two uplink resource groups, for example, based on the first uplink resource group being configured in the lowest element/ position/location among/in the vector/set/list of the at least two uplink resource groups. The wireless device may apply the fourth spatial relation to the second uplink resource group of the at least two uplink resource groups, for example, based on the second uplink resource group being configured in the highest element/position/location among/ in the vector/set/list of the at least two uplink resource groups. The wireless device may apply the third spatial relation to the first uplink resource group of the at least two uplink resource groups, for example, based on the position/location of the first uplink resource group being lower than the position/location of the second uplink resource group in the vector/set/list of the at least two uplink resource groups. The wireless device may apply the fourth spatial relation to the second uplink resource group of the at least two uplink resource groups, for example, based on the position/location of the second uplink resource group being higher than the position/location of the first uplink resource group in the vector/set/list of the at least two uplink resource groups. A position/location/octet of the first field indicating the third spatial relation may be lower in the activation command than a position/location/octet of the second field indicating the fourth spatial relation.

The wireless device may apply the third spatial relation to the first uplink resource group in the lowest element/position/location among/in the vector/set/list of the at least two uplink resource groups, for example, based on the position/location/octet of the first field indicating the third spatial relation being lower in the activation command than the position/location/octet of the second field indicating the fourth spatial relation. The wireless device may apply the fourth spatial relation to the second uplink resource group in the highest element/position/location among/in the vector/set/list of the at least two uplink resource groups, for example, based on the position/location/octet of the second field indicating the fourth spatial relation being higher in the activation command than the position/location/octet of the first field indicating the third spatial relation.

The wireless device may apply the third spatial relation to the first uplink resource group of the at least two uplink resource groups, for example, based on the position/location/octet of the first field indicating the third spatial relation being lower in the activation command than the position/location/octet of the second field indicating the fourth spatial relation. The wireless device may apply the fourth spatial relation to the second uplink resource group of the at least two uplink resource groups, for example, based on the position/location/octet of the second field indicating the fourth spatial relation being higher in the activation command than the position/location/octet of the first field indicating the third spatial relation.

For example, in FIG. 23, the at least two uplink resource groups may be equal to =[PUCCH group 1, PUCCH group 2]. A position/location/octet of the first field indicating the third spatial relation may be lower in the activation command than a position/location/octet of the second field indicating the fourth spatial relation. The wireless device may apply the third spatial relation to the first uplink resource group (e.g., PUCCH group 1). The wireless device may apply the fourth spatial relation to the second uplink resource group (e.g., PUCCH group 2). The wireless device may apply the third spatial relation to the first uplink resource group (e.g., PUCCH group 1), for example, based on a position/location of the first uplink resource group being lower than the position/location of the second uplink resource group in the vector/set/list of the at least two uplink resource groups. The wireless device may apply the fourth spatial relation to the second uplink resource group (e.g., PUCCH group 2), for example, based on a position/location of the second uplink resource group being higher than the position/location of the first uplink resource group in the vector/set/list of the at least two uplink resource groups.

For example, in FIG. 23, the at least two uplink resource groups may be equal to =[PUCCH group 2, PUCCH group 1]. A position/location/octet of the first field indicating the third spatial relation may be lower in the activation command than a position/location/octet of the second field indicating the fourth spatial relation. The wireless device may apply the third spatial relation to the second uplink resource group (e.g., PUCCH group 2). The wireless device may apply the third spatial relation to the first uplink resource group (e.g., PUCCH group 1). The wireless device may apply the third spatial relation to the second uplink resource group (e.g., PUCCH group 2), for example, based on a position/location of the second uplink resource group being lower than the position/location of the first uplink resource group in the vector/set/list of the at least two uplink resource groups. The wireless device may apply the fourth spatial relation to the first uplink resource group (e.g., PUCCH group 1), for example, based on a position/location of the first uplink resource group being higher than the position/location of the second uplink resource group in the vector/set/list of the at least two uplink resource groups.

In an example, a first uplink resource group index of the first uplink resource group that the wireless device applies the third spatial relation may be lower than a second uplink resource group index of the second uplink resource group that the wireless device applies the fourth spatial relation. The plurality of uplink resource group indexes may comprise the first uplink resource group index and the second uplink resource group index. The one or more configuration parameters may indicate, for the first uplink resource group, the first uplink resource group index that is lowest among the first uplink resource group index of the first uplink resource group and the second uplink resource group index of the second uplink resource group. The one or more configuration parameters may indicate, for the second uplink resource group, the second uplink resource group index that is highest among the first uplink resource group index of the first uplink resource group and the second uplink resource group index of the second uplink resource group.

The wireless device may apply the third spatial relation to the first uplink resource group of the at least two uplink resource groups, for example, based on the first uplink resource group index of the first uplink resource group being lower than the second uplink resource group index of the second uplink resource group. The wireless device may apply the fourth spatial relation to the second uplink resource group of the at least two uplink resource groups, for example, based on the second uplink resource group index of the second uplink resource group being higher than the first uplink resource group index of the first uplink resource group. A position/location/octet of the first field indicating the third spatial relation may be lower in the activation command than a position/location/octet of the second field indicating the fourth spatial relation.

The wireless device may apply the third spatial relation to the first uplink resource group with the first uplink resource group index that is lowest among the first uplink resource group index of the first uplink resource group and the second uplink resource group index of the second uplink resource group, for example, based on the position/location/octet of the first field indicating the third spatial relation being lower in the activation command than the position/location/octet of the second field indicating the fourth spatial relation. The wireless device may apply the fourth spatial relation to the second uplink resource group with the second uplink resource group index that is highest among the first uplink resource group index of the first uplink resource group and the second uplink resource group index of the second uplink resource group, for example, based on the position/location/octet of the second field indicating the fourth spatial relation being higher in the activation command than the position/ location/octet of the first field indicating the third spatial relation.

For example, in FIG. 23, the first uplink resource group index of the first uplink resource group (e.g., PUCCH group 1) may be lower than the second uplink resource group index of the second uplink resource group (e.g., PUCCH group 2). A position/location/octet of the first field indicating the third spatial relation may be lower in the activation command than a position/location/octet of the second field indicating the fourth spatial relation. The wireless device may apply the third spatial relation to the first uplink resource group (e.g., PUCCH group 1). The wireless device may apply the fourth spatial relation to the second uplink resource group (e.g., PUCCH group 2). The wireless device may apply the third spatial relation to the first uplink resource group (e.g., PUCCH group 1), for example, based on the first uplink resource group index of the first uplink resource group being lower than the second uplink resource group index of the second uplink resource group. The wireless device may apply the fourth spatial relation to the second uplink resource group (e.g., PUCCH group 2), for example, based on the second uplink resource group index of the second uplink resource group being higher than the first uplink resource group index of the first uplink resource group.

For example, in FIG. 23, the second uplink resource group index of the second uplink resource group (e.g., PUCCH group 2) may be lower than the first uplink resource group index of the first uplink resource group (e.g., PUCCH group 1). A position/location/octet of the first field indicating the third spatial relation may be lower in the activation command than a position/location/octet of the second field indicating the fourth spatial relation. The wireless device may apply the third spatial relation to the second uplink resource group (e.g., PUCCH group 2). The wireless device may apply the fourth spatial relation to the first uplink resource group (e.g., PUCCH group 1). The wireless device may apply the third spatial relation to the second uplink resource group (e.g., PUCCH group 2), for example, based on the second uplink resource group index of the second uplink resource group index of the first uplink resource group. The wireless device may apply the fourth spatial relation to the first uplink resource group (e.g., PUCCH group 1), for example, based on the first uplink resource group index of the first uplink resource group being higher than the second uplink resource group index of the second uplink resource group.

In an example, a field of the plurality of fields in/of the activation command may indicate whether to apply the third spatial relation to a first uplink resource group of the at least two uplink resource groups or to a second uplink resource group of the at least two uplink resource groups. The field may indicate whether to apply the fourth spatial relation to the first uplink resource group of the at least two uplink resource groups or to the second uplink resource group of the at least two uplink resource groups. For example, a position/location of the first uplink resource group may be lower than a position/location of the second uplink resource group in the vector/set/list of the at least two uplink resource groups. For example, a first uplink resource group index of the first uplink resource group may be lower than a second uplink resource group index of the second uplink resource group.

The field may be equal to, for example, a first value (e.g., 0, 1). The wireless device may apply the third spatial relation to the first uplink resource group of the at least two uplink resource groups, for example, based on the field being equal to the first value. The wireless device may apply the fourth spatial relation to the second uplink resource group of the at least two uplink resource groups, for example, based on the field being equal to the first value. A position/location/octet of the first field indicating the third spatial relation may be lower in the activation command than a position/location/octet of the second field indicating the fourth spatial relation. The field may be, for example, in a same octet as the first field.

The field may be equal to, for example, a second value (e.g., 0, 1). The wireless device may apply the third spatial relation to the second uplink resource group of the at least two uplink resource groups, for example, based on the field being equal to the second value. The wireless device may apply the fourth spatial relation to the first uplink resource group of the at least two uplink resource groups, for example, based on the field being equal to the second value. A position/location/octet of the first field indicating the third spatial relation may be lower in the activation command than a position/location/octet of the second field indicating the fourth spatial relation.

For example, in FIG. 23, the wireless device may apply the third spatial relation to the first uplink resource group (e.g., PUCCH group 1). The wireless device may apply the fourth spatial relation to the second uplink resource group (e.g., PUCCH group 2). The wireless device may apply the third spatial relation to the first uplink resource group (e.g., PUCCH group 1), for example, based on the field of the activation command being equal to a first value (e.g., 0, 1). The wireless device may apply the fourth spatial relation to the second uplink resource group (e.g., PUCCH group 2), for example, based on the field of the activation command being equal to the first value (e.g., 0, 1).

Applying a spatial relation to an uplink resource group may comprise transmitting, via one or more uplink resources in the uplink resource group, uplink signals with a spatial domain transmission filter/beam determined based on the spatial relation. Applying a spatial relation to an uplink resource group may comprise transmitting, via each uplink resource of one or more uplink resources in the uplink resource group, uplink signals with a spatial domain transmission filter/beam determined based on the spatial relation.

For example, in FIG. 23, the wireless device may apply the third spatial relation to the first uplink resource group (e.g., PUCCH group 1). The wireless device may apply the fourth spatial relation to the second uplink resource (e.g., PUCCH group 2). The wireless device may transmit, via the first uplink resource group (e.g., PUCCH group 1), uplink signals with/using a third spatial domain transmission filter/ beam (e.g., Beam 3) determined based on the third spatial relation. The wireless device may transmit, via each uplink resource in the first uplink resource group (e.g., PUCCH group 1), uplink signals with/using the third spatial domain transmission filter/beam (e.g., Beam 3) determined based on the third spatial relation. The wireless device may transmit, via the second uplink resource group (e.g., PUCCH group 2), uplink signals with/using a fourth spatial domain transmission filter/beam (e.g., Beam 4) determined based on the fourth spatial relation. The wireless device may transmit, via each uplink resource in the second uplink resource group (e.g., PUCCH group 2), uplink signals with/using the fourth spatial domain transmission filter/beam (e.g., Beam 4) determined based on the fourth spatial relation.

Figure 24:
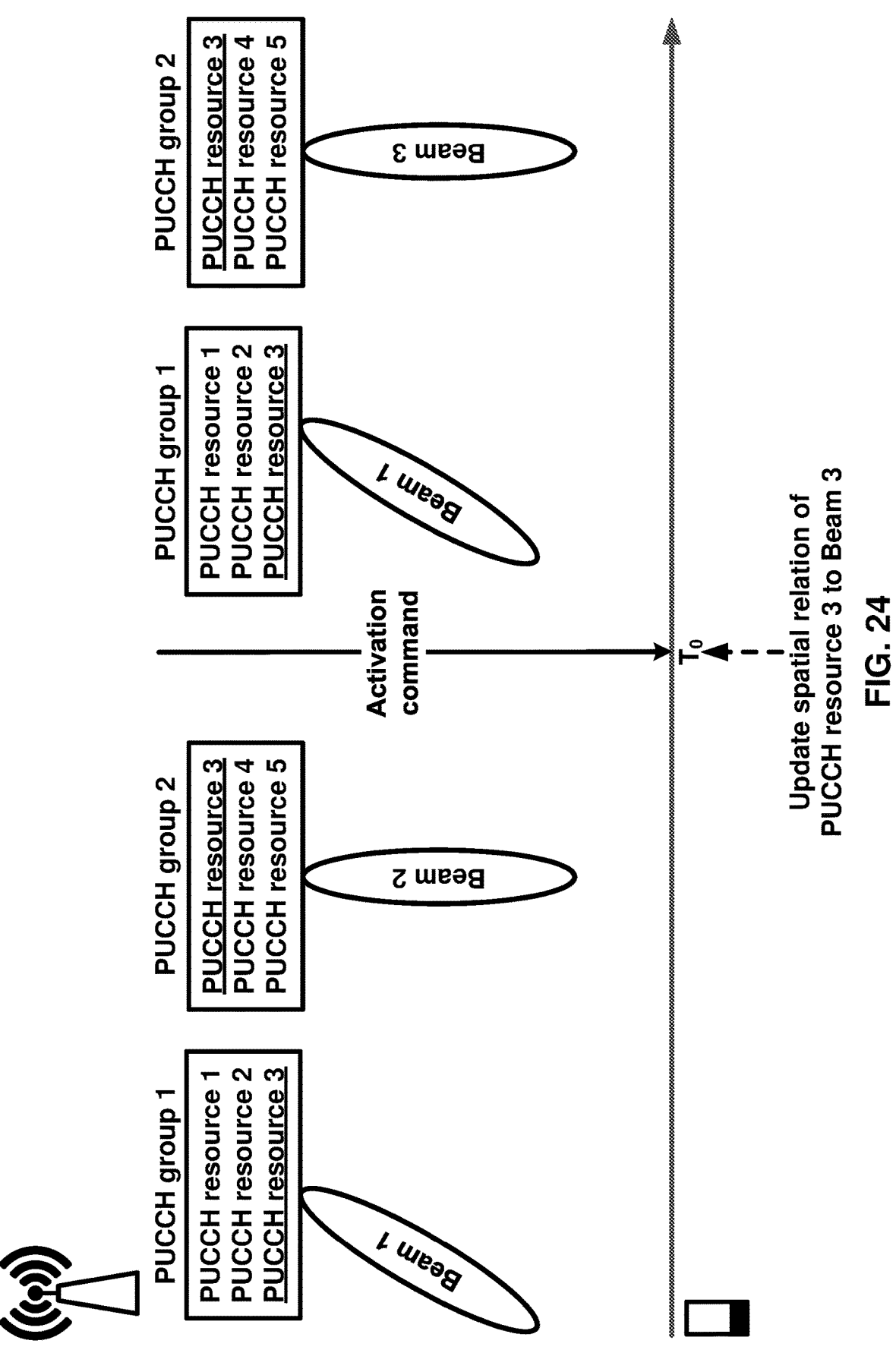
FIG. 24 illustrates an example of a resource grouping as per an aspect of an embodiment of the present disclosure.
Figure 25:
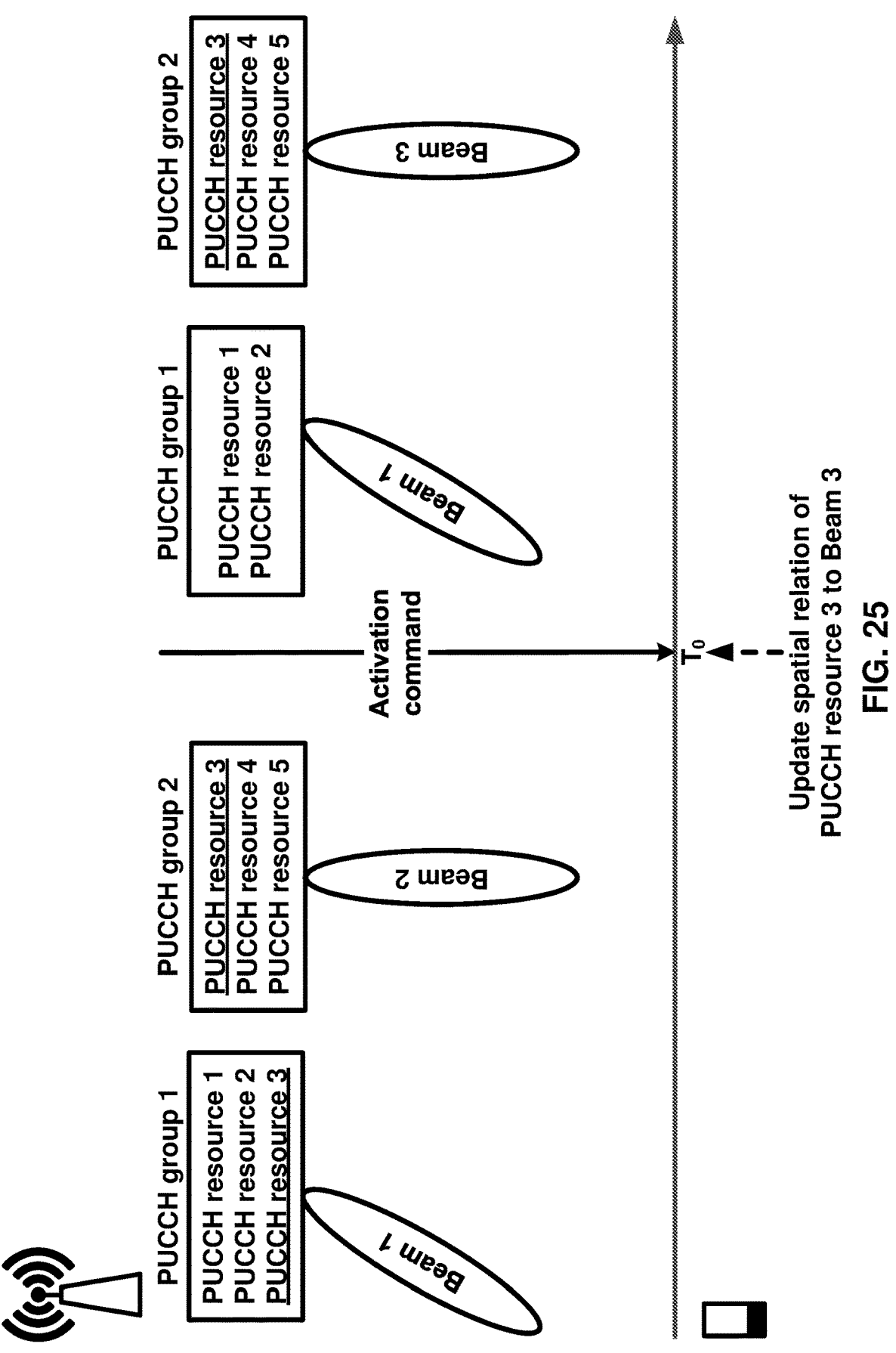
FIG. 25 illustrates an example of a resource grouping as per an aspect of an embodiment of the present disclosure.

In FIG. 24 and FIG. 25, a field of the plurality of fields may indicate a spatial relation (e.g., a single spatial relation).

The wireless device may apply the spatial relation to a selected uplink resource group of the at least two uplink resource groups comprising the uplink resource. The wireless device may apply the spatial relation to the selected uplink resource group of the at least two uplink resource groups, for example, based on receiving the activation command. The wireless device may apply the spatial relation to the selected uplink resource group of the at least two uplink resource groups comprising the uplink resource, for example, based on receiving the activation command indicating the uplink resource.

The wireless device may not apply the spatial relation to an unselected uplink resource group of the at least two uplink resource groups comprising the uplink resource. The unselected uplink resource group may comprise the uplink resource. The selected uplink resource group and the unselected uplink resource group may be different. For example, in FIG. 24 and FIG. 25, the selected uplink resource group may be the first uplink resource group (e.g., PUCCH group 1) and the unselected uplink resource group may be the second uplink resource group (e.g., PUCCH group 2). For example, in FIG. 24 and FIG. 25, the selected uplink resource group may be the second uplink resource group (e.g., PUCCH group 2) and the unselected uplink resource group may be the first uplink resource group (e.g., PUCCH group 1).

In an example, the selected uplink resource group may be configured in a lowest/highest element/position/location among/in a vector/set/list of the at least two uplink resource groups. A position/location of the selected uplink resource group may be lowest/highest in the vector/set/list of the at least two uplink resource groups. The wireless device may apply the spatial relation to the selected uplink resource group of the at least two uplink resource groups, for example, based on the selected uplink resource group being configured in the lowest element/position/location among/in the vector/set/list of the at least two uplink resource groups. The wireless device may apply the spatial relation to the selected uplink resource group of the at least two uplink resource groups, for example, based on the position/location of the selected uplink resource group being lowest/highest in the vector/set/list of the at least two uplink resource groups. The wireless device may not apply the spatial relation to the unselected uplink resource group of the at least two uplink resource groups, for example, based on the position/location of the unselected uplink resource group not being lowest/highest in the vector/set/list of the at least two uplink resource groups.

For example, in FIG. 24 and FIG. 25, the selected uplink resource group is the second uplink resource group (e.g., PUCCH group 2). The unselected uplink resource group is the first uplink resource group (e.g., PUCCH group 1). The selected uplink resource group may be the second uplink resource group (e.g., PUCCH group 2), for example, based on a position/location of the second uplink resource group being lower/higher than the position/location of the first uplink resource group in the vector/set/list of the at least two uplink resource groups.

In an example, an uplink resource group index of the selected uplink resource group may be lowest/highest among at least two uplink resource group indexes associated with (or of) the at least two uplink resource groups. Each uplink resource group index of the at least two uplink resource group indexes may be associated with (or of) a respective uplink resource group of the at least two uplink resource groups. The plurality of uplink resource group indexes may comprise the at least two uplink resource group indexes. The at least two uplink resource group indexes may comprise the uplink resource group index of the selected uplink resource group. The one or more configuration parameters may indicate, for the selected uplink resource group, the uplink resource group index that is lowest/highest among the at least two uplink resource group indexes associated with (or of) the at least two uplink resource groups.

The wireless device may apply the spatial relation to the selected uplink resource group of the at least two uplink resource groups, for example, based on the uplink resource group index of the selected uplink resource group being lowest/highest among the at least two uplink resource group indexes associated with (or of) the at least two uplink resource groups. The wireless device may apply the spatial relation to the selected uplink resource group of the at least two uplink resource groups, for example, based on the one or more configuration parameters indicating, for the selected uplink resource group, the uplink resource group index that is lowest/highest among the at least two uplink resource group indexes associated with (or of) the at least two uplink resource groups. The wireless device may not apply the spatial relation to the unselected uplink resource group of the at least two uplink resource groups, for example, based on the one or more configuration parameters indicating, for the unselected uplink resource group, an uplink resource group index that is not lowest/highest among the at least two uplink resource group indexes associated with (or of) the at least two uplink resource groups.

For example, in FIG. 24 and FIG. 25, the selected uplink resource group is the second uplink resource group (e.g., PUCCH group 2). The unselected uplink resource group is the first uplink resource group (e.g., PUCCH group 1). The selected uplink resource group may be the second uplink resource group (e.g., PUCCH group 2), for example, based on the second uplink resource group index of the second uplink resource group being lower/higher than the first uplink resource group index of the first uplink resource group.

In an example, a field of the plurality of fields in/of the activation command may indicate the selected uplink resource group. The field (or the value of the field) may indicate whether to apply the spatial relation to a first uplink resource group of the at least two uplink resource groups or to a second uplink resource group of the at least two uplink resource groups. For example, a position/location of the first uplink resource group may be lower than a position/location of the second uplink resource group in the vector/set/list of the at least two uplink resource groups. For example, a first uplink resource group index of the first uplink resource group may be lower than a second uplink resource group index of the second uplink resource group.

The field may be equal to, for example, a first value (e.g., 0, 1). The wireless device may apply the spatial relation to the first uplink resource group of the at least two uplink resource groups, for example, based on the field being equal to the first value. The wireless device may not apply the spatial relation to the second uplink resource group of the at least two uplink resource groups, for example, based on the field being equal to the first value. The first uplink resource group may be the selected uplink resource group, for example, based on the field being equal to the first value. The second uplink resource group may be the unselected uplink resource group, for example, based on the field being equal to the first value.

The field may be equal to, for example, a second value (e.g., 0, 1). The wireless device may apply the spatial relation to the second uplink resource group of the at least two uplink resource groups, for example, based on the field being equal to the second value. The wireless device may not apply the spatial relation to the first uplink resource group of the at least two uplink resource groups, for example, based on the field being equal to the second value. The second uplink resource group may be the selected uplink resource group, for example, based on the field being equal to the second value. The first uplink resource group may be the unselected uplink resource group, for example, based on the field being equal to the second value.

For example, in FIG. 24 and FIG. 25, the selected uplink resource group is the second uplink resource group (e.g., PUCCH group 2). The unselected uplink resource group is the first uplink resource group (e.g., PUCCH group 1). The selected uplink resource group may be the second uplink resource group (e.g., PUCCH group 2), for example, based on the field of the activation command being equal to the second value.

The wireless device may remove/exclude the uplink resource from the unselected uplink resource group. The wireless device may remove/exclude the uplink resource from the unselected uplink resource group, for example, based on receiving the activation command. The wireless device may remove/exclude the uplink resource from the unselected uplink resource group, for example, based on receiving the activation command indicating the spatial relation (or the single spatial relation) for the uplink resource in (or included in) the at least two uplink resource groups. The unselected uplink resource group may not comprise the uplink resource, for example, based on removing/excluding the uplink resource from the unselected uplink resource group.

The wireless device may not apply a spatial relation associated with (or activated for) the unselected uplink resource group to the uplink resource, for example, based on removing/excluding the uplink resource from the unselected uplink resource group.

For example, in FIG. 25, the selected uplink resource group is the second uplink resource group (e.g., PUCCH group 2). The unselected uplink resource group is the first uplink resource group (e.g., PUCCH group 1). The uplink resource is the PUCCH resource 3. The wireless device may remove/exclude the uplink resource (e.g., the PUCCH resource 3) from the first uplink resource group (e.g., the unselected uplink resource group). The first uplink resource group (e.g., PUCCH group 1) may not comprise the uplink resource (e.g., the PUCCH resource 3), for example, based on removing/excluding the uplink resource (e.g., the PUCCH resource 3) from the first uplink resource group (e.g., PUCCH group 1). The second uplink resource group (e.g., PUCCH group 2 or the selected uplink resource group) may comprise the uplink resource (e.g., the PUCCH resource 3).

A field of the plurality of fields may indicate a second uplink resource. The plurality of uplink resources may comprise the second uplink resource. The field may comprise an uplink resource index/identifier/indicator (e.g., PUCCH Resource ID) identifying/indicating the second uplink resource. At least two uplink resource groups of the plurality of uplink resource groups may not comprise the second uplink resource. A first uplink resource group (or a single uplink resource group) of the plurality of uplink resource groups may comprise the second uplink resource. For example, in FIG. 26, the second uplink resource may be the PUCCH resource 2. The first uplink resource group (e.g., PUCCH group 1) may comprise the second uplink resource (or the PUCCH resource 2). The second uplink resource group (e.g., PUCCH group 2) may not comprise the second uplink resource (or the PUCCH resource 2).

The wireless device may add/include the second uplink resource into/to a second uplink resource group of the plurality of uplink resource groups. The second uplink resource group may comprise the second uplink resource, for example, based on adding/including the second uplink resource into/to the second uplink resource group. The first uplink resource group may comprise the second uplink resource. The first uplink resource group and the second uplink resource group may comprise the second uplink resource. The wireless device may add/include the second uplink resource into/to the second uplink resource group, for example, based on receiving the activation command (e.g., at time TO in FIG. 26).

The activation command may comprise a field indicating the second uplink resource group. The wireless device may add/include the second uplink resource into/to the second uplink resource group, for example, based on the activation command comprising the field that indicates the second uplink resource group. The wireless device may add/include the second uplink resource into/to the second uplink resource group, for example, based on the activation command indicating the second uplink resource group. For example, a value of the field may be equal to a second uplink resource group index identifying/indicating the second uplink resource group. The plurality of uplink resource group indexes may comprise the second uplink resource group index identifying/indicating the second uplink resource group. The wireless device may add/include the second uplink resource into/to the second uplink resource group, for example, based on the value of the field being equal to the second uplink resource group index identifying/indicating the second uplink resource group. For example, a value of the field may be equal/set to a second value (e.g., 0, 1). The wireless device may add/include the second uplink resource into/to the second uplink resource group, for example, based on the value of the field being equal to the second value. The wireless device may add/include a third uplink resource indicated by a second activation command into/to the first uplink resource group, for example, based on a value of the field in the second activation command being equal/set to a first value (e.g., 0, 1).

The activation command may comprise a field indicating a second spatial relation activated for (or associated with) the second uplink resource group. The field may comprise a second spatial relation index identifying/indicating the second spatial relation activated for (or associated with) the second uplink resource group. The wireless device may add/include the second uplink resource into/to the second uplink resource group, for example, based on the activation command indicating the second spatial relation activated for (or associated with) the second uplink resource group.

The wireless device may apply a second spatial relation associated with (or activated for) the second uplink resource group to the second uplink resource, for example, based on adding/including the second uplink resource to the second uplink resource group.

Figure 26:
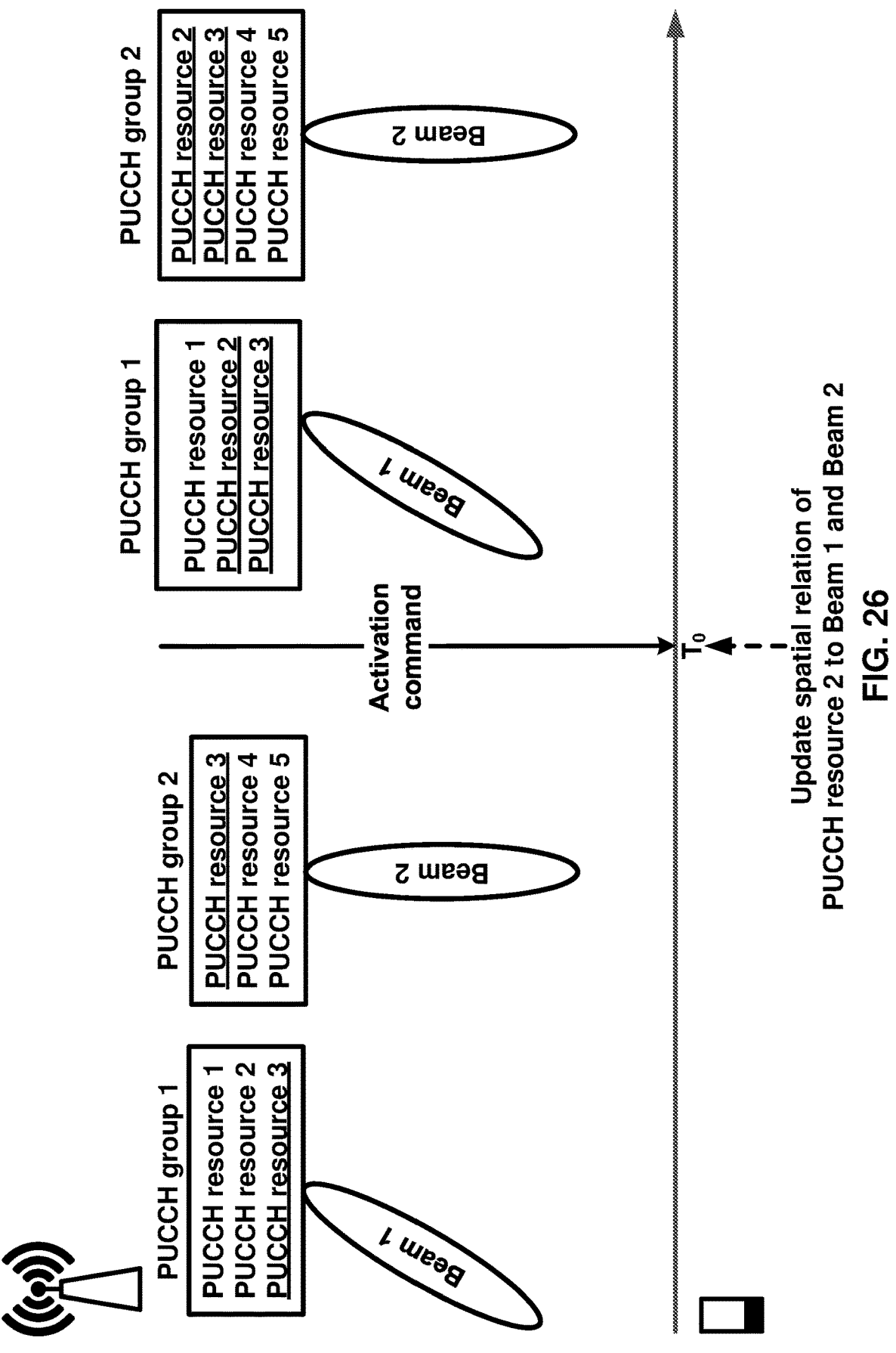
FIG. 26 illustrates an example of a resource grouping as per an aspect of an embodiment of the present disclosure.

For example, in FIG. 26, the wireless device may add the second uplink resource (or the PUCCH resource 2) to the second uplink resource group (e.g., PUCCH group 2). The wireless device may add/include the second uplink resource (or the PUCCH resource 2) into/to the second uplink resource group (e.g., PUCCH group 2), for example, based on the activation command comprising the field that indicates the second uplink resource group (e.g., PUCCH group 2). The wireless device may add/include the second uplink resource (or the PUCCH resource 2) into/to the second uplink resource group (e.g., PUCCH group 2), for example, based on the value of the field in the activation command being equal to the second value. The wireless device may add/include the second uplink resource (or the PUCCH resource 2) into/to the second uplink resource group (e.g., PUCCH group 2), for example, based on the activation command indicating the second spatial relation (e.g., Beam 2) activated for (or associated with) the second uplink resource group. The wireless device may add/include the second uplink resource (or the PUCCH resource 2) into/to the second uplink resource group (e.g., PUCCH group 2), for example, based on the activation command indicating, for the second uplink resource, the second spatial relation (e.g., Beam 2) activated for (or associated with) the second uplink resource group.

The activation command may comprise a field indicating a first spatial relation. The first spatial relation may be, for example, activated for (or associated with) the first uplink resource group that comprises the second uplink resource. The field may comprise a first spatial relation index identifying/indicating the first spatial relation. The wireless device may add/include the second uplink resource into/to the second uplink resource group, for example, based on the activation command indicating the first spatial relation. The wireless device may add/include the second uplink resource into/to the second uplink resource group, for example, based on the activation command indicating the first spatial relation activated for (or associated with) the first uplink resource group.

An uplink resource group of the plurality of uplink resource groups may comprise one or more uplink resources. The plurality of uplink resources may comprise the one or more uplink resources. The wireless device may transmit, via the uplink resource group, uplink signals with/using a first spatial domain transmission filter/beam (e.g., Beam 1) and a second spatial domain transmission filter/beam (e.g., Beam 2). The wireless device may transmit, via each uplink resource of the one or more uplink resources in the uplink resource group, uplink signals with/using the first spatial domain transmission filter/beam (e.g., Beam 1) and the second spatial domain transmission filter/beam (e.g., Beam 2).

The wireless device may determine the first spatial domain transmission filter/beam (e.g., Beam 1) based on a first spatial relation. The wireless device may determine the second spatial domain transmission filter/beam (e.g., Beam 2) based on a second spatial relation. The plurality of spatial relations may comprise the first spatial relation and the second spatial relation. The wireless device may receive an activation command indicating/activating/updating the first spatial relation and the second spatial relation for the uplink resource group. The one or more activation commands indicating/activating/updating the plurality of spatial relations may comprise the activation command.

The activation command may indicate, for the uplink resource group, the first spatial relation and the second spatial relation, for example, for an uplink repetition (e.g., PUCCH repetition).

The wireless device may transmit, via an uplink resource of the one or more uplink resources in the uplink resource group, repetitions of an uplink signal (e.g., PUCCH/PUSCH/SRS transmission, UCI, and the like) with/using the first spatial domain transmission filter and the second spatial domain transmission filter. The wireless device may transmit, via the uplink resource, one or more first repetitions of the uplink signal with/using the first spatial domain transmission filter/beam (e.g., Beam 1) determined based on the first spatial relation. The wireless device may transmit, via the uplink resource, one or more second repetitions of the uplink signal with/using the second spatial domain transmission filter/beam (e.g., Beam 2) determined based on the second spatial relation.

The wireless device may transmit, via each uplink resource of the one or more uplink resources in the uplink resource group, repetitions of an uplink signal (e.g., PUCCH/PUSCH/SRS transmission, UCI, and the like) with/using the first spatial domain transmission filter and the second spatial domain transmission filter. The wireless device may transmit, via each uplink resource, one or more first repetitions of the uplink signal with/using the first spatial domain transmission filter/beam (e.g., Beam 1) determined based on the first spatial relation. The wireless device may transmit, via the uplink resource, one or more second repetitions of the uplink signal with/using the second spatial domain transmission filter/beam (e.g., Beam 2) determined based on the second spatial relation.

The activation command (received at time T0 in FIG. 26) may indicate an uplink resource. The one or more uplink resources in the uplink resource group may comprise the uplink resource.

The activation command (received at time T0 in FIG. 26) may comprise a field indicating a spatial relation (e.g., a single spatial relation). The field may comprise a spatial relation index/identifier/indicator indicating/identifying the spatial relation.

The activation command may comprise a field indicating whether to update the first spatial relation or the second spatial relation with the spatial relation. The first spatial relation and the second spatial relation may be associated with the uplink resource group that comprises the uplink resource indicated by the activation command.

In an example, a value of the field may be equal to a first value (e.g., 0). The wireless device may update/replace the first spatial relation with the spatial relation, for example, based on the value of the field being equal/set to the first value. The wireless device may transmit, via the uplink resource group, uplink signals with/using a third spatial domain transmission filter/beam (e.g., Beam 3) and the second spatial domain transmission filter/beam (e.g., Beam 2). The wireless device may transmit, via each uplink resource of the one or more uplink resources in the uplink resource group, uplink signals with/using the third spatial domain transmission filter/beam (e.g., Beam 3) and the second spatial domain transmission filter/beam (e.g., Beam 2). The wireless device may determine the third spatial domain transmission filter/beam (e.g., Beam 1) based on the spatial relation. The wireless device may transmit, via the uplink resource group, uplink signals with/using the third spatial domain transmission filter/beam and the second spatial domain transmission filter/beam, for example, based on the value of the field being equal/set to the first value. The wireless device may transmit, via the uplink resource group, uplink signals with/using the third spatial domain transmission filter/beam and the second spatial domain transmission filter/beam, for example, based on the updating the first spatial relation with the spatial relation. The wireless device may transmit, via the uplink resource group, uplink signals with/using the third spatial domain transmission filter/beam, for example, based on the value of the field being equal/set to the first value. The wireless device may transmit, via the uplink resource group, uplink signals with/using the third spatial domain transmission filter/beam, for example, based on the updating the first spatial relation with the spatial relation.

The wireless device may transmit, via an uplink resource of the one or more uplink resources in the uplink resource group, repetitions of an uplink signal (e.g., PUCCH/PUSCH/SRS transmission, UCI, and the like) with/using the third spatial domain transmission filter and the second spatial domain transmission filter. The wireless device may transmit, via the uplink resource, one or more first repetitions of the uplink signal with/using the third spatial domain transmission filter/beam (e.g., Beam 3) determined based on the spatial relation. The wireless device may transmit, via the uplink resource, one or more second repetitions of the uplink signal with/using the second spatial domain transmission filter/beam (e.g., Beam 2) determined based on the second spatial relation. The wireless device may transmit, via the uplink resource of the one or more uplink resources in the uplink resource group, the repetitions of the uplink signal with/using the third spatial domain transmission filter and the second spatial domain transmission filter, for example, based on the value of the field being equal/set to the first value. The wireless device may transmit, via the uplink resource of the one or more uplink resources in the uplink resource group, the repetitions of the uplink signal with/using the third spatial domain transmission filter, for example, based on the value of the field being equal/set to the first value. The wireless device may transmit, via the uplink resource of the one or more uplink resources in the uplink resource group, the repetitions of the uplink signal with/using the third spatial domain transmission filter and the second spatial domain transmission filter, for example, based on the updating the first spatial relation with the spatial relation. The wireless device may transmit, via the uplink resource of the one or more uplink resources in the uplink resource group, the repetitions of the uplink signal with/using the third spatial domain transmission filter, for example, based on the updating the first spatial relation with the spatial relation.

In an example, a value of the field may be equal to a second value (e.g., 1). The wireless device may update/replace the second spatial relation with the spatial relation, for example, based on the value of the field being equal/set to the second value. The wireless device may transmit, via the uplink resource group, uplink signals with/using a third spatial domain transmission filter/beam (e.g., Beam 3) and the first spatial domain transmission filter/beam (e.g., Beam 1). The wireless device may transmit, via each uplink resource of the one or more uplink resources in the uplink resource group, uplink signals with/using the third spatial domain transmission filter/beam (e.g., Beam 3) and the first spatial domain transmission filter/beam (e.g., Beam 1). The wireless device may determine the third spatial domain transmission filter/beam (e.g., Beam 1) based on the spatial relation. The wireless device may transmit, via the uplink resource group, uplink signals with/using the third spatial domain transmission filter/beam and the first spatial domain transmission filter/beam, for example, based on the value of the field being equal/set to the second value. The wireless device may transmit, via the uplink resource group, uplink signals with/using the third spatial domain transmission filter/beam and the first spatial domain transmission filter/beam, for example, based on the updating the second spatial relation with the spatial relation. The wireless device may transmit, via the uplink resource group, uplink signals with/using the third spatial domain transmission filter/beam, for example, based on the value of the field being equal/set to the second value. The wireless device may transmit, via the uplink resource group, uplink signals with/using the third spatial domain transmission filter/beam, for example, based on the updating the second spatial relation with the spatial relation.

The wireless device may transmit, via an uplink resource of the one or more uplink resources in the uplink resource group, repetitions of an uplink signal (e.g., PUCCH/PUSCH/SRS transmission, UCI, and the like) with/using the third spatial domain transmission filter and the first spatial domain transmission filter. The wireless device may transmit, via the uplink resource, one or more first repetitions of the uplink signal with/using the third spatial domain transmission filter/beam (e.g., Beam 3) determined based on the spatial relation. The wireless device may transmit, via the uplink resource, one or more second repetitions of the uplink signal with/using the first spatial domain transmission filter/beam (e.g., Beam 1) determined based on the first spatial relation. The wireless device may transmit, via the uplink resource of the one or more uplink resources in the uplink resource group, the repetitions of the uplink signal with/using the third spatial domain transmission filter and the first spatial domain transmission filter, for example, based on the value of the field being equal/set to the second value. The wireless device may transmit, via the uplink resource of the one or more uplink resources in the uplink resource group, the repetitions of the uplink signal with/using the third spatial domain transmission filter, for example, based on the value of the field being equal/set to the second value. The wireless device may transmit, via the uplink resource of the one or more uplink resources in the uplink resource group, the repetitions of the uplink signal with/using the third spatial domain transmission filter and the first spatial domain transmission filter, for example, based on the updating the second spatial relation with the spatial relation. The wireless device may transmit, via the uplink resource of the one or more uplink resources in the uplink resource group, the repetitions of the uplink signal with/using the third spatial domain transmission filter, for example, based on the updating the second spatial relation with the spatial relation.

In an example, the activation command (received at time TO in FIG. 26) may indicate at least two spatial relations. The wireless device may ignore, based on the activation command indicating the at least two spatial relations, the field indicating whether to update the first spatial relation or the second spatial relation.

A wireless device may receive, e.g., from a base station, one or more messages comprising one or more configuration parameters. The one or more configuration parameters may a plurality of uplink resource groups (e.g., PUCCH resource groups). At least two uplink resource groups of the plurality of uplink resource groups may comprise an uplink resource (e.g., PUCCH resource).

The wireless device may receive an activation command (e.g., MAC-CE) indicating/updating/activating at least two spatial relations for the uplink resource.

The wireless device may apply a first spatial relation of the at least two spatial relations to a first uplink resource group of the at least two uplink resource groups that comprise the uplink resource. The wireless device may apply the first spatial relation to one or more first uplink resources in the first uplink resource group. The one or more first uplink resources may comprise the uplink resource. The wireless device may transmit, via the first uplink resource group, uplink signals with/using a first spatial domain transmission filter determined based on the first spatial relation. The wireless device may transmit, via each uplink resource of the one or more first uplink resources in the first uplink resource group, uplink signals with/using the first spatial domain transmission filter determined based on the first spatial relation.

The wireless device may apply a second spatial relation of the at least two spatial relations to a second uplink resource group of the at least two uplink resource groups that comprise the uplink resource. The wireless device may apply the second spatial relation to one or more second uplink resources in the second uplink resource group. The one or more second uplink resources may comprise the uplink resource. The wireless device may transmit, via the second uplink resource group, uplink signals with/using a second spatial domain transmission filter determined based on the second spatial relation. The wireless device may transmit, via each uplink resource of the one or more second uplink resources in the second uplink resource group, uplink signals with/using the second spatial domain transmission filter determined based on the second spatial relation.

The wireless device may determine the first uplink resource group to apply the first spatial relation and the second uplink resource group to apply the second spatial relation, for example, based on one or more criteria discussed in FIG. 23.

The first spatial relation may be a spatial relation located/positioned/occurring in a first/starting/earliest element/member/position/octet in/of a set/vector/list of the at least two spatial relations.

The second spatial relation may be a spatial relation located/positioned/occurring in a second/second starting/second earliest/last/latest/ending element/member/position/octet in/of a set/vector/list of the at least two spatial relations.

The activation command may comprise a first field indicating the first spatial relation. The activation command may comprise a second field indicating the second spatial relation.

A position/location/octet of the first field may be lower in the activation command than a position/location/octet of the second field.

The wireless device may receive an activation command (e.g., MAC-CE) indicating/updating/activating a spatial relation for the uplink resource. The wireless device may apply the spatial relation to a selected uplink resource group of the at least two uplink resource groups that comprise the uplink resource. The wireless device may apply the spatial relation to one or more uplink resources in the selected uplink resource group. The one or more uplink resources may comprise the uplink resource. The wireless device may transmit, via the selected uplink resource group, uplink signals with/using a spatial domain transmission filter determined based on the spatial relation. The wireless device may transmit, via each uplink resource of the one or more uplink resources in the selected uplink resource group, uplink signals with/using the spatial domain transmission filter determined based on the spatial relation. The wireless device may determine the selected uplink resource group, for example, based on one or more criteria discussed in FIG. 24.

The wireless device may not apply the spatial relation to an unselected uplink resource group of the at least two uplink resource groups that comprise the uplink resource. The wireless device may not apply the spatial relation to one or more uplink resources in the unselected uplink resource group. The one or more uplink resources may comprise the uplink resource.

The wireless device may remove/exclude the uplink resource from the unselected uplink resource group. The wireless device may remove/exclude the uplink resource from the unselected uplink resource group, for example, based on receiving the activation command. The wireless device may determine the unselected uplink resource group, for example, based on one or more criteria discussed in FIG. 25. The unselected uplink resource group may not comprise the uplink resource, for example, based on removing/excluding the uplink resource from the unselected uplink resource group.

The wireless device may receive a second activation command indicating/activating a second spatial relation for a second uplink resource in the unselected uplink resource group. The wireless device may apply the second spatial relation to one or more uplink resources in the unselected uplink resource group. The one or more uplink resources in the unselected uplink resource group may not comprise the uplink resource, for example, based on removing/excluding the uplink resource from the unselected uplink resource group. The wireless device may not apply the second spatial relation to the uplink resource, for example, based on removing/excluding the uplink resource from the unselected uplink resource group.

What is claimed is:

1. A wireless device comprising:
one or more processors; and
memory storing instructions that, when executed by the one or more processors, cause the wireless device to:
receive one or more radio resource control (RRC) messages comprising one or more configuration parameters, wherein the one or more configuration parameters indicate:
transmission configuration indicator (TCI) states; and
pathloss reference signals (RSs), wherein each TCI state of the TCI states is associated with a respective pathloss RS of the pathloss RSs;
receive first downlink control information (DCI) indicating at least two TCI states, of the TCI states, for uplink transmissions and downlink receptions;
receive second DCI scheduling or activating a physical uplink shared channel (PUSCH) transmission; and
transmit, in response to the second DCI being a DCI format 0_0, the PUSCH transmission using a transmission power determined based on a pathloss estimate of a pathloss RS associated with a first TCI state of the at least two TCI states.

2. The wireless device of claim 1, wherein the at least two TCI states comprise:
at least two joint TCI states; or
at least two uplink TCI states.

3. The wireless device of claim 1, wherein the PUSCH transmission is transmitted further using a spatial domain transmission filter determined based on the first TCI state.

4. The wireless device of claim 3, wherein the spatial domain transmission filter is further determined based on the pathloss RS associated with the first TCI state.

5. The wireless device of claim 1, wherein the instructions further cause the wireless device to:
receive third DCI:
scheduling or activating a second PUSCH transmission; and
indicating a second TCI state; and
transmit, based on the second TCI state, the second PUSCH transmission.

6. The wireless device of claim 1, wherein the instructions further cause the wireless device to map the at least two TCI states to at least two TCI codepoints, wherein each TCI codepoint, of the at least two TCI codepoints, indicates one or more respective TCI states of the at least two TCI states.

7. The wireless device of claim 6, wherein a lowest TCI codepoint, among the at least two TCI codepoints, indicate the first TCI state.

8. The wireless device of claim 1, wherein the instructions further cause the wireless device to monitor, based on the first TCI state, a control resource set (coreset) for receiving the second DCI.

9. A base station comprising:
one or more processors; and
memory storing instructions that, when executed by the one or more processors, cause the base station to:
  transmit one or more radio resource control (RRC) messages comprising one or more configuration parameters, wherein the one or more configuration parameters indicate:
    transmission configuration indicator (TCI) states; and
    pathloss reference signals (RSs), wherein each TCI state of the TCI states is associated with a respective pathloss RS of the pathloss RSs;
  transmit, to a wireless device, first downlink control information (DCI) indicating at least two TCI states, of the TCI states, for uplink transmissions and downlink receptions;
  transmit second DCI scheduling or activating a physical uplink shared channel (PUSCH) transmission; and
  receive the PUSCH transmission based on:
    the second DCI being a DCI format 0_0; and
    a transmission power determined based on a pathloss estimate of a pathloss RS associated with a first TCI state of the at least two TCI states.

10. The base station of claim 9, wherein the at least two TCI states comprise:
at least two joint TCI states; or
at least two uplink TCI states.

11. The base station of claim 9, wherein the PUSCH transmission is transmitted further based on a spatial domain transmission filter determined based on the first TCI state.

12. The base station of claim 11, wherein the spatial domain transmission filter is further determined based on the pathloss RS associated with the first TCI state.

13. The base station of claim 9, wherein the instructions further cause the base station to:
transmit third DCI:
  scheduling or activating a second PUSCH transmission; and
  indicating a second TCI state; and
receive, based on the second TCI state, the second PUSCH transmission.

14. The base station of claim 9, wherein the instructions further cause the base station to transmit, based on the first TCI state, a control resource set (coreset) for receiving the second DCI.

15. A non-transitory computer-readable medium comprising instructions that, when executed by one or more processors of a wireless device, cause the wireless device to:
receive one or more radio resource control (RRC) messages comprising one or more configuration parameters, wherein the one or more configuration parameters indicate:
  transmission configuration indicator (TCI) states; and
  pathloss reference signals (RSs), wherein each TCI state of the TCI states is associated with a respective pathloss RS of the pathloss RSs;
receive first downlink control information (DCI) indicating at least two TCI states, of the TCI states, for uplink transmissions and downlink receptions;
receive second DCI scheduling or activating a physical uplink shared channel (PUSCH) transmission; and
transmit, in response to the second DCI being a DCI format 0_0, the PUSCH transmission using a transmission power determined based on a pathloss estimate of a pathloss RS associated with a first TCI state of the at least two TCI states.

16. The non-transitory computer-readable medium of claim 15, wherein the at least two TCI states comprise:
at least two joint TCI states; or
at least two uplink TCI states.

17. The non-transitory computer-readable medium of claim 15, wherein the PUSCH transmission is transmitted further using a spatial domain transmission filter determined based on the first TCI state.

18. The non-transitory computer-readable medium of claim 17, wherein the spatial domain transmission filter is further determined based on the pathloss RS associated with the first TCI state.

19. The non-transitory computer-readable medium of claim 15, wherein the instructions further cause the wireless device to:
receive third DCI:
  scheduling or activating a second PUSCH transmission; and
  indicating a second TCI state; and
transmit, based on the second TCI state, the second PUSCH transmission.

20. The non-transitory computer-readable medium of claim 15, wherein the instructions further cause the wireless device to map the at least two TCI states to at least two TCI codepoints, wherein each TCI codepoint, of the at least two TCI codepoints, indicates one or more respective TCI states of the at least two TCI states.

* * * * *